(12) United States Patent
Laroia

(10) Patent No.: US 9,282,228 B2
(45) Date of Patent: Mar. 8, 2016

(54) CAMERA METHODS AND APPARATUS USING OPTICAL CHAIN MODULES WHICH ALTER THE DIRECTION OF RECEIVED LIGHT

(71) Applicant: THE LIGHTCO INC., Palo Alto, CA (US)

(72) Inventor: Rajiv Laroia, Far Hills, NJ (US)

(73) Assignee: THE LIGHTCO INC., Palo Alto, CA (US)

( * ) Notice: Subject to any disclaimer, the term of this patent is extended or adjusted under 35 U.S.C. 154(b) by 0 days.

(21) Appl. No.: 14/147,585

(22) Filed: Jan. 5, 2014

(65) Prior Publication Data

US 2014/0192240 A1 Jul. 10, 2014

Related U.S. Application Data

(60) Provisional application No. 61/749,382, filed on Jan. 6, 2013, provisional application No. 61/749,314, filed on Jan. 5, 2013, provisional application No. 61/749,315, filed on Jan. 5, 2013, provisional application No. 61/749,316, filed on Jan. 5, 2013, provisional application No. 61/749,317, filed on Jan. 5, 2013.

(51) Int. Cl.
*H04N 5/225* (2006.01)
*H04N 5/235* (2006.01)
(Continued)

(52) U.S. Cl.
CPC .............. *H04N 5/2258* (2013.01); *G02B 13/16* (2013.01); *G02B 13/22* (2013.01); *G06T 11/60* (2013.01);
(Continued)

(58) Field of Classification Search
CPC ...... G02B 13/22; G02B 13/16; G02B 3/0056; H04N 5/2254; H04N 5/2258; H04N 5/2251; H04N 5/2355; H04N 5/2257; H04N 5/2353; H04N 5/2253; G06T 11/60
USPC ........................................................ 348/277
See application file for complete search history.

(56) References Cited

U.S. PATENT DOCUMENTS 5,078,479 A 1/1992 Vuilleumier et al.
5,781,331 A 7/1998 Carr et al.
(Continued)

FOREIGN PATENT DOCUMENTS

EP 2642757 A2 9/2013
JP 10091765 4/1998
(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.
(Continued)

*Primary Examiner* — Mekonnen Dagnew
(74) *Attorney, Agent, or Firm* — Michael P. Straub; Ronald P. Straub; Abbas Zaidi

(57) ABSTRACT

Methods and apparatus for capturing or generating images using multiple optical chains operating in parallel are described. Pixel values captured by individual optical chains corresponding to the same scene area are combined to provide an image with at least some of the benefits which would have been provided by capturing an image of the scene using a larger lens than that of the individual lenses of the optical chain modules. By using multiple optical chains in parallel at least some benefits normally obtained from using a large lens can be obtained without the need for a large lens. Furthermore in at least some embodiments, a wide dynamic range can be supported through the use of multiple sensors with the overall supported dynamic range being potentially larger than that of the individual sensors. Some lens and/or optical chain configurations are designed for use in small handheld devices, e.g., cell phones.

19 Claims, 29 Drawing Sheets

(51) Int. Cl.
*G06T 11/60* (2006.01)
*G02B 13/22* (2006.01)
*G02B 13/16* (2006.01)
*G02B 3/00* (2006.01)

(52) U.S. Cl.
CPC ........... *H04N 5/2251* (2013.01); *H04N 5/2253* (2013.01); *H04N 5/2254* (2013.01); *H04N 5/2257* (2013.01); *H04N 5/2353* (2013.01); *H04N 5/2355* (2013.01); *G02B 3/0056* (2013.01)

(56) References Cited

U.S. PATENT DOCUMENTS

| | | | |
|---|---|---|---|
| 5,889,553 | A | 3/1999 | Kino et al. |
| 5,982,951 | A | 11/1999 | Katayama et al. |
| 6,081,670 | A | 6/2000 | Madsen et al. |
| 7,009,652 | B1 | 3/2006 | Tanida et al. |
| 7,315,423 | B2 | 1/2008 | Sato |
| 7,551,358 | B2 | 6/2009 | Lee et al. |
| 7,810,511 | B2 | 10/2010 | Fagrenius et al. |
| 8,194,169 | B2 | 6/2012 | Tamaki et al. |
| 8,237,841 | B2 | 8/2012 | Tanida et al. |
| 8,320,051 | B2 | 11/2012 | Matsumura et al. |
| 8,482,637 | B2 | 7/2013 | Ohara et al. |
| 8,553,106 | B2 | 10/2013 | Scarff |
| 8,780,258 | B2 | 7/2014 | Lee |
| 2003/0185551 | A1 | 10/2003 | Chen |
| 2004/0227839 | A1* | 11/2004 | Stavely ................. G02B 7/28 348/345 |
| 2006/0187338 | A1 | 8/2006 | May et al. |
| 2006/0221218 | A1 | 10/2006 | Adler et al. |
| 2006/0238886 | A1 | 10/2006 | Kushida et al. |
| 2007/0050139 | A1 | 3/2007 | Sidman |
| 2007/0177047 | A1* | 8/2007 | Goto ................. G02B 13/0045 348/335 |
| 2007/0182528 | A1 | 8/2007 | Breed et al. |
| 2008/0030592 | A1 | 2/2008 | Border et al. |
| 2008/0074755 | A1 | 3/2008 | Smith |
| 2008/0211941 | A1 | 9/2008 | Deever et al. |
| 2008/0219654 | A1 | 9/2008 | Border et al. |
| 2008/0251697 | A1 | 10/2008 | Park et al. |
| 2008/0278610 | A1 | 11/2008 | Boettiger |
| 2009/0086032 | A1 | 4/2009 | Li |
| 2009/0225203 | A1 | 9/2009 | Tanida et al. |
| 2009/0278950 | A1 | 11/2009 | Deng et al. |
| 2010/0013906 | A1 | 1/2010 | Border et al. |
| 2010/0053414 | A1 | 3/2010 | Tamaki et al. |
| 2010/0097443 | A1* | 4/2010 | Lablans ........................ 348/36 |
| 2010/0225755 | A1 | 9/2010 | Tamaki et al. |
| 2010/0238327 | A1 | 9/2010 | Griffith et al. |
| 2010/0265346 | A1 | 10/2010 | Iizuka |
| 2010/0283842 | A1 | 11/2010 | Guissin et al. |
| 2010/0296802 | A1 | 11/2010 | Davies |
| 2011/0051243 | A1 | 3/2011 | Su |
| 2011/0069189 | A1 | 3/2011 | Venkataraman et al. |
| 2011/0080655 | A1 | 4/2011 | Mori |
| 2011/0128393 | A1 | 6/2011 | Tavi et al. |
| 2011/0157430 | A1* | 6/2011 | Hosoya .............. G02B 13/0065 348/240.3 |
| 2011/0157451 | A1 | 6/2011 | Chang |
| 2011/0187878 | A1 | 8/2011 | Mor et al. |
| 2011/0222167 | A1 | 9/2011 | Iwasawa |
| 2011/0280565 | A1 | 11/2011 | Chapman et al. |
| 2011/0285895 | A1 | 11/2011 | Weng et al. |
| 2012/0002096 | A1 | 1/2012 | Choi et al. |
| 2012/0162464 | A1 | 6/2012 | Kim |
| 2012/0249815 | A1 | 10/2012 | Bohn et al. |
| 2012/0257013 | A1 | 10/2012 | Witt et al. |
| 2012/0257077 | A1 | 10/2012 | Suzuki |
| 2012/0268642 | A1 | 10/2012 | Kawai |
| 2013/0027353 | A1 | 1/2013 | Hyun |
| 2013/0050564 | A1 | 2/2013 | Adams, Jr. et al. |
| 2013/0076928 | A1 | 3/2013 | Olsen et al. |
| 2013/0086765 | A1 | 4/2013 | Chen |
| 2013/0093842 | A1 | 4/2013 | Yahata |
| 2013/0153772 | A1 | 6/2013 | Rossi et al. |
| 2013/0155194 | A1 | 6/2013 | Sacre et al. |
| 2013/0223759 | A1 | 8/2013 | Nishiyama |
| 2013/0258044 | A1 | 10/2013 | Betts-Lacroix |
| 2014/0111650 | A1* | 4/2014 | Georgiev et al. .............. 348/159 |
| 2014/0192214 | A1 | 7/2014 | Laroia |
| 2014/0192224 | A1 | 7/2014 | Laroia |
| 2014/0192225 | A1 | 7/2014 | Laroia |
| 2014/0192253 | A1 | 7/2014 | Laroia |
| 2015/0234149 | A1 | 8/2015 | Kreitzer et al. |
| 2015/0253647 | A1* | 9/2015 | Mercado .............. G02B 13/002 348/373 |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

International Search Report from International Application No. PCT/US14/10267, pp. 1-5, dated Jul. 8, 2014.

Written Opinion of the International Searching Authority from International Application No. PCT/US14/10267, pp. 1-29, dated Jul. 8, 2014.

International Search Report and Written Opinion of the International Searching Authority from International Application No. PCT/US2014/061254, pp. 1-29, dated Jan. 8, 2015.

International Search Report and Written Opinion of the International Searching Authority from International Application No. PCT/US2014/061248, pp. 1-11, dated Jan. 13, 2015.

International Search Report and Written Opinion of the International Searching Authority from International Application No. PCT/US2014/061258, pp. 1-14, dated Jan. 13, 2015.

International Search Report and Written Opinion of the International Searching Authority from International Application No. PCT/US2014/061257, pp. 1-12, dated Jan. 14, 2015.

International Search Report and Written Opinion of the International Searching Authority from International Application No. PCT/US2014/062306, pp. 1-12, dated Jan. 26, 2015.

International Search Report and Written Opinion of the International Searching Authority from International Application No. PCT/US2014/063601, pp. 1-12, dated Jan. 27, 2015.

International Search Report and Written Opinion of the International Searching Authority from International Application No. PCT/US2014/072907, pp. 1-11, dated Mar. 27, 2015.

* cited by examiner

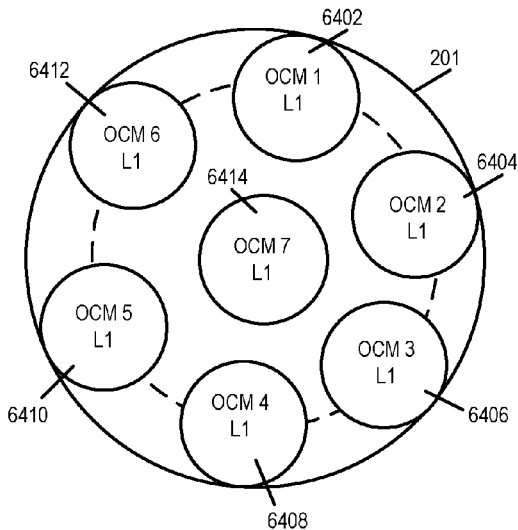
FIGURE 6A
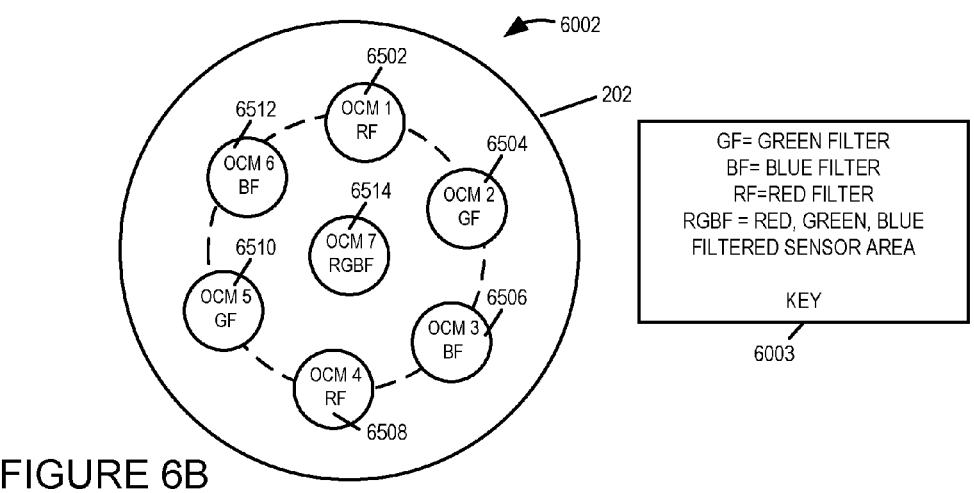
FIGURE 6B
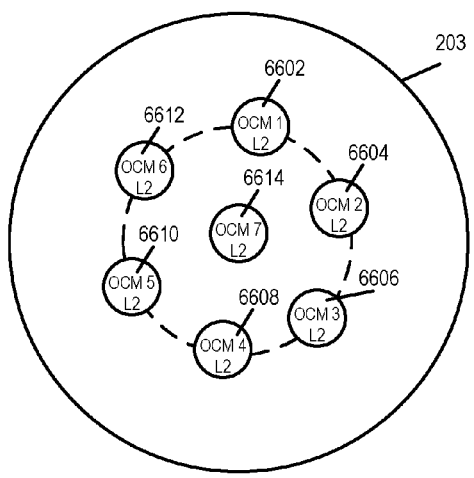
FIGURE 6C
| Fig. 6A | Fig. 6B | Fig. 6C |
FIGURE 6

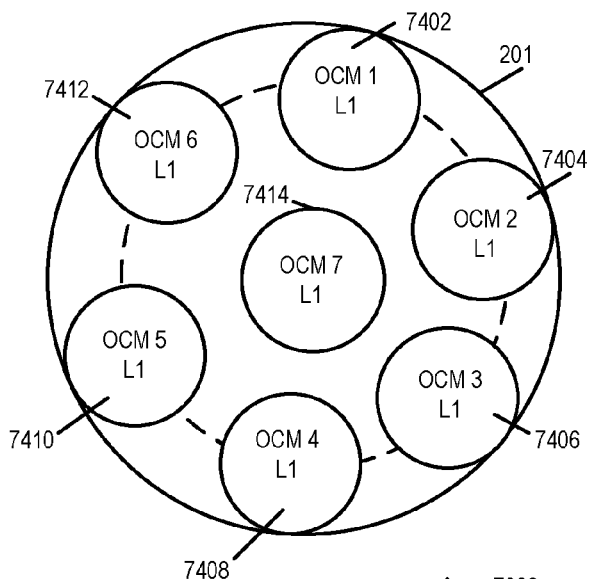
FIGURE 7A
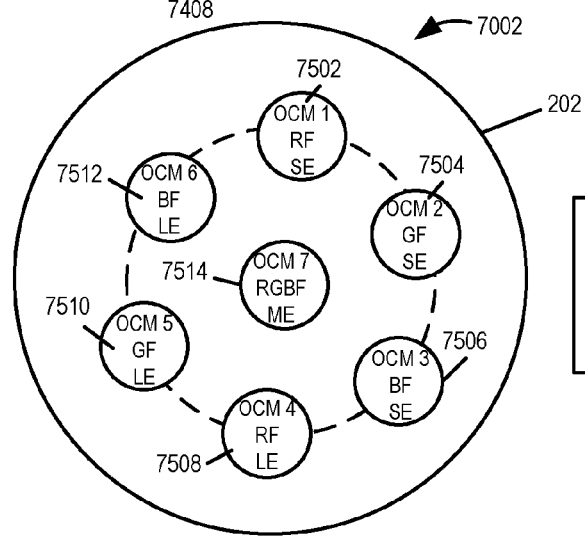
FIGURE 7B
SE = SHORT EXPOSURE
ME = MEDIUM EXPOSURE
LE = LONG EXPOSURE
KEY
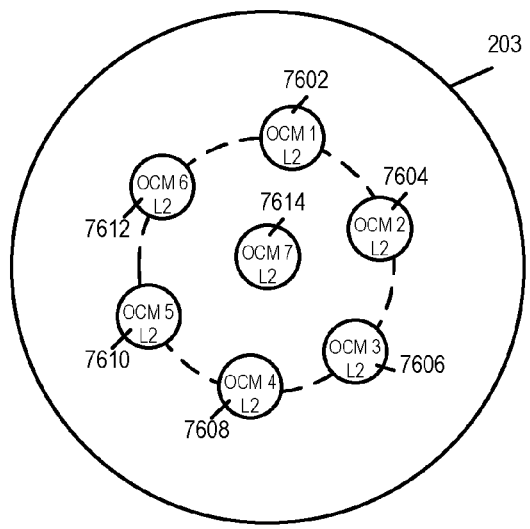
FIGURE 7C
| Fig. 7A | Fig. 7B | Fig. 7C |
FIGURE 7

2500

| | OCM1<br>EXP = 1/90 SEC | OCM2<br>EXP = 1/60 SEC | OCM3<br>EXP = 1/30 SEC |
|---|---|---|---|
| \multicolumn{4}{c}{CAPTURED PIXEL VALUES} |
| P1 | 100 | 154 | 255 (S) |
| P2 | 70 | 105 | 212 |
| P3 | 240 | 255 (S) | 255 (S) |
| P4 | 255 (S) | 255 (S) | 255 (S) |

| | OCM1<br>EXP = 1/90 SEC | OCM2<br>EXP = 1/60 SEC | OCM3<br>EXP = 1/30 SEC |
|---|---|---|---|
| \multicolumn{4}{c}{CAPTURED PIXEL VALUES EXCLUDING SATURATED PIXEL VALUES CORRESPONDING TO OPTICAL CHAINS HAVING LONGER EXPOSURE TIMES} |
| P1 | 100 | 154 | X |
| P2 | 70 | 105 | 212 |
| P3 | 240 | X | X |
| P4 | 255 (S) | X | X |

| NORMALIZED PIXEL VALUES EXCLUDING SATURATED PIXEL VALUES CORRESPONDING TO OPTICAL CHAINS HAVING LONGER EXPOSURE TIMES | | | |
|---|---|---|---|
| | OCM1 EXP = 1/90 SEC | OCM2 EXP = 1/60 SEC | OCM3 EXP = 1/30 SEC |
| NP1 | 100 | 103 | |
| NP2 | 70 | 70 | 71 |
| NP3 | 240 | | |
| NP4 | 255 | | |

| PIXEL OF COMBINED IMAGE | COMPUTED PIXEL VALUE INCLUDED IN COMBINED IMAGE | COMPUTATION USED TO GENERATED COMPUTED PIXEL VALUE |
|---|---|---|
| P1 | 102 | (100+103)/2 |
| P2 | 70 | (70+70+71)/3 |
| P3 | 240 | (240/1) |
| P4 | 255 | (255/1) |

FIGURE 28

CAMERA METHODS AND APPARATUS USING OPTICAL CHAIN MODULES WHICH ALTER THE DIRECTION OF RECEIVED LIGHT

RELATED APPLICATIONS

The present application claims the benefit of US Provisional Patent Application Ser. No. 61/749,314, filed Jan. 5, 2013, US Provisional Patent Application Ser. No. 61/749,315, filed Jan. 5, 2013, US Provisional Patent Application Ser. No. 61/749,316, filed Jan. 5, 2013, US Provisional Patent Application Ser. No. 61/749,317, filed Jan. 5, 2013, and US Provisional Patent Application Ser. No. 61/749,382, filed Jan. 6, 2013, and is related to U.S. Provisional Patent Application Ser. No. 61/923,755, filed Jan. 5, 2014 each of the forgoing patent applications being hereby expressly incorporated by reference in their entirety.

FIELD

The present application relates to image capture and generation methods and apparatus and, more particularly, to methods and apparatus related to camera apparatus including multiple optical chains or which processes the output of multiple optical chains.

BACKGROUND

High quality digital cameras have to a large extent replaced film cameras. However, like film cameras, with digital cameras much attention has been placed by the camera industry on the size and quality of lenses which are used on the camera. Individuals seeking to take quality photographs are often encouraged to invest in large bulky and often costly lenses for a variety of reasons. Among the reasons for using large aperture lenses is their ability to capture a large amount of light in a given time period as compared to smaller aperture lenses. Telephoto lenses tend to be large not only because of their large apertures but also because of their long focal lengths. Generally, the longer the focal length, the larger the lens. A long focal length gives the photographer the ability to take pictures from far away.

In the quest for high quality photos, the amount of light which can be captured is often important to the final image quality. Having a large aperture lens allows a large amount of light to be captured allowing for shorter exposure times than would be required to capture the same amount of light using a small lens. The use of short exposure times can reduce blurriness especially with regard to images with motion. The ability to capture large amounts of light can also facilitate the taking of quality images even in low light conditions. In addition, using a large aperture lens makes it possible to have artistic effects such as small depth of field for portrait photography.

Large lenses sometimes also offer the opportunity to support mechanical zoom features that allow a user to optically zoom in or out and/or to alter the focal length of the lens which is important for framing a scene without the need to move closer or further from the subject.

While large lenses have many advantages with regard to the ability to capture relatively large amounts of light compared to smaller lenses, support large zoom ranges, and often allow for good control over focus, there are many disadvantages to using large lenses.

Large lenses tend to be heavy requiring relatively strong and often large support structures to keep the various lenses of a camera assembly in alignment. The heavy weight of large lenses makes cameras with such lenses difficult and bulky to transport. Furthermore, cameras with large lenses often need a tripod or other support to be used for extended periods of time given that the sheer weight of a camera with a large lens can become tiresome for an individual to hold in a short amount of time.

In addition to weight and size drawbacks, large lenses also have the disadvantage of being costly. This is because of, among other things, the difficulty in manufacturing large high quality optics and packaging them in a manner in which they will maintain proper alignment over a period of time which may reflect the many years of use a camera lenses is expected to provide.

A great deal of effort has been directed in the camera industry to supporting the use of large camera lenses and packaging them in a way that allows different lenses to be used in an interchangeable manner on a camera body. However, for the vast majority of camera users, the drawbacks to cameras with large lenses means that camera users tend not to use large lenses with such lenses often being left to professionals and/or photo enthusiasts willing to incur the expense and trouble of buying and using large lenses.

In fact, many camera owners who own cameras with large high quality lenses often find themselves taking pictures with small pocket size cameras, often integrated into other devices such as their cell phones, personal digital assistants or the like, simply because they are more convenient to carry. For example, cell phone mounted cameras are often more readily available for use when an unexpected photo opportunity arises or in the case of a general family outing where carrying large bulky camera equipment may be uncomfortable or undesirable.

To frame a given scene from a given point, the focal length (hence size) of the lens depends on the size (area) of the image sensor. The smaller the image sensor, the smaller the focal length and the smaller the lens required. With advances in sensor technology, it is now possible to make small sensors, e.g., 5×7 $mm^2$ sensors, with relatively high pixel count, e.g., 8 megapixels. This has enabled the embedding of relatively high resolution cameras in small devices such as cell phones. The small sensor size (compared to larger cameras such as changeable lens single-lens reflex (SRL) cameras) enables small focal length lenses which are much smaller and lighter than larger focal length lenses required for cameras with larger sensors.

Cell phone mounted cameras and other pocket sized digital cameras sometimes rely on a fixed focal length lens which is also sometimes referred to as a focus-free lens. With such lenses the focus is set at the time of manufacture, and remains fixed. Rather than having a method of determining the correct focusing distance and setting the lens to that focal point, a small aperture fixed-focus lens relies on a large depth of field which is sufficient to produce acceptably sharp images. Many cameras, including those found on most cell phones, with focus free lenses also have relatively small apertures which provide a relatively large depth of field. There are also some high end cell phones that use auto focus cameras.

For a lens of a digital camera to be useful, it needs to be paired with a device which detects the light passing through the lens and converts it to pixel (picture element) values. A megapixel (MP or Mpx) is one million pixels. The term is often used to indicate the number of pixels in an image or to express the number of image sensor elements of a digital camera where each sensor element normally corresponds to one pixel. Multi-color pixels normally include one pixel value for each of the red, green, and blue pixel components.

In digital cameras, the photosensitive electronics used as the light sensing device is often either a charge coupled device (CCD) or a complementary metal oxide semiconductor (CMOS) image sensor, comprising a large number of single sensor elements, each of which records a measured intensity level.

In many digital cameras, the sensor array is covered with a patterned color filter mosaic having red, green, and blue regions in an arrangement. A Bayer filter mosaic is one well known a color filter array (CFA) for arranging RGB color filters on a square grid of photo sensors. Its particular arrangement of color filters is used in many digital image sensors. In such a filter based approach to capturing a color image, each sensor element can record the intensity of a single primary color of light. The camera then will normally interpolate the color information of neighboring sensor elements, through a process sometimes called demosaicing, to create the final image. The sensor elements in a sensor array using a color filter are often called "pixels", even though they only record 1 channel (only red, or green, or blue) of the final color image due to the filter used over the sensor element.

While a filter arrangement over a sensor array can be used to allow different sensor elements to capture different colors of light thus allowing a single sensor to capture a color image, the need to carefully align the filter area with individual pixel size sensor elements complicates the manufacture of sensor arrays as compared to arrays which do not require the use of a multi-color filter array. Furthermore, the fact that multiple colors of light need to pass through the camera lenses to reach the sensor so that the sensor can measure multiple different colors of light means that the lens can not be optimized for a single color of light and that some chromatic aberration is likely to result. Chromatic aberration is a type of distortion in which there is a failure of a lens to focus all colors to the same convergence point. It occurs because lenses have a different refractive index for different wavelengths of light sometimes referred to as the dispersion of the lens. While small focal length lenses paired with relatively high resolution sensors have achieved widespread commercial success in cell phones and pocket cameras, they often leave their owners longing for better picture quality, e.g., picture quality that can only be achieved with a larger pixel area and a larger lens opening to collect more light.

Smaller sensors require smaller focal length lenses (hence smaller lenses) to frame the same scene from the same point. Availability of high pixel count small sensors means that a smaller lens can be used. However, there are a few disadvantages to using smaller sensors and lenses. First, the small pixel size limits the dynamic range of the sensor as only a small amount of light can saturate the sensor. Second, small lenses collect less total light which can result in grainy pictures. Third, small lenses have small maximum apertures which make artistic effects like small depth of field for portrait pictures not possible.

It should be appreciated that it is desirable, from a convenience perspective, for camera devices to be relatively thin. However, for a variety of reasons it is desirable in many cases for an optical chain to have a relatively long optical path before light entering the camera device reaches a sensor. In view of the above it should be appreciated that it would be desirable if the length of an optical path or camera module not be limited to the thickness of a camera. Accordingly, it should be appreciated that there is a need for methods and/or apparatus which would allow an optical path or optical path to be longer than a camera device is thick.

From the above discussion is should be appreciate that there is a need for one or more improved image capture or image processing methods or apparatus which address one or more of the above discussed problems with known image capture devices such as cameras.

SUMMARY OF THE INVENTION

Methods and apparatus which use multiple optical chains to capture multiple images of an area at the same time are described. The multiple captured images may, and in some embodiments are then combined to form a combined image. The combined image in various embodiments is normally of higher quality than would be achieved using just a single one of the optical chains.

The use of multiple optical chains in parallel, in various embodiments, provides many of the benefits associated with use of a large lens and/or large high quality sensor, through the use of multiple optical chains which can normally be implemented using smaller and/or lower cost components than commonly used with a high quality large lens single optical chain camera implementation.

In various embodiments an optical chain includes a combination of elements including one or more lenses and a sensor. The outer lenses of the optical chains in various embodiments have a known relationship, i.e., spacing, between them. This allows for pixels of an image captured by one optical chain to be easily matched to and combined with pixels corresponding to the same scene area captured by one or more of the other optical chains and then processed to generate a combined image from the various images captured by the sensors of the individual optical chains.

In various embodiments since one or more pixel values captured by different sensors are combined to generate a pixel value of the combined image, the number of pixel values in the combined image in one such embodiment will be equal to or less than the number of pixel values in the individual images, captured by different optical chains, corresponding to the same scene area from which the combined image is generated. For example, if three 8 megapixel sensors are used in parallel to capture 3 images which are then used to generate a combined image, the combined image will, in some but not necessarily all embodiments, be of 8 megapixels or less. Thus, unlike the case where images are combined to generate a panoramic view with the panoramic view including more pixels than any individual image used to generate the panoramic image, in some embodiments the combined image is constrained to having the same or fewer pixels than the highest resolution image used as part of the combining process to generate the combined image.

However, when at least some of the images which are combined correspond to different scene areas the number of pixels in the resulting image may be greater than that of an individual sensor since different sensors provide values which contribute to different scene areas. Thus, in embodiments of the present invention where a panoramic or other view is generated from images captured from optical chain modules which capture different scene areas the number of pixels in the image is not limited by the number of pixels in the sensor used by an individual optical chain module.

The methods and apparatus of the invention allow, in some embodiments, different, e.g., relatively low cost, optical chains to be used in parallel to provide many of the benefits of a large lens, e.g., a large light capture area, without the need for a large single large lens and many of the disadvantages associated with a single large lens not only in terms of cost, weight, size and/or other issues.

In some but not all embodiments, short focal length lenses with each lens having a sensor behind are used to capture a plurality of images corresponding to the same scene image area at the same time followed by combining/processing of the images to form one or more images with equal or lower pixel counts than either of the individual captured images.

User control of focus and depth of field in the combined image can, and in some embodiments is, controlled via post image capture processing. While the focus of the individual optical chain modules may be controlled in response to user input at the time of image capture, because multiple images are captured using separate optical chains and a known physical separation between the lenses, the focus point of the combined image generated from images captured in parallel by the multiple optical chains can, and in various embodiments is, controlled by user input used to control how the images are combined after they are captured to produce the combined image.

Various methods and apparatus of the present invention provide some or all of the benefits of using relatively large and/or long lens assemblies without the need for large lens and/or long lens assemblies, through the use of multiple optical chain modules in combination.

While the methods and apparatus support the capture and generation of individual images at point in time, they can also be used to capture video. Thus, while some embodiments are directed to camera devices which capture still images, other embodiments are directed to camera device which do capture video and/or still images using multiple optical chains operating in parallel.

Using the methods and apparatus of the present invention, a handheld camera can provide improved still image and/or video generation results than might be achieved without the use of the methods described herein.

In some embodiments, optical chain modules use relatively short focal length lenses, e.g., of the type commonly used in cell phones, which require relatively little depth (thickness) within a camera as compared to larger lens cameras. This allows for a camera device implemented in accordance with some embodiments to be relatively thin and still provide at least some of the benefits normally provided by much thicker lenses which thus require a greater overall camera thickness than is required by various embodiments described herein.

While use of short focal length lens can have advantages in terms of small lens thickness, the methods and apparatus of the present are not limited to the use of such lenses and can be used with a wide variety of lens types. In addition, while numerous embodiments are directed to autofocus embodiments, fixed focus embodiments are also possible and supported.

An optical chain, in various embodiments, includes a first lens and an image sensor. Additional lenses and/or one or more optical filters may be included between the first lens of an optical chain module and the image sensor depending on the particular embodiment. In some cases there may be one or more optical filters before the first lens.

The use of multiple optical chain modules is well suited for use in devices such as cell phones and/or portable camera devices intended to have a thin form factor, e.g., thin enough to place in a pocket or purse. By using multiple optical chains and then combining the captured images or portions of the captured images to produce a combined image, improved images are produced as compared to the case where a single optical chain module of the same size is used.

While in various embodiments separate image sensors are used for each of the individual optical chain modules, in some embodiments the image sensor of an individual optical chain module is a portion of a CCD or other optical sensor dedicated to the individual optical chain module with different portions of the same sensor serving as the image sensors of different optical chain modules.

In various embodiments, images of a scene area are captured by different optical chain modules and then subsequently combined either by the processor included in the camera device which captured the images or by another device, e.g., a personal or other computer which processes the images captured by the multiple optical chains after offloading from the camera device which captured the images.

While in some embodiments the optical chains extend from the front to the back of the camera, it is desirable that the length of the optical chains in at least some embodiments not be limited by the thickness of the camera device, e.g., cell phone, in which the optical chains are mounted.

In various embodiments light deflection elements such as mirrors and/or prisms are included in optical chains to allow for the direction of the light path of the optical chain to be altered. In at least some such embodiments, mirrors or prisms are used to alter the direction of the optical chain's light paths so that at least some of the side to side space available in a camera device can be used as part of the optical chain.

Numerous configurations for optical chain modules which include light diverting elements are described. In at least some embodiments the light paths corresponding to different optical chains cross inside the camera device before reaching the sensors normally positioned at the end of each optical chain.

Numerous additional features and embodiments are described in the detailed description which follows.

BRIEF DESCRIPTION OF THE DRAWINGS

FIG. 6, which comprises the combination of FIGS. 6A, 6B, and 6C, shows an exemplary combination of lenses and filters used in one exemplary embodiment in which a single color filter is used in at least some of the different optical chain modules.

FIG. 7, which comprises the combination of FIGS. 7A, 7B, and 7C, shows an exemplary combination of lenses and filters used in one exemplary embodiment in which exposures of different duration are used for different optical chain modules and a single color filter is used in at least some of the different optical chain modules.

FIG. 24 is the combination of FIG. 24A and FIG. 24B and shows shows a method of generating a combined image from pixel values generated by multiple optical chain modules operating in parallel.

FIG. 25 illustrates a chart illustrating pixel values being arranged into sets corresponding to different pixel areas in accordance with the method shown in FIG. 24.

FIG. 26 illustrates a chart of captured pixel values with pixel values which will be excluded from use due to there correspondence to a saturation level being indicated through the use of an X.

FIG. 27 illustrates normalized pixel values which may be generated from the values shown in FIG. 26 in accordance with the method of FIG. 24.

FIG. 28 shows combined image pixel values generated from the input pixel values of FIG. 25 using the method of FIG. 24 along with the computation used to produce the illustrated pixel values.

DETAILED DESCRIPTION

Figure 1A:
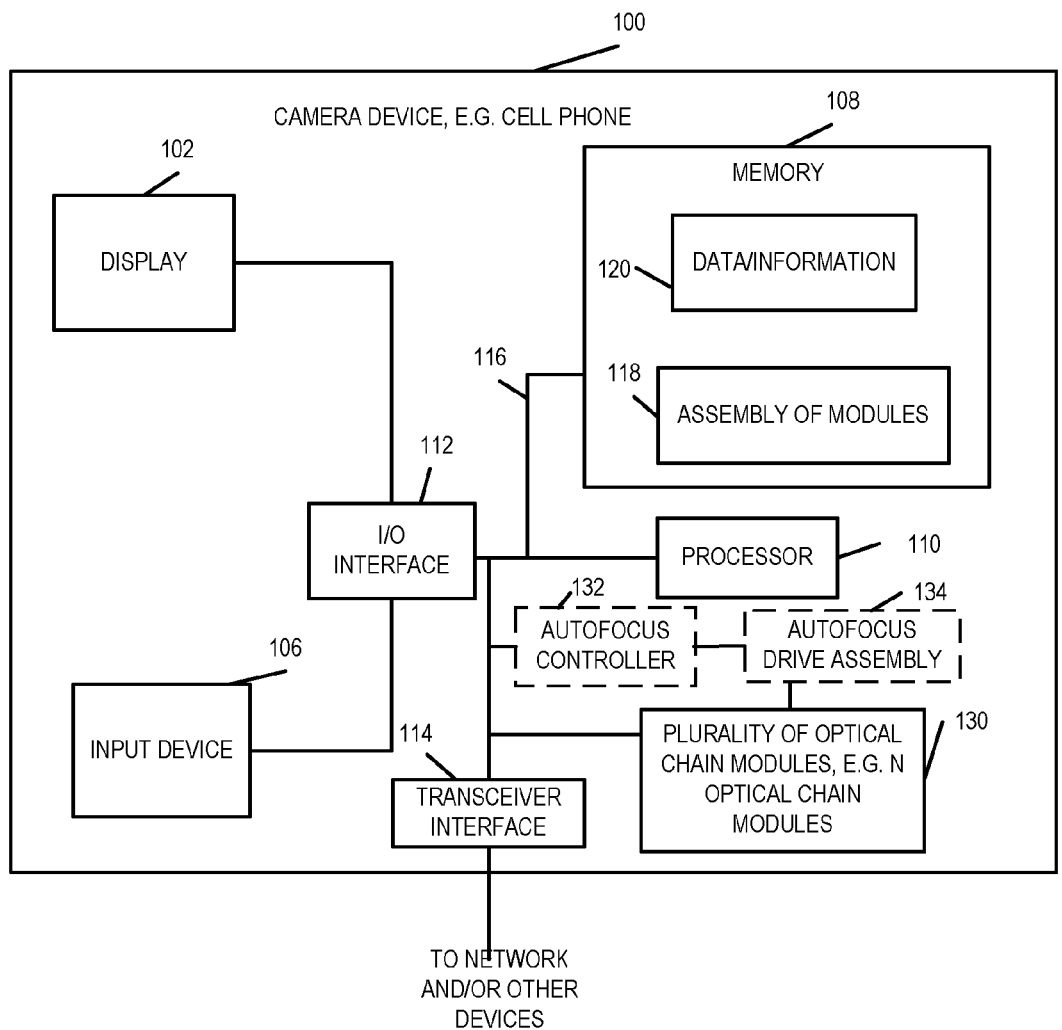
FIG. 1A is an exemplary block diagram of an exemplary apparatus, e.g., camera device, implemented in accordance with one embodiment of the present invention.

FIG. 1A illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1A illustrates the camera device 100 in block diagram form showing the connections between various elements of the apparatus 100. The exemplary camera device 100 includes a display device 102, an input device 106, memory 108, a processor 110, a transceiver interface 114, e.g., a cellular interface, a WIFI interface, or a USB interface, an I/O interface 112, and a bus 116 which are mounted in a housing represented by the rectangular box touched by the line leading to reference number 100. The input device 106 may be, and in some embodiments is, e.g., keypad, touch screen, or similar device that may be used for inputting information, data and/or instructions. The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, a transceiver interface 114, and a plurality of optical chain modules 130, e.g., N optical chain modules. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. Transceiver interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The transceiver interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The transceiver interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1A, various features relating to the plurality of optical chain modules 130 will now be discussed with reference to FIGS. 1B and 1C which show the camera device 100 from front and side perspectives, respectively. Dashed line 101 of FIG. 1 B indicates a cross section line corresponding to the FIG. 1C view.

Box 117 represents a key and indicates that OCM=optical chain module and each L1 represents an outermost lens in an optical chain module. Box 119 represents a key and indicates that S=sensor, F=filter, L=lens, L1 represents an outermost lens in an optical chain module, and L2 represents an inner lens in an optical chain module.

Figure 1B:
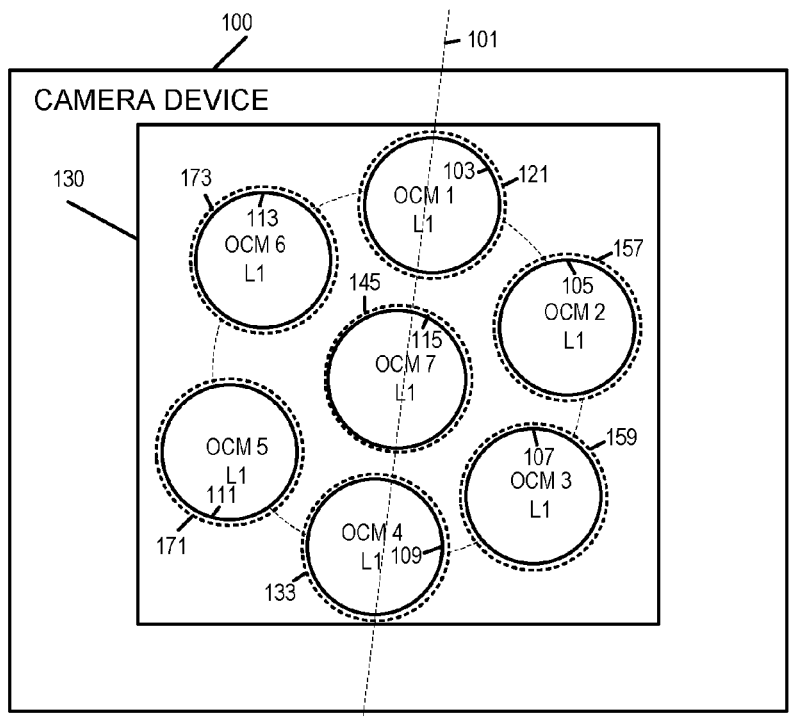
FIG. 1B illustrates a frontal view of an apparatus implemented in accordance with an exemplary embodiment of the present invention which incorporates multiple optical chain modules in accordance with the present invention with lenses which are viewable from the front of the camera.

FIG. 1B shows the front of the camera device 100. Rays of light 131, which is light toward the front of the camera assembly, shown in FIG. 1C may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chain modules 130 is mounted.

Figure 1C:
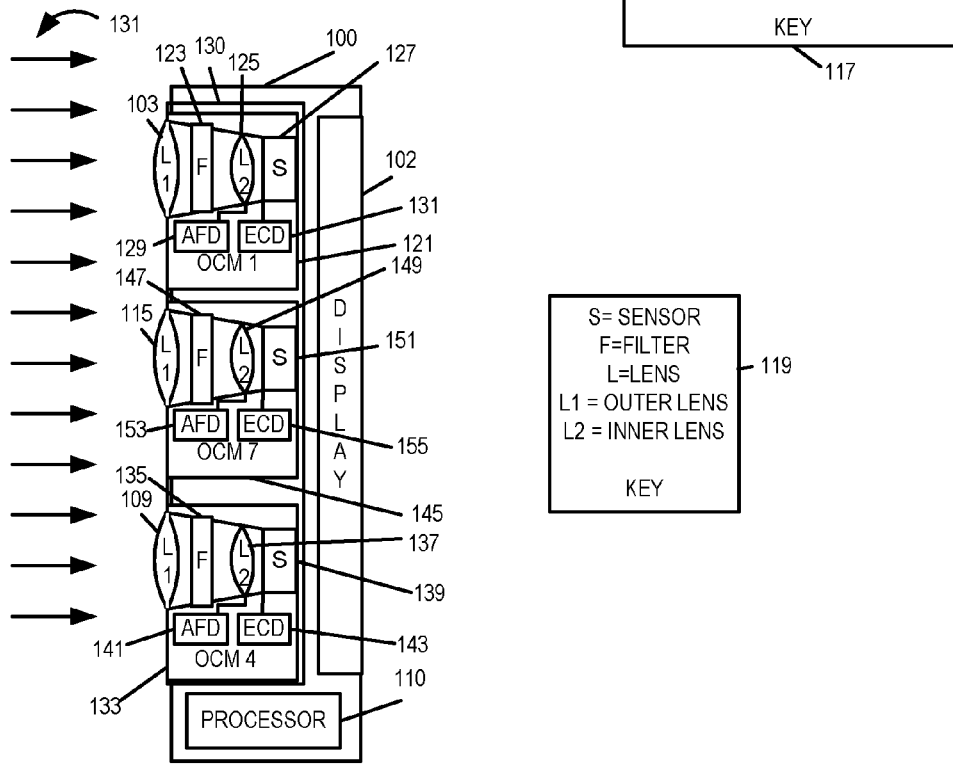
FIG. 1C, which is a side view of the exemplary apparatus of FIG. 1B, illustrates further details of the exemplary apparatus.

FIG. 1C, which shows a side perspective of camera device 100, illustrates three of the seven optical chain modules (OCM 1 121, OCM 7 145, OCM 4 133) of the set of optical chain modules 130, display 102 and processor 110. OCM 1 121 includes an outer lens L1 103, a filter 123, an inner lens L2 125, and a sensor 127. OCM 1 121 further includes autofocus drive (AFD) 129 for controlling the position of lens L2 125, and exposure control device (ECD) 131 for controlling sensor 127. The AFD 129 includes a motor or other drive mechanism which can move the lens (or sensor) to which it is connected. While the AFD 129 is shown coupled, e.g., connected, to the lens L2 125 and thus can move the position of the lens L2 as part of a focus operation, in other embodiments the AFD 129 is coupled to the sensor 127 and moves the position of the sensor 127, e.g., to change the distance between the sensor 127 and the lens 125 as part of a focus operation. OCM 7 145 includes an outer lens L1 115, a filter 147, an inner lens L2 149, and a sensor 151. OCM 7 145 further includes AFD 153 for controlling the position of lens L2 149 and ECD 155 for controlling sensor 151.

OCM 4 133 includes an outer lens L1 109, a filter 135, an inner lens L2 137, and a sensor 139. The AFD 153 includes a motor or other drive mechanism which can move the lens (or sensor) to which it is connected. While the AFD 153 is shown coupled, e.g., connected, to the lens L2 149 and thus can move the position of the lens L2 as part of a focus operation, in other embodiments the AFD 149 is coupled to the sensor 151 and moves the position of the sensor 151, e.g., to change the distance between the sensor 151 and the lens 149 as part of a focus operation.

OCM 4 133 further includes AFD 141 for controlling the position of lens L2 137 and ECD 143 for controlling sensor 139. The AFD 141 includes a motor or other drive mechanism which can move the lens (or sensor) to which it is connected. While the AFD 141 is shown coupled, e.g., connected, to the lens L2 137 and thus can move the position of the lens L2 as part of a focus operation, in other embodiments the AFD 141 is coupled to the sensor 139 and moves the position of the sensor 139, e.g., to change the distance between the sensor 139 and the lens 137 as part of a focus operation.

While only three of the OCMs are shown in FIG. 1C it should be appreciated that the other OCMS of the camera device 100 may, and in some embodiments do, have the same or similar structure. FIG. 1C and the optical chain modules (OCMs), also sometimes referred to as optical camera modules, illustrated therein are illustrative of the general structure of OCMs used in various embodiments. However, as will be discussed in detail below, numerous modifications and particular configurations are possible. Many of the particular configurations will be discussed below with use of reference to the optical camera modules shown in FIG. 1C. While reference to elements of FIG. 1C may be made, it is to be understood that the OCMs in a particular embodiment will be configured as described with regard to the particular embodiment. Thus, for example, the filter may be of a particular color. Similarly, in embodiments where the filter is expressly omitted and described as being omitted or an element which allows all light to pass, while reference may be made to the OCMs of FIG. 1C, it should be appreciated that the filter will be omitted in an embodiment where it is indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1C mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 121, 145, 133, shown in FIG. 1C will have their own optical axis which corresponds to the path light entering the particular OCM will follow as it passes from the lens 103, 115, or 109 at the front of the optical chain and passes through the OCM to the corresponding sensor 127, 151, 139.

While the processor 110 is not shown being coupled to the AFD, ECD and sensors 127, 151, 139 it is to be appreciated that such connections exist and are omitted from FIG. 1C to facilitate the illustration of the configuration of the exemplary OCMs.

As should be appreciated the number and arrangement of lens, filters and/or mirrors can vary depending on the particular embodiment and the arrangement shown in FIG. 1C is intended to be exemplary and to facilitate an understanding of the invention rather than limiting in nature.

The front of the plurality of optical chain modules 130 is visible in FIG. 1B with the outermost lens of each optical chain module appearing as a circle represented using a solid line (OCM 1 L1 103, OCM 2 L1 105, OCM 3 L1 107, OCM 4 L1 109, OCM 5 L1 111, OCM 6 L1 113, OCM 7 L1 115). In the FIG. 1B example, the plurality of optical chain modules 130 include seven optical chain modules, OCM 1 121, OCM 2 157, OCM 3 159, OCM 4 133, OCM 5 171, OCM 6 173, OCM 7 145, which include lenses (OCM 1 L1 103, OCM 2 L1 105, OCM 3 L1 107, OCM 4 L1 109, OCM 5 L1 111, OCM 6 L1 113, OCM 7 L1 115), respectively, represented by the solid circles shown in FIG. 1B. The lenses of the optical chain modules are arranged to form a pattern which is generally circular in the FIG. 1B example when viewed as a unit from the front. While a circular arrangement is preferred in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

Note that the individual outer lenses, in combination, occupy an area that might otherwise have been occupied by a single large lens. Thus, the overall total light capture area corresponding to the multiple lenses of the plurality of chain modules OCM 1 to OCM 7, also sometimes referred to as optical camera modules, approximates that of a lens having a much larger opening but without requiring a single lens having the thickness which would normally be necessitated by the curvature of a single lens occupying the area which the lenses shown in FIG. 1B occupy.

While gaps are shown between the lens openings of the optical chain modules OCM 1 to OCM 7, it should be appreciated that the lenses may be made, and in some embodiments are, made so that they closely fit together minimizing gaps between the lenses represented by the circles formed by solid lines. While seven optical chain modules are shown in FIG. 1B, it should be appreciated that other numbers of optical chain modules are possible.

As will be discussed below, the use of seven optical chain modules provides a wide degree of flexibility in terms of the types of filter combinations and exposure times that can be used for different colors while still providing an optical camera module that can be used to provide an image for purposes of user preview of the image area and selection of a desired focal distance, e.g., by selecting an object in the preview image which is to be the object where the camera modules are to be focused.

For example, in some embodiments, such as the FIG. 6 embodiment, at least some of the different optical chain modules include filters corresponding to a single color thereby allowing capture of a single color at the full resolution of the image sensor, e.g., the sensor does not include a Bayer filter. In one embodiment two optical chain modules are dedicated to capturing red light, two optical chain modules are dedicated to capturing green light and two optical chain modules are dedicated to capturing blue light. The center optical chain module may include a RGB filter or opening which passes all colors with different portions of the sensor of the center optical chain module being covered by different color filters, e.g., a Bayer pattern with the optical chain module being used to capture all three colors making it easy to generate color preview images without having to process the output of multiple optical chain modules to generate a preview image.

The use of multiple optical chains such as shown in the FIG. 1A-1C embodiment has several advantages over the use of a single optical chain.

Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

As should be appreciated, different wavelengths of light will be bent by different amounts by the same lens. This is because the refractive index of glass (or plastic) which the lens is made of changes with wavelength. Dedication of individual optical chains to a particular color allows for the lenses for those optical chains to be designed taking into consideration the refractive index of the specific range of wavelength for that color of light. This can reduce chromatic aberration and simplify lens design. Having multiple optical chains per color also has the advantage of allowing for different exposure times for different optical chains corresponding to a different color. Thus, as will be discussed further below, a greater dynamic range in terms of light intensity can be covered by having different optical chains use different exposure times and then combining the result to form the composite image, e.g., by weighting the pixel values output by the sensors of different optical chains as a function of exposure time when combing the sensed pixel values to generate a composite pixel value for use in a composite image. Given the small size of the optical sensors (pixels) the dynamic range, in terms of light sensitivity, is limited with the sensors becoming easily saturated under bright conditions. By using multiple optical chains corresponding to different exposure times the dark areas can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 1C is a cross section perspective of the camera device 100 shown in FIGS. 1A and 1B. Dashed line 101 in FIG. 1B shows the location within the camera device to which the cross section of FIG. 1C corresponds. From the side cross section, the components of the first, seventh and fourth optical chains are visible.

As illustrated in FIG. 1C despite including multiple optical chains the camera device 100 can be implemented as a relatively thin device, e.g., a device less than 2, 3 or 4 centimeters in thickness in at least some embodiments. Thicker devices are also possible, for example devices with telephoto lenses and are within the scope of the invention, but the thinner versions are particularly well suited for cell phones and/or tablet implementations.

As illustrated in the FIG. 1C diagram, the display device 102 may be placed behind the plurality of optical chain modules 130 with the processor 110, memory and other components being positioned, at least in some embodiments, above or below the display and/or optical chain modules 130. As will be discussed below, and as shown in FIG. 1C, each of the optical chains OCM 1 121, OCM 7 145, OCM 4 133 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters.

In FIG. 1C, each optical chain module includes an auto focus drive (AFD) also sometimes referred to as an auto focus device which can alter the position of the second lens L2, e.g., move it forward or back, as part of a focus operation. An exposure control device (ECD) which controls the light exposure time of the sensor to which the ECD corresponds, is also included in each of the OCMs shown in the FIG. 1C embodiment. The AFD of each optical chain module operates under the control of the autofocus controller 132 which is responsive to user input which identifies the focus distance, e.g., by the user highlighting an object in a preview image to which the focus is to be set. The autofocus controller while shown as a separate element of the device 100 can be implemented as a module stored in memory and executed by processor 110.

Note that while supporting a relatively large light capture area and offering a large amount of flexibility in terms of color filtering and exposure time, the camera device 100 shown in FIG. 1C is relatively thin with a thickness that is much less, e.g., ⅕th, 1/10th, 1/20th or even less than the overall side to side length or even top to bottom length of the camera device visible in FIG. 1B.

Figure 1D:
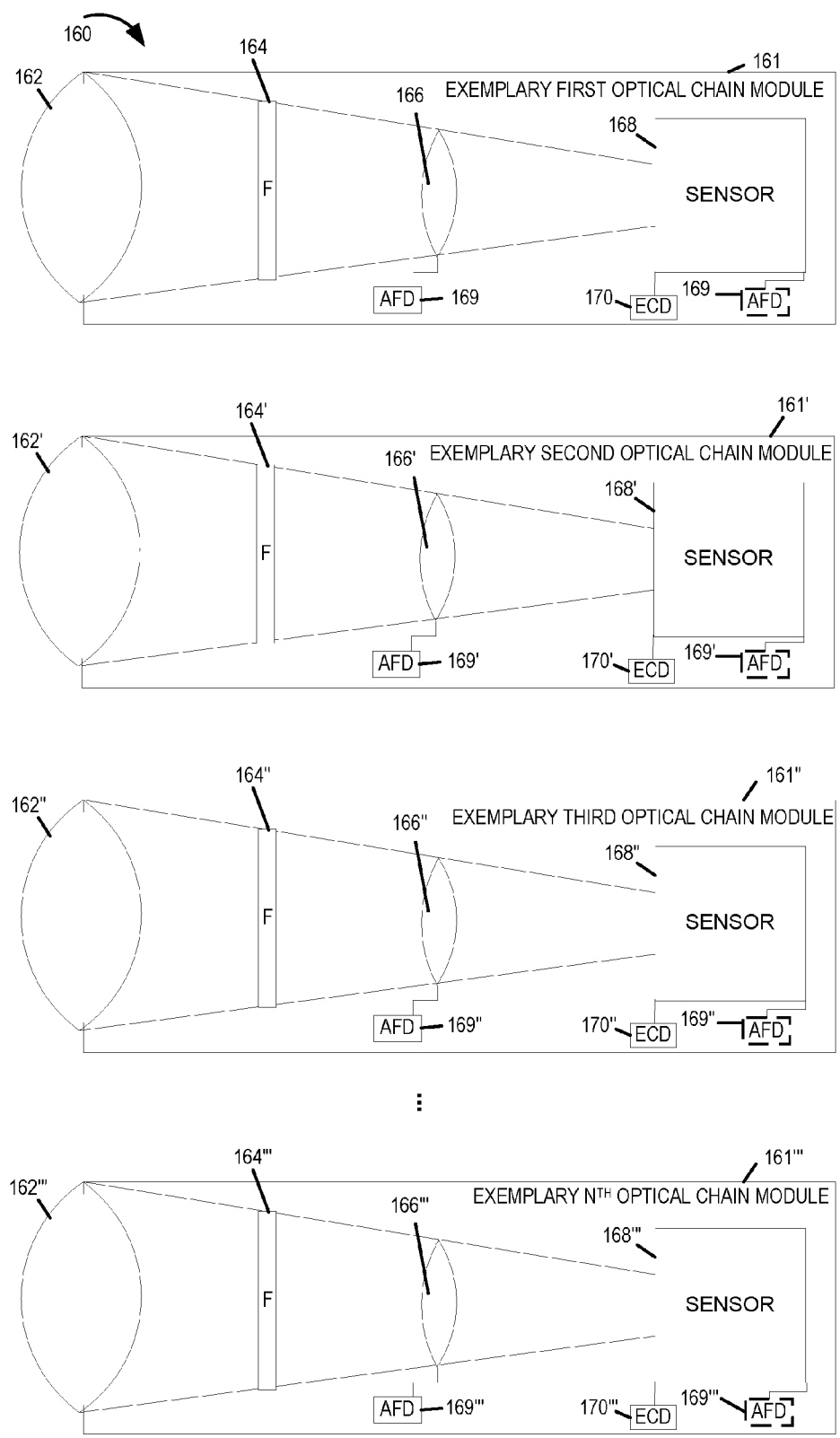
FIG. 1D illustrates a plurality of optical chain modules that can be used in an exemplary device implemented in accordance with the invention.

FIG. 1D illustrates a plurality of optical chain modules 160 that can be used in an exemplary device implemented in accordance with the invention. The optical chain modules (OCMs) shown in FIG. 1D are illustrative of the general structure of OCMs used in various embodiments. However, as will be discussed in detail below, numerous modifications and particular configurations are possible. Many of the particular configurations will be discussed below with use of reference to the optical camera modules shown in FIG. 1D to support the particular exemplary embodiments. While reference to elements of FIG. 1D may and will be made with regard to particular embodiments, it is to be understood that the OCMs in a particular embodiment will be configured as described with regard to the particular embodiment. Thus, for example, in a particular embodiment one or of the OCMS may use filters of a particular color or may even omit the filter 164, 164'. 164" or 164'''. Similarly, in embodiments where the filter is expressly omitted and described as being omitted or an element which allows all light to pass, while reference may be made to the OCMs of FIG. 1D, it should be appreciated that the filter will be omitted in such an embodiment where it is expressly indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1D mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 164, 164', 164". 164''', shown in FIG. 1C will have their own optical axis which corresponds to the path light entering the particular OCM will follow as it passes from the lens 162, 162'. 162", 162''' at the front of the optical chain and passes through the OCM to the corresponding sensor 168, 168', 168", 168'''.

The plurality of optical chain modules 160 includes N exemplary optical chain modules as illustrated in FIG. 1D where N may be any number but usually a number greater than one, and in many cases greater than 2, 6 or even a larger number. The plurality of optical chain modules 160 includes a first optical chain module (OCM) 161, a second optical chain module 161', a third optical chain module 161", ..., and Nth optical chain module 161'''.

Each optical chain module illustrated in FIG. 1D includes many or all of the same elements shown in each optical chain illustrated in FIG. 1C such as, e.g., optical chain module 121. The first exemplary OCM 161 includes an outer lens 162, a filter 164, an inner lens 166, a sensor 168, an auto focus drive (AFD) 169 and an exposure control device (ECD) 170. Each of the other optical chain modules include similar elements as described above with regard to the first OCM 160, with the like elements in each of the other optical chain modules being identified using a prime ('), double prime ("), or triple prime ('''). For example, the exemplary second OCM 161' includes an outer lens 162', a filter 164', an inner lens 166', a sensor 168', an auto focus drive (AFD) 169' and an exposure control device (ECD) 170', the exemplary third OCM 161" includes an outer lens 162", a filter 164", an inner lens 166", a sensor 168", an auto focus drive (AFD) 169" and an exposure control device (ECD) 170" and so on. Similarly, the Nth OCM 161' includes an outer lens 162''', a filter 164''', an inner lens 166''', a sensor 168''', an auto focus drive (AFD) 169''' and an exposure control device (ECD) 170'''. The operation and functionality of each of the OCMs and their elements is the same as or similar the functionality of optical chain modules discussed earlier with respect to FIG. 1C and thus will not be repeated. Note that two versions of the AFD 169, 169', 169" or 169''' are shown in each optical chain module with the AFD connected to a lens being shown using solid lines and an alternative AFD shown using dashed lines being connected to the sensor 168, 168', 168" or 168'''. The AFD shown with dashed lines adjusts the position of the sensor 168. 168', 168" or 168''' to which it is connected as part of an autofocus operation, e.g., moving the sensor forward or backward to alter distance between the sensor and a lens. The AFD shown in solid lines is used in systems where a lens rather than a sensor is moved as part of an AFD operation. In some embodiments the AFD controls the position of a lens and/or sensor in which case the AFD module is connected to both a lens support mechanism or lens and the sensor.

The plurality of optical chain modules 160 of FIG. 1D can be used as, e.g., the plurality of optical modules 130 of the exemplary device 100 or any other device implemented in accordance with the invention. The number and particular configuration of optical chains in the step of optical chains 160 maybe as per various embodiments which will be described in the following detailed description. Accordingly, while a particular embodiment may be described in one more subsequent portions of this application, it is to be understood that the optical chains 160 may be used in such embodiments with the particular configuration of filters, lens, and element supports being as described with respect to the particular exemplary embodiment being discussed.

Figure 2:
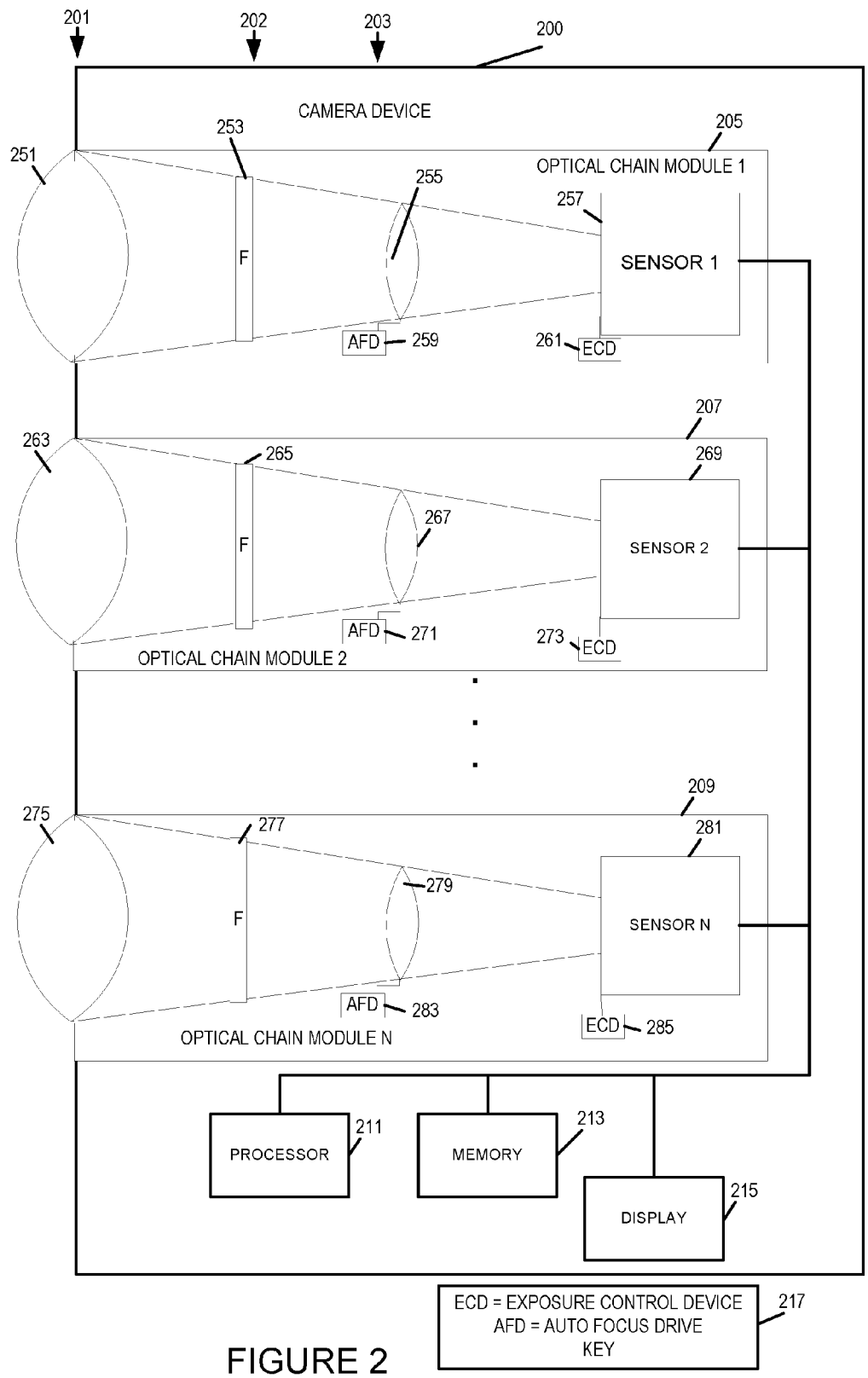
FIG. 2 illustrates a camera device implemented in accordance with one embodiment of the present invention.

FIG. 2 illustrates a camera device 200 implemented in accordance with the invention. The FIG. 2 camera device 200 includes many or all of the same elements shown in the device 100 of FIGS. 1A-1C. Exemplary camera device 200 includes a plurality of optical chain modules (OCM 1 205, OCM 2 207, ..., OCM N 209, a processor 211, memory 213 and a display 215, coupled together. OCM 1 205 includes outer lens L1 251, filter 253, inner lens L2 255, sensor 1 257, AFD 259 and ECD 261. In some embodiments, processor 211 of camera device 200 of FIG. 2 is the same as processor 110 of device 100 of FIG. 1A, memory 213 of device 200 of FIG. 2 is the same as memory 108 of device 100 of FIG. 1A, and display 215 of device 200 of FIG. 2 is the same as display 102 of device 100 of FIG. 1A.

OCM 2 207 includes outer lens L1 263, filter 265, inner lens L2 267, sensor 2 269, AFD 271 and ECD 273. OCM N 209 includes outer lens L1 275, filter 277, inner lens L2 279, sensor N 281, AFD 283 and ECD 285. Box 217, which represents a key, indicates that ECD=exposure control device and AFD=auto focus drive.

In the FIG. 2 embodiment the optical chain modules (optical chain module 1 205, optical chain module 2 207, ..., optical chain module N 209) are shown as independent assemblies with the autofocus drive of each module being a separate AFD element (AFD 259, AFD 271, AFD 283), respectively.

In FIG. 2, the structural relationship between the various lenses and filters which precede the sensor in each optical chain module can be seen more clearly. While three elements, e.g. two lenses (see columns 201 and 203 corresponding to L1 and L2, respectively) and the filter (corresponding to column 202) are shown in FIG. 2 before each sensor, it should be appreciated that a much larger combination of lenses and/or filters may precede the sensor of one or more optical chain modules with anywhere from 2-10 elements being common and an even larger number of elements being used in some embodiments, e.g., high end embodiments and/or embodiments supporting a large number of filter and/or lens options.

In some but not all embodiments, optical chain modules are mounted in the camera device to extend from the front of the camera device towards the back, e.g., with multiple optical chain modules being arranged in parallel. Filters and/or lenses corresponding to different optical chain modules may, and in some embodiments are, arranged in planes extending perpendicular to the front to back direction of the camera device from the bottom of the camera device towards the top of the camera device. While such a mounting arrangement is used in some embodiments, other arrangements where the optical chain modules are arranged at different angles to one another and/or the camera body are possible.

Note that the lenses/filters are arranged in planes or columns in the vertical dimension of the camera device 200 to which reference numbers 201, 202, 203 correspond. The fact that the lenses/filters are aligned along vertical planes allows for a manufacturing and structural simplification that is used in some embodiments. That is, in some embodiments, the lenses and/or filters corresponding to a plane 201, 202, 203 are formed or mounted on a platter or plate. The term platter will be used for discussion purposes but is not intended to be limiting. The platter may take the form of a disc but non-round platters are also contemplated and are well suited for some embodiments. In the case of plastic lenses, the lenses and platter may be molded out of the same material in a single molding operation greatly reducing costs as compared to the need to manufacture and mount separate lenses. As will be discussed further, platter based embodiments allow for relatively simple synchronized focus operations in that a platter may be moved front or back to focus multiple OCMs at the same time. In addition, as will be explained, platters may be moved or rotated, e.g., along a central or non-central axis, to change lenses and or filters corresponding to multiple optical chain modules in a single operation. A single platter may include a combination of lenses and/or filters allowing, e.g., a lens to be replaced with a filter, a filter to be replaced with a lens, a filter or lens to be replaced with an unobstructed opening. As should be appreciated the platter based approach to lens, filter and/or holes allows for a wide range of possible combinations and changes to be made by simple movement of one or more platters. It should also be appreciated that multiple elements may be combined and mounted together on a platter. For example, multiple lenses, filters and/or lens-filter combinations can be assembled and mounted to a platter, e.g., one assembly per optical chain module. The assemblies mounted on the platter for different optical chains may be moved together, e.g., by rotating the platter, moving the platter horizontally or vertically or by moving the platter using some combination of one or more such movements.

While platters have been described as being moved to change elements in an optical chain, they can, and in some embodiments are, moved for image stabilization purposes. For example, a platter having one or more lenses mounted thereon can be moved as part of an image stabilization operation, e.g., to compensate for camera motion.

While mounting of lenses and filters on platters has been discussed, it should also be appreciated that the sensors of multiple optical chains can be mounted on a platter. For example, sensors without color filters may be replaced with sensors with color filters, e.g., Bayer pattern filters. In such an embodiment sensors can be swapped or changed while leaving one or more components of one or more optical chains in place.

Note from a review of FIG. 2 that in some embodiments, e.g., larger focal length telephoto applications, the elements, e.g., filters/lenses closer to the sensor of the optical chain module, are smaller in size than the outer most lenses shown in column 201. As a result of the shrinking size of the lenses/filters, space becomes available between the lenses/filters within the corresponding platter.

Figure 3A:
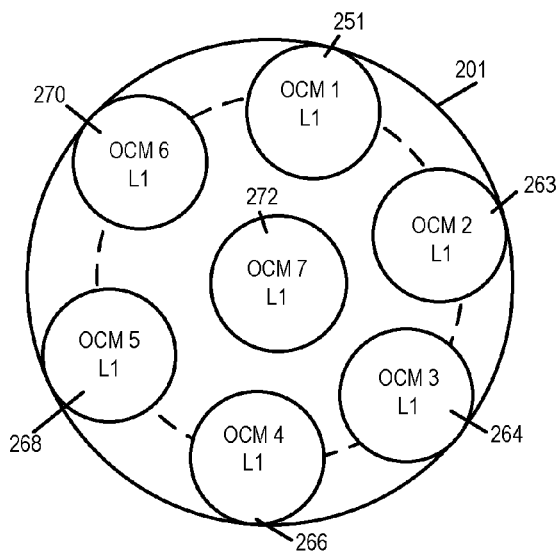
FIG. 3A shows an exemplary lens configuration which may be used for the set of outer lenses of the camera device shown in FIGS. 1A-1C.
Figure 3B:
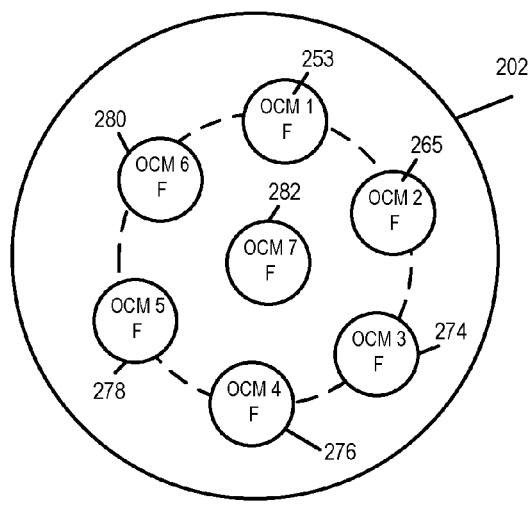
FIG. 3B illustrates an exemplary filter arrangement which is used in the camera of FIGS. 1A-1C in some embodiments.
Figure 3C:
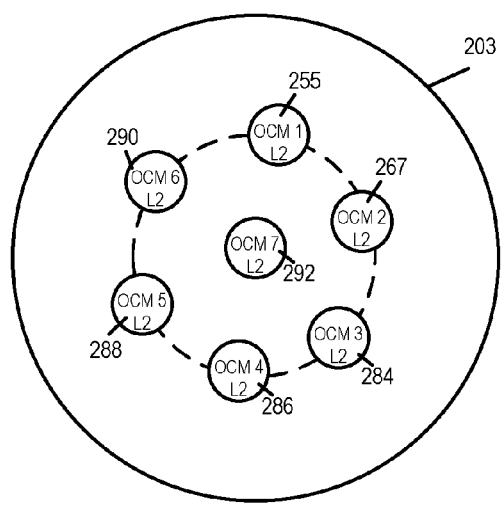
FIG. 3C shows an exemplary inner lens configuration which may, and in some embodiments is, used for a set of inner lenses of the camera device shown in FIGS. 1A-1C.

FIGS. 3A through 3C provide perspective views of the different planes 201, 202, 203 shown in FIG. 2. As shown in FIG. 3A, the outer lenses L1 (OCM 1 L1 251, OCM 2 L1 263, OCM 3 L1 264, OCM 4 L1 266, OCM 5 L1 268, OCM 6 L1 270, OCM 7 L1 272) occupy much of the outer circular area corresponding to the front of the camera modules as previously shown in FIG. 1B. However, as shown in FIG. 3B the filters (OCM 1 F 253, OCM 2 F 265, OCM 3 F 274, OCM 4 F 276, OCM 5 F 278, OCM 6 F 280, OCM 7 F 282) corresponding to plane 202 occupy less space than the lenses shown in FIG. 3A while the inner lenses L2 (OCM 1 L2 255, OCM 2 L2 267, OCM 3 L2 284, OCM 4 L2 286, OCM 5 L2 288, OCM 6 L2 290, OCM 7 L2 292) shown in FIG. 3C occupy even less space. In some embodiments, where N=7, outer lens L1 275, filter F 277, and inner lens L2 279 of FIG. 2 are the same as OCM 7 L1 272 of FIG. 3A, OCM 7 F 282 of FIG. 3B and OCM 7 L2 292 of FIG. 3C, respectively.

The decreasing size of the inner components allow multiple lenses and/or filters to be incorporated into a platter corresponding to one or more of the inner planes. Consider for example that an alternative filter F' or hole could be mounted/drilled below or next two each filter F of a platter corresponding to plan 202 and that by shifting the position or platter vertically, horizontally or a combination of horizontally and vertically, the filter F can be easily and simply replaced with another filter or hole. Similarly the lenses L2 may be replaced by alternative lenses L2' by shifting a platter of lenses corresponding to plane 203. In some embodiments, the platter may also be rotated to support changes. The rotation may be an off center rotation and/or may be performed in combination with one or more other platter position changes.

Figure 4:
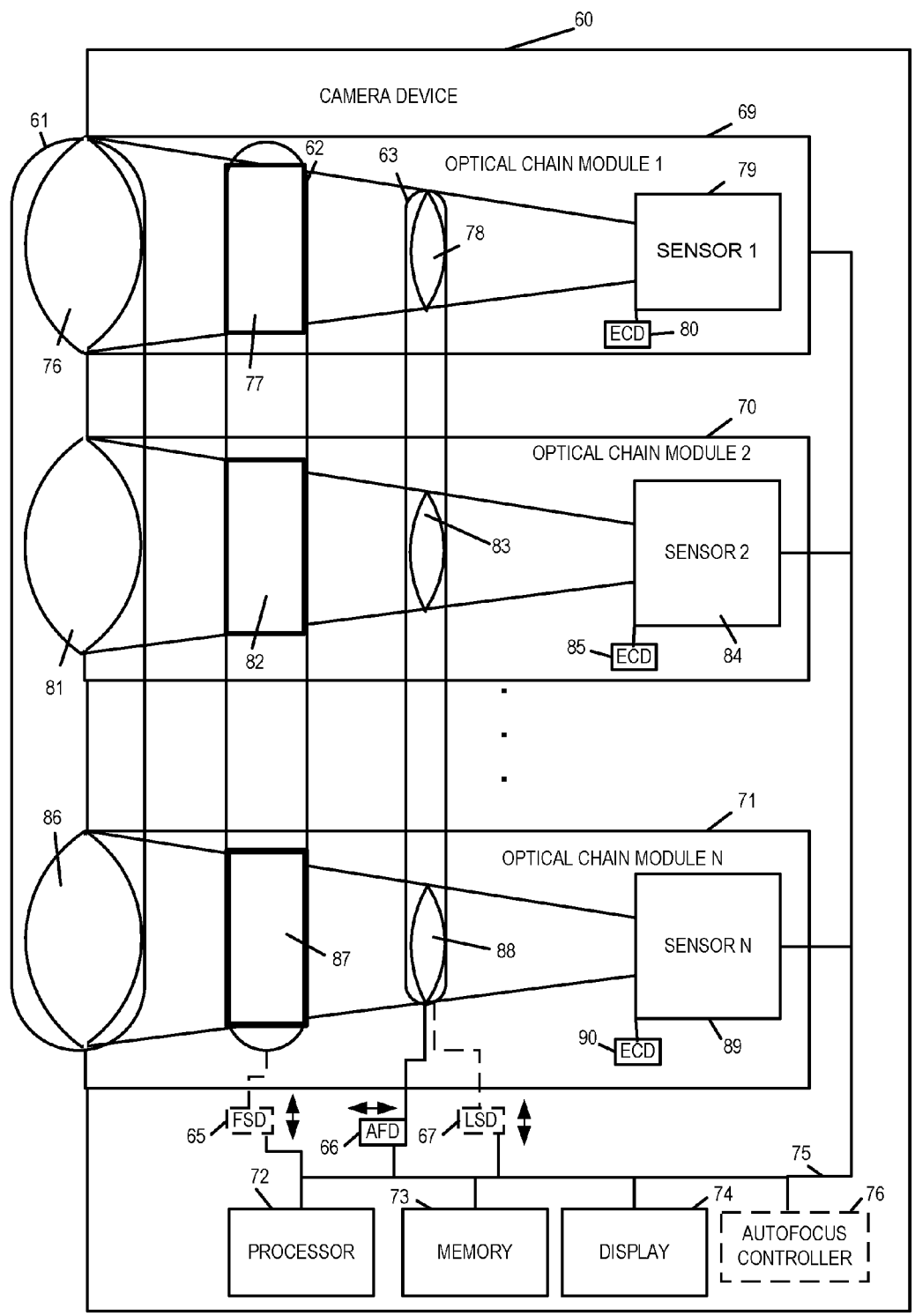
FIG. 4 illustrates an exemplary camera device in which the sets of outer lenses, filters, and inner lenses are mounted on corresponding platters.

A camera device 60 which includes platters of lenses and/or filters (61, 62, 63) is shown in FIG. 4. Camera device 60 includes a plurality of optical chain modules (optical chain module 1 69, optical chain module 2 70, . . . , optical chain module N 71), processor 72, memory 73, and display 74 coupled together via bus 75. In some embodiments, processor 72, memory 73, display 74, and autofocus controller 76 of device 60 of FIG. 4 are the same as processor 110, memory 108, display 102, and autofocus controller 132 of device 100 of FIG. 1A.

Element 61 represents a platter of outer lenses L1 with 3 of the lenses (77, 81, 86) being shown as in the FIG. 1C example. Additional lenses may be, and often are, included on the platter 61 in addition to the ones shown. For example, in a seven optical chain module embodiment such as shown in FIG. 1, platter 61 would include seven outer lenses. Note that the thickness of the platter 61 need not exceed the maximum thicknesses of the lenses and from a side perspective is much thinner than if a single lens having a similar curvature to that of the individual lenses L1, but with the single lens being larger, occupied the same area as all the 7 lenses on the platter 61. Platter 62 includes the filters F, which include the three filters (77, 82, 87) while platter 63 includes the inner lenses L2, which include the three lenses (78, 83, 88). As can be appreciated the camera device 60 is the same as or similar to the camera device of FIG. 1C and FIG. 2 but with the lenses and filters being mounted on platters which may be moved between the front and back of the camera to support autofocus or horizontally and/or vertically to support lens/filter changes.

Auto focus drive 66 is used to move platter 63 forward or backward as part of a focus operation, e.g., under control of the autofocus controller 76 which may be, and often is, included in the camera device 60. A filter shift drive (FSD) 65 is included in embodiments where shifting of the platter 62 is supported as part of a filter change operation. The FSD 65 is responsive to the processor 72 which operates in response to user selection of a particular mode of operation and/or an automatically selected mode of operation and can move the platter 62 vertically, horizontally or in some combination of vertical and horizontal motion to implement a filter change operation. The FSD 62 may be implemented with a motor and mechanical linkage to the platter 62. In some embodiments, the platter 62 may also be rotated to support changes. The rotation may be an off center rotation and/or may be performed in combination with one or more other platter position changes.

A lens shift drive (LSD) 67 is included in embodiments where shifting of the platter 63 is supported as part of a filter change operation. The LSD 67 is responsive to the processor 72 which operates in response to user selection of a particular mode of operation and/or an automatically selected mode of operation and can move the platter 63 vertically, horizontally or in some combination of vertical and horizontal motion to implement a lens change operation. The LSD 67 may be implemented with a motor and mechanical linkage to the platter 63. In some embodiments, the platter 63 may also be rotated to support changes. The rotation may be an off center rotation and/or may be performed in combination with one or more other platter position changes.

Figure 5A:
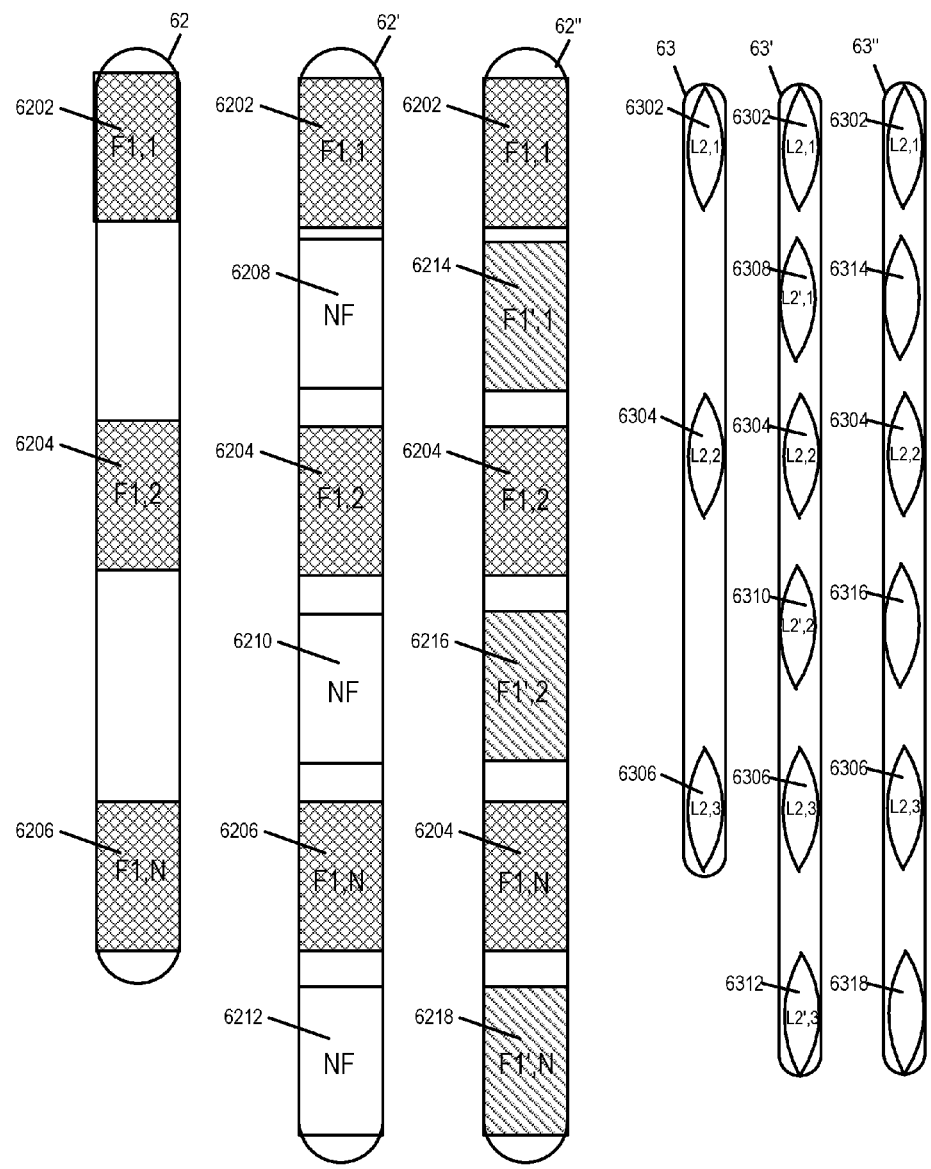
FIG. 5A illustrates various filter and lens platters that may be used in the camera device shown in FIG. 4 depending on the particular embodiment.
Figure 5B:
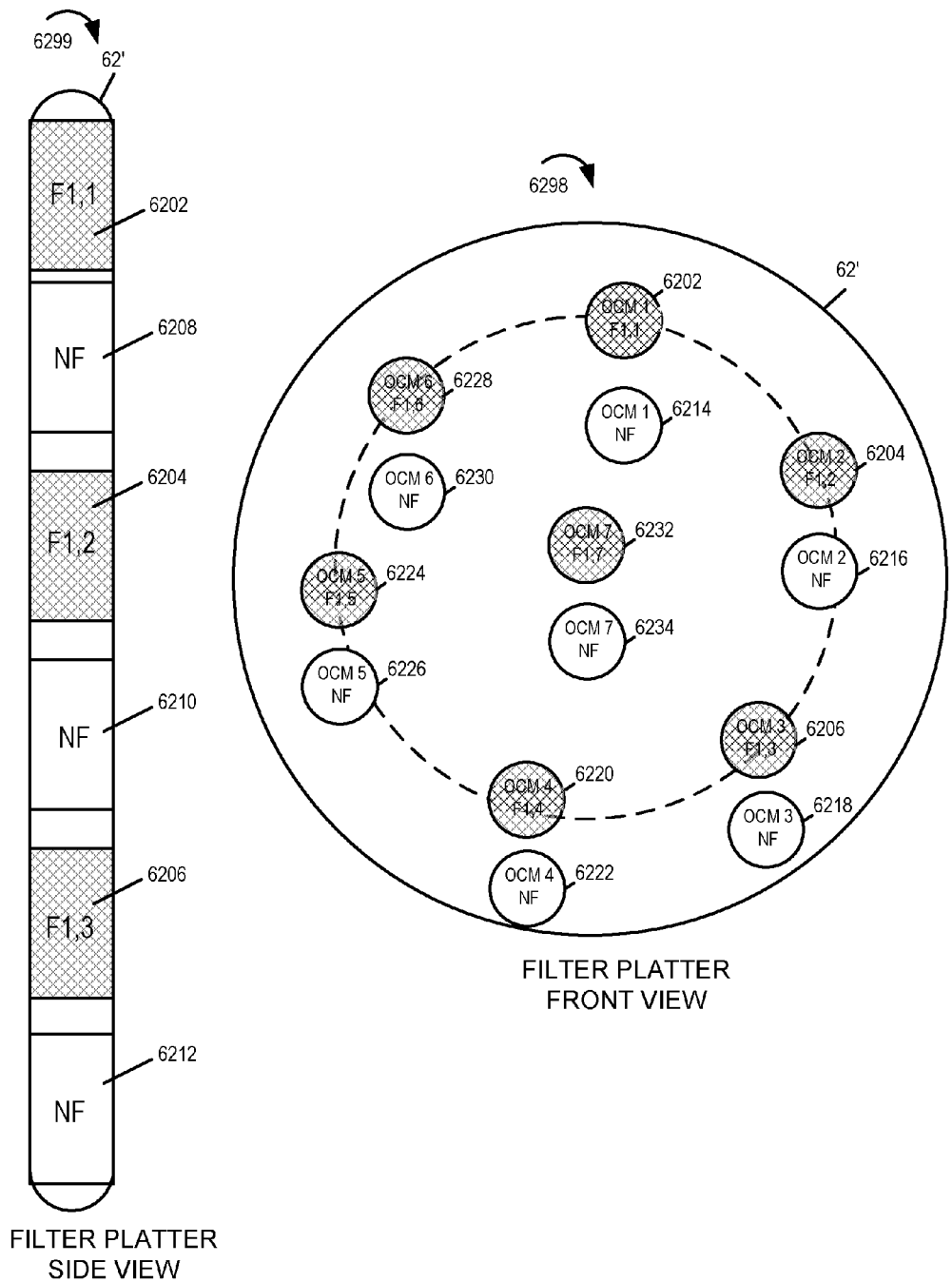
FIG. 5B illustrates the filter platter arrangement shown in FIG. 5A when viewed from the side and when viewed from the front.

FIG. 5A illustrates various exemplary platters that can, and in some embodiments are, used as the filter platter and/or inner lens platter in the camera device 60 of FIG. 4. In the FIG. 5A example N is three (3) but other values of N are possible depending on the embodiment. FIG. 5B shows the exemplary lens platter 62' of FIG. 5A when viewed from the side, drawing 6299, and from the front, drawing 6298.

Platter 62 represents a platter with a single set of filters F1,1 6202 corresponding to OCM1, F1,2 6204 corresponding to OCM 2 and F1,3 6206 corresponding to OCM 3.

Platter 62' represents an alternative platter that can, and in some embodiments is, used in place of platter 62. NF is use to represent a hole or No Filter (NF) area of the platter 62'. As should be appreciated by simply shifting platter 62' vertically the filters F1 (F1,1 6202, F1,2 6204, F1, 3 6206) can be replaced by holes (NF 6208, NF 6210, NF 6212), respectively, thereby removing the color or other types of filters previously included in the optical chain modules.

Platter 62" of FIG. 5A represents a platter which includes alternative filters F1' (F1', 1 6214, F1', 2 6216, F1' 3 6206) which can be switched for the filters F1 (F1, 1 6202, F1,2 6204, F1,3 6206), respectively, by moving the platter 62" vertically. Thus platter 62" is used to show how filters can be switched for other filters by simple movement of a platter while platter 62' shows how filters can be removed from the optical paths included in a plurality of optical chain modules by shifting of the platter on which a set of filters are mounted.

With regard to drawing 6298 of FIG. 5B, as should be appreciated by simply shifting platter 62' vertically the filters F1 (F1,1 6202, F1,2 6204, F1, 3 6206, F1,4 6220, F1, 5 6224, F1, 6 6228, F1, 7 6232) can be replaced by holes (NF 6208, NF 6210, NF 6212, NF 6222, NF 6226, NF 6230, NF 6234), respectively, thereby removing the color or other types of filters previously included in the optical chain modules.

Lens platter 63 shows a platter of inner lenses L2 (L2,1 6302, L2,2 6304, L2,3 6306) corresponding to first, second and third optical camera modules. Lens platter 63' is an alternative platter which shows how alternative lenses L2' (L2',1 6308, L2',2 6310, L2',3 6312) can be included on a lens platter and easily swapped for the lenses L2 (L2,1 6302, L2,2 6304, L2,3 6306), respectively, by simple movement of the platter 63' vertically or horizontally. Lens platter 63" is used to show that a lens platter may include holes (6314, 6316, 6318) as an alternative to alternative lenses. Any of lens platters 63, 63' or 63" could be used in the camera device 60 shown in FIG. 4. While two lens sets are included in platter 63', multiple lens and/or hole combinations, e.g., 2, 3 or more, may be included in a single platter. Similarly a large number of alternative filter, hole alternatives may be supported in a single filter platter. A platter can also have combinations of lenses, filters and holes and filters could be swapped for lenses or holes.

As should be appreciated given the larger number of lens/filter combinations that can be supported through the use of platters, a single camera device including a number of optical chain modules may support a large number of alternative modes of operation.

It should be appreciated that the exposure control of various optical chain modules may be varied along with the filters and/or lenses used at any given point in time allowing for a wide degree of flexibility and control over the images captured at any given point in time.

FIGS. 6A, 6B and 6C correspond to one particular filter lens combination used in some embodiments.

FIG. 6A shows the use of 7 optical chain modules at plane 201 (the outer lens plane corresponding to lenses L1) as viewed from the front of the camera device. FIG. 6A shows optical chain module L1 lenses (OCM 1 L1 6402, OCM 2 L1 6404, OCM 3 L1 6406, OCM 4 L1 6408, OCM 5 L1 6410, OCM 6 L1 6412, OCM 7 L1 6414). FIG. 6C shows the inner lens plane 203. FIG. 6C shows optical chain module L2 lenses (OCM 1 L2 6602, OCM 2 L2 6604, OCM 3 L2 6606, OCM 4 L2 6608, OCM 5 L2 6610, OCM 6 L2 6612, OCM 7 L2 6614). The configuration shown in FIGS. 6A and 6C is the same or similar to that previously discussed with reference to the FIG. 3 embodiment. FIG. 6B shows a particular color filter arrangement used in some embodiments. The filter arrangement shown in FIG. 6B may be used at filter plane 202. The filter arrangement shown in FIG. 6B may be used in the set of optical chain modules 130 before the sensors, e.g., between the set of L1 and L2 lenses. However, this position is not required for some embodiments and the user of inner lenses L2 is also not required for some embodiments.

The filter configuration 6002 of FIG. 6B includes single color filters in each of a plurality of optical chain modules, e.g., the six outer optical chain modules (OCM1 to OCM6). Multiple optical chain modules are dedicated to each of the three colors, red (R), green (G) and blue (B). The optical chain modules (OCM1, OCM4) with the red filter (RF), (OCM 1 RF 6502, OCM 4 RF 6508) pass and sense red light. The optical chain modules (OCM 2, OCM 5) with the green filter (GF), OCM 2 GF 6504, OCM 5 GF 6510, pass and sense green light. The optical chain modules (OCM 3, OCM 6) with the blue filter (BF), OCM 3 BF 6506, OCM 6 BF 6512, pass and sense blue light. In various embodiments, there is a single color filter per lens for the outer lenses, e.g., a single color filter corresponding to each of OCM 1-OCM 6. In some such embodiments, there are multiple OCMs per single color, e.g., 2 OCMs for each of Red, Green, and Blue.

By using optical chain modules dedicated to a single color, the optical chains can be optimized for the spectral range corresponding to the particular color to which the chain corresponds. In addition post capture color compensation can be simplified since each of the six outer optical modules capture a single known color. In addition, noise can be averaged between the sensor corresponding to the same color and/or different exposure times can be used for the different OCMs corresponding to an individual color extending the dynamic range of the sensors to cover a range wider than could be captured by a single sensor. In addition different exposure times may be used for different colors to take into consideration particular color biased lighting conditions and/or facilitate the implementation of particular color effects that may be desired. Notably the individual colors are captured at a pixel result in a resolution equal to that of the sensor as opposed to the case where different portions of a single sensor are used to capture different colors, e.g., with each color R, G, B being captured at a resolution ⅓ that of the pixel resolution of the image sensor being used in an optical chain module.

In some embodiments, there is a RGB Multicolor Filter, OCM 7 RGBF 6514, corresponding to OCM 7.

In some embodiments, OCM 7 filter 6514 is a RGB filter, e.g., a Bayer filter.

In some embodiments, an opening which allows all colors to pass is used in place of OCM 7 RGB filter 6514, but the sensor area corresponding to OCM 7 includes R, G, and B filters corresponding to different sensor area portions. In some embodiments, OCM 7 is used for preview.

In various embodiments, the sensors for OCM 1 through OCM 6 have no filters.

While in some embodiments a composite image is generated and displayed as a preview image, in some embodiments to reduce processing time and/or the time required to display a composite image which may be delayed by the time required to combine multiple images, an image captured by a single sensor is displayed as the preview image on the display of the camera device. The multi-colored filter incorporated into the sensor, e.g., Bayer filter, of OCM 7 allows a color image to be captured by a single lens and used as the preview image. While the image may be of lower quality than that which can be generated by creating a composite of the multiple OCMs given the small display size the difference in image quality between the preview image generated from OCM 7 and that of a composite image may not be sufficient to justify the processing, power, and/or time required to generate a composite image for preview purpose. Accordingly, the FIG. 6B filter arrangement provides a great deal of flexibility while being able to support a wide variety of exposure and other image capture related features.

Box 6003 of FIG. 6B identifies that GF=green filter, BF=blue filter, RF=red filter, RGBF=Red, Green, Blue Filter.

The ability to use different exposure times with different optical chain modules is illustrated further with regard to a camera embodiment which will now be discussed with regard to FIGS. 7A, 7B and 7C. The lens configurations of FIGS. 7A and 7C are similar to that shown in FIGS. 6A and 6C. FIG. 7A shows optical chain module L1 lenses (OCM 1 L1 7402, OCM 2 L1 7404, OCM 3 L1 7406, OCM 4 L1 7408, OCM 5 L1 7410, OCM 6 L1 7412, OCM 7 L1 7414), which may be located a plane 201. FIG. 6C shows optical chain module L2 lenses (OCM 1 L2 7602, OCM 2 L2 7604, OCM 3 L2 7606, OCM 4 L2 7608, OCM 5 L2 7610, OCM 6 L2 7612, OCM 7 L2 7614), which may be located at plane 203. The filter arrangement shown in drawing 7002 of FIG. 7B is also the same or similar to that shown in FIG. 6B but in the FIG. 7B example exposure time is also included. While the exposure is controlled by use of the exposure control device in some embodiments the concept can be understood from FIG. 7B. In FIG. 7B SE is used to indicate short exposure, LE is used to indicate long exposure, and ME is used to indicate medium exposure, as indicated by box 7003. Element 7502 indicates that OCM 1 uses a red filter and is controlled for a medium exposure. Element 7504 indicates that OCM 2 uses a green filter and is controlled for a short exposure. Element 7506 indicates that OCM 3 uses a blue filter and is controlled for a short exposure. Element 7508 indicates that OCM 4 uses a red filter and is controlled for a long exposure. Element 7510 indicates that OCM 5 uses a green filter and is controlled for a long exposure. Element 7512 indicates that OCM 6 uses a blue filter and is controlled for a long exposure. Element 7514 indicates that OCM 7 uses a RGB filter, e.g., a Bayer filter, and is controlled for medium exposure.

For the outer OCMs, OCM 1 through OCM 6, there is a single color filter per OCM, and multiple OCMs per color. In various embodiments, the center OCM, OCM 7, is used for preview.

In some embodiments, filters, corresponding to OCM 1 through OCM 7, are included at plane 202. In some embodiments, the filters corresponding to OCM 1 through OCM 6 are included at plane 202; there is an opening at plane 2 corresponding to OCM 7, which allows all the colors to pass; and the sensor area corresponding to OCM 7 includes R, G, and B filters corresponding to different sensor area portions, e.g., the sensor for OCM 7 includes an RGB Bayer filter. In some embodiments, the sensors for OCM 1 through OCM 6 have no filters.

The preview image is generated using the medium exposure optical chain module while the two different optical chain modules corresponding to a given color use different exposures. In this way the short exposure time can be used to reliably capture information corresponding to light (e.g., bright) portions of an image while the long exposure optical chain module can be used to capture information corresponding to the darker portions of an image. As discussed above, the sensed pixel values from the two optical chains can be processed to exclude values generated by saturated sensors and to combine pixel values corresponding to the same image area in a manner weighted according to the exposure duration for pixel value within the acceptable operating range of the optical chain module's sensors.

While different durations can and often are achieved by controlling sensor exposure times, different filters in different optical chain modules may, and are, used to achieve different light exposures in some embodiments.

Figure 8:
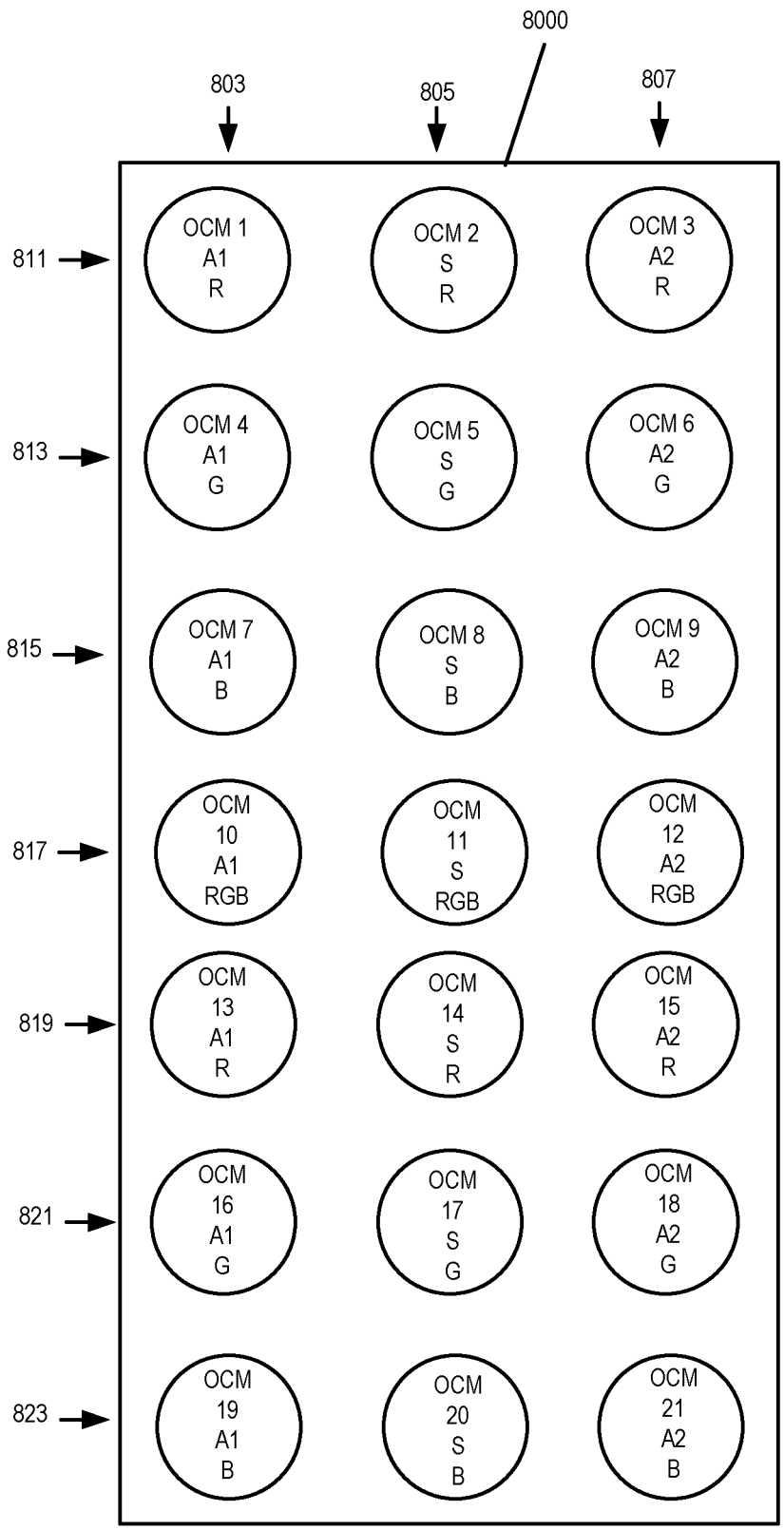
FIG. 8 illustrates an optical chain arrangement used in one panoramic camera embodiment in which multiple optical chains and different lens angles are used to capture images that are well suited for combining into a panoramic image.

FIG. 8, illustrates an optical chain arrangement used in one panoramic camera device 8000 in which multiple optical chains and different lens angles are used to capture images that are well suited for combining into a panoramic image. A1 represents a first non-zero angle, S represents a straight or 0 degree angle, and A2 represents a second non-zero angle. In one embodiment A1 causes the corresponding camera chain module to capture images to the right of the camera, S causes the corresponding camera chain module to capture images straight ahead of the camera, and A2 causes the corresponding camera chain module to capture images to the left the camera, from the perspective of the user behind the camera. In addition to captured images left and right of the camera it should be appreciated that the optical chain modules capture some image portion which is also captured by the adjacent optical chain module. Thus, the OCMs in columns 803, 805 and 807 capture different scenes which, while overlapping, can be stitched together to provide an ultra wide angle panoramic image. The OCMs in each of rows 811, 813, 815, 817, 819, 821, 823 capture different versions of the same scene.

The panoramic camera device 8000 includes multiple optical chain modules corresponding to each of the left, right and center views. Twenty one optical chain modules (seven sets of three) are shown allowing for two optical chain modules per color (R, G, B) plus a seventh multi-color (R, G, B) optical chain module which can be used to support a preview mode of operation. The multi-color optical chain module may include a sensor with a multicolor filter, e.g., a Bayer pattern filter, allowing the single sensor to capture the multiple colors using different portions of the sensor. While the panoramic configuration shown in FIG. 8 is different from that of the non-panoramic camera embodiments previously discussed the exposure control and separate color capture benefits remain the same as those discussed with regard to the other embodiments.

While FIG. 8 illustrates a particular panoramic embodiment, it should be appreciated that embodiments such as those shown in FIGS. 3 and 4 can, and in sometimes are, used to support taking of panoramic pictures. In one such embodiment a prism or angled lens is inserted into one or more optical chain modules, e.g., by rotation, vertical movement, horizontal movement and/or a combination of vertical and horizontal movement of a platter upon which the prism or lens is mounted. The prisms or changes in lens angles change the scene area perceived by one or more optical chain modules allowing the different optical chain modules to capture different views of a scene which can, and in some embodiments are, used to generate a panoramic image, e.g., picture. Thus, camera modules used to capture images corresponding to the same scene which are then combined to generate a combined image can also be used at a different time to capture images corresponding to different views and/or scenes which can then be subsequently combined to form a panoramic image, e.g., photograph.

Accordingly, it should be appreciated that ultra wide angle panoramic images can be generated using multiple optical chain modules of the type previously discussed thereby providing panoramic cameras many of the benefits of large lens without the need for the camera depth, weight and other disadvantages associated with large lenses.

It should be appreciated that because camera chain modules are separated from one another the multi-optical chain module embodiments of the present invention are well suited for stereoscopic image generation and for generating image depth maps. Accordingly the camera devices of the present invention support a wide range of applications and modes of operation and provide significant amounts of image data which can be used to support a wide range of post capture image processing operations.

Having described apparatus and various embodiments, various methods which are supported and used in some embodiments will now be discussed with regard to various flow charts that are included in the present application.

Figure 9:
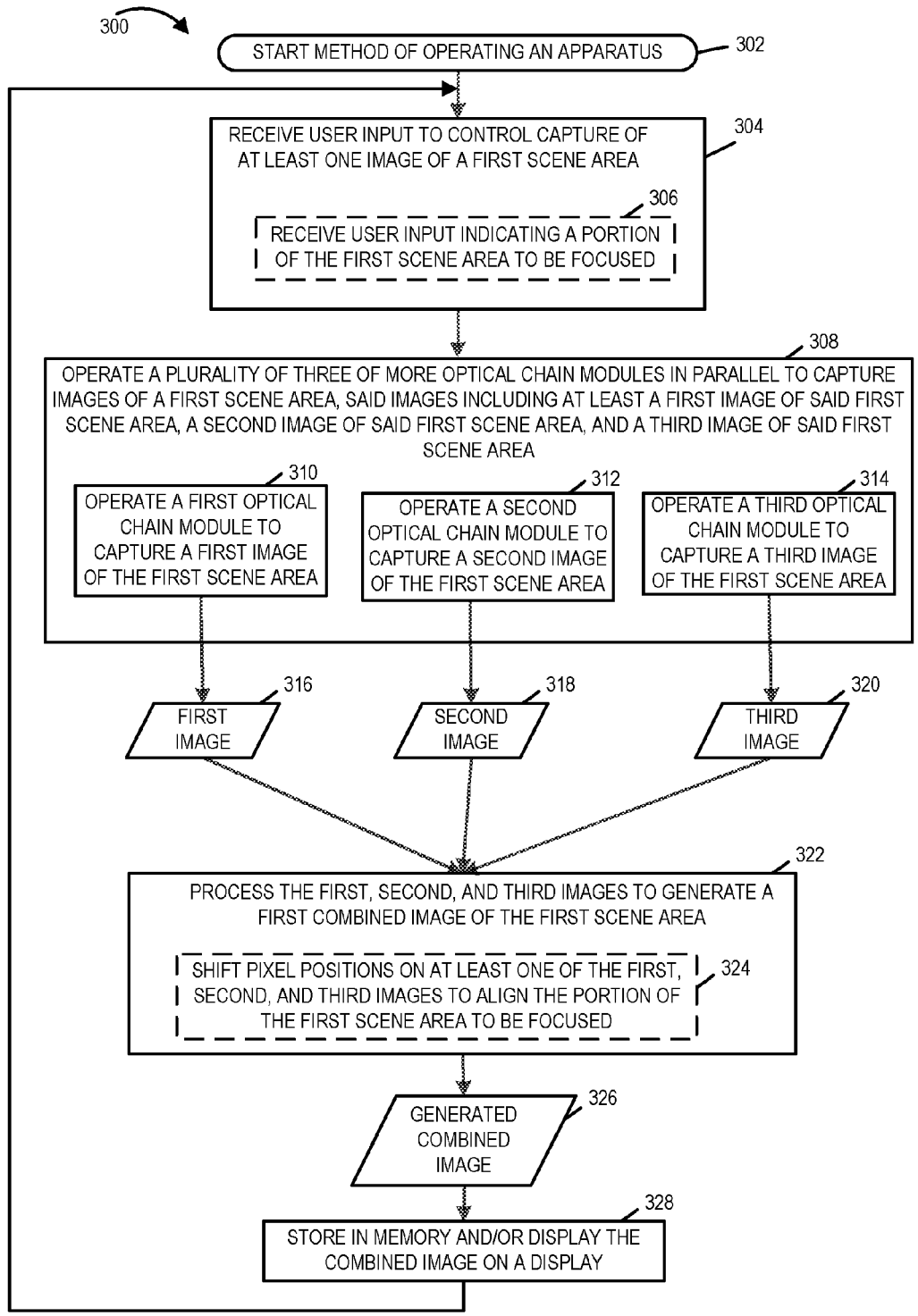
FIG. 9 illustrates an exemplary method of producing at least one image of a first scene area by operating a plurality of optical chain modules in accordance with one embodiment of the present invention.

Method 300 of FIG. 9 illustrates one exemplary method of producing at least one image of a first scene area in accordance with the present invention. The processing steps of the method 300 of FIG. 9 will now be explained in view of the camera device 100 of FIG. 1A.

The method 300 of FIG. 9 starts at start step 302 with the start of the steps of the method being implemented, e.g., on processor 110. Operation proceeds from start step 302 to step 304. In step 304, user input is received to control the capture of at least one image of the first scene area. The user input is received via input device 106 which may be, and in some embodiments is, a button or touch sensitive screen. In optional sub-step 306, the user input may, and in some embodiments does, indicate a portion of the first scene area that is to be focused, e.g., in an image to be captured or a combined image to be generated from two or more captured images. From step 304 processing proceeds to step 308.

In step 308, a plurality of three or more optical chain modules (OCMs), e.g., optical chain modules 130 of FIG. 1A, are operated in parallel to capture images of the first scene area, said images including at least a first image of said first scene area, a second image of said first scene area, and a third image of said first scene area. In some embodiments each one of the first, second and third optical chain modules captures a corresponding one of the first, second and third image respectively. In some embodiments, operating a plurality of three or more optical chain modules in parallel to capture images of the first scene area, said images including at least a first image of said first scene area, a second image of said first scene area, and a third image of said first scene area includes sub-processing steps 310, 312, and 314.

In sub-step 310 a first optical chain module is operated to capture a first image 316 of the first scene area. In most, but not all, embodiments, on capture of the first image 316, the image data and other data such as camera device configuration information associated with the first image is stored in the data/information 120 portion of memory 108 for later processing, output or display. In parallel with the processing of sub-step 310 processing of sub-steps 312 and 314 also occur. In sub-step 312 a second optical chain module is operated to capture a second image 318 of the first scene area. In most, but not all, embodiments on capture of the second image 318, the image data and other data such as camera device configuration information associated with the second image is stored in the data/information 120 portion of memory 108 for later processing, output or display. In sub-step 314 a third optical chain module is operated to capture a third image 320 of the first scene area. In most, but not all, embodiments on capture of the third image 320, the image data and other data such as camera device configuration information associated with the third image is stored in the data/information 120 portion of memory 108 for later processing, output or display. Processing then proceeds from step 308 to step 322.

In some embodiments, each optical chain module of the plurality of optical chain modules includes a lens and the lenses of the plurality of the optical chain modules are arranged along a circle. For example, when there are three optical chain modules, i.e., a first optical chain module, a second optical chain module, and a third optical chain module, the first optical chain module includes a first lens, the second optical chain module includes a second lens, and the third optical chain module includes a third lens. The first, second and third lenses are arranged uniformly along a circle, e.g. on the vertices of an equilateral triangle. In some embodiments the camera device 100 includes a fourth optical chain module including a fourth lens, said fourth lens being positioned in the center of the circle. Each of the first, second, third and fourth lens may be, and in some embodiments of the present invention are, the outer lens of each of their respective optical chain modules and are all positioned in the same plane. More generally, in some embodiments of the present invention, there are a plurality of N optical chain modules each including a lens. N−1 lenses of the plurality of optical chain modules are arranged along a circle with Nth lens being positioned in the center of the circle. FIG. 1B illustrates and example of a camera device 100 with seven optical chain modules which include 7 outer lenses shown as circles, i.e., OCM1, OCM2, OCM3, OCM4, OCM5, OCM6, and OCM7. The outer lens of optical chain modules OCM 1, OCM2, OCM3, OCM4, OCM5, and OCM6 are arranged along a circle and the outer lens of optical chain module OCM7 is positioned in the center of the circle.

In some embodiments of the present invention, the first optical chain module includes in addition to the first lens an image sensor referred to as a first image sensor. In some embodiments of the present invention, the second optical chain module includes an image sensor referred to as a second image sensor. In some embodiments of the present invention, the third optical chain includes an image sensor referred to as a third image sensor. In some embodiments of the present invention the plurality of lenses of the plurality of optical chain modules are mounted in a cell phone housing with the plurality of lenses oriented in the same direction and in the same plane of the housing. For example in the case of three optical chain modules, in some embodiments of the present invention, the first, second and third lenses of the first, second, and third optical chain modules respectively are mounted in a cell phone housing and are oriented in the same direction and in the same plane of the housing.

In step 322, said first, second, and third images are processed by processor 110 to generate a first combined image 326 of said first scene area. In some embodiments, including those embodiments of the present invention in which user input is received indicating a portion of the first scene area to be focused in the combined image, step 322 may, and in some embodiments does, include sub-step 324 wherein pixel positions on at least one of said first, second, and third images is shifted prior to generating said first combined image to align the portion of the first scene to be focused. Processing then proceeds to step 328 where the generated combined image is stored in data/information 120 of memory 108, e.g., for potential later display, output from the camera device, and/or additional processing and/or displayed on display 102 of camera device 100.

In some embodiments, processing step 322 and/or sub-step 324 are performed on an external device such as a computer. In such cases, the first, second and third images are outputted from the camera device 100 via transceiver 114 to the external computer for processing to generate the first combined image 326. The first combined image may then be stored in memory associated with the external device and/or displayed on a display associated with the external computer. In some embodiments of the present invention, the first combined image of the first scene area includes the same or fewer pixel values than either of said first, second or third images.

From step 328 processing proceeds to step 304 where processing continues and the method is repeated.

In some embodiments of the present invention, the size of the diameter of the first, second and third lens of the first, second, and third optical chain modules respectively are the same and the sensors of the first, second and third optical chain modules have the same number of pixels. In other embodiments of the present invention, one or more optical chain modules may, and in some embodiments do, have lenses with different diameter sizes and/or sensors with different numbers of pixels. In some embodiments of the present invention, the first, second and third lenses of the first, second and third optical chain modules respectively, are less than 2 cm in diameter and each of the first, second and third image sensors of the first, second and third optical chain modules support at least 8 Mpixels. In some embodiments of the present invention, the first and second lenses are each less than 2 cm in diameter and each of the first and second image sensors support at least 5 Mpixels. However in many embodiments the image sensors support 8 Mpixels or even more and in some embodiments the lenses are larger than 2 cm. Various combinations of lens and sensors may be used with a variety of lens sizes being used for different optical chains in some embodiments. In addition different optical chains may use lenses with different shapes, e.g., while the lens may be a spherical lens the perimeter of the lens may be cut into one of a variety of shapes. In one embodiment, lenses of different optical chain modules are shaped and arranged to minimize gaps between lenses. Such an approach can have the advantage of resulting in a smoother blur with regard to portions of captured images which are out of focus when combining images captured by different optical chain modules and result in an overall image which more closely approximates what might be expected had a single large lens been used to capture the scene shown in the combined image.

In accordance with some aspects of the present invention, the diameter size and arrangement of the lenses of the plurality of optical modules may and do vary. Similarly the number of pixels supported by the sensors of each of the plurality of optical modules may also vary for example depending on the desired resolution of the optical chain module.

In some embodiments, different shifts are used for different portions of the scene to create a single composite image. In some embodiments, the generated combined image is a panoramic image.

In various embodiments, the optical chain modules are independently focused to the same focal distance. In some embodiments, the optical chain modules are focused together. In some such embodiments, the optical chain modules are focused together by moving a platter on which lenses corresponding to different optical chains are mounted.

Figure 10:
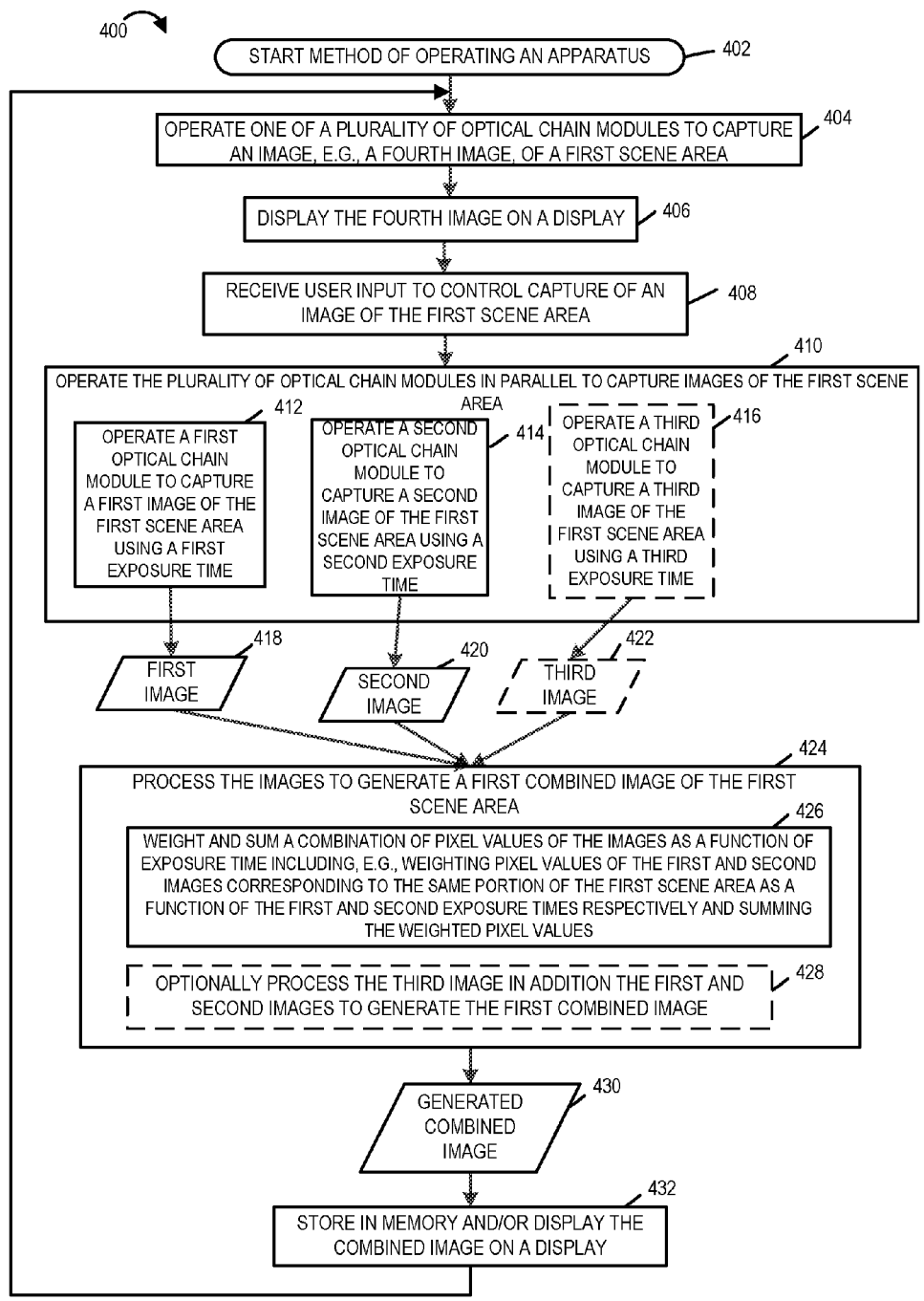
FIG. 10 illustrates an exemplary method of producing at least one image of a first scene area with an enhanced sensor dynamic range by operating two or more optical chain modules in accordance with one embodiment of the present invention.

Method 400 of FIG. 10 illustrates an embodiment of a method of producing at least one image of a first scene area in accordance with the present invention. The method 400 achieves enhanced sensor dynamic range by combining images captured through the operation of two or more optical chain modules using different exposure times. The processing steps of the method 400 of FIG. 10 will now be explained in view of the camera device 100 of FIG. 1A. For ease of explanation of the method 400, it will be assumed that the plurality of optical chain module 130 of camera device 100 of FIG. 1A includes two optical chain modules and in some embodiments an optional third optical chain module which will be referred to as a first, second and third optical chain module respectively.

The method 400 of FIG. 10 starts at start step 402 with the start of the steps of the method being implemented, e.g., on processor 110. Operation proceeds from start step 402 to step 404. In step 404, one of a plurality of optical chain modules of the camera device is operated to capture an image which will be referred to herein as a fourth image of the first scene. For example, one of said first, second or optional third optical chain modules may be, and in some embodiments is, operated to capture the fourth image. This fourth image is captured prior to capturing the first, second or third images which will be discussed in connection with step 410 below.

Processing then proceeds to step 406 where the fourth image is displayed on the display 102 of the camera device 100. By displaying the fourth image on the display of the camera device 100 a user can aim the camera device and target the first scene area for which the user wants to capture an image. In some embodiments, the fourth image is also stored in data/information 120 of memory 108. Processing then proceeds from step 406 to step 408.

In step 408, user input is received to control the capture of an image of the first scene area. The user input is received via input device 106 which may be, and in some embodiments is, a button or touch sensitive screen. For example, the user may touch a portion of the touch sensitive screen on which the fourth image is shown to focus the camera on a portion of the scene for which an image is to be captured. From step 408 processing proceeds to step 410 where the plurality of optical chain modules 130 are operated in parallel to capture images of the first scene area.

Step 410 includes sub-steps 412, 414, and optional sub-step 416. In sub-step 412, a first optical chain module is operated to capture a first image 418 of the first scene area using a first exposure time. In sub-step 414, a second optical chain module is operated to capture a second image 420 of the first scene area using a second exposure time, at least said first and said second exposure times being of different duration but overlapping in time. In some embodiments, an optional sub-step 416 is performed wherein a third optical chain module is operated to capture a third image 422 of the first scene area using a third exposure time. In some embodiments, the third exposure time is different than the first and second exposure times. Additional optical chain modules may be, and in some embodiments are, used to capture additional images of the first scene area with the additional optical chain modules using the same or different exposure times as the first, second or third exposure times so as to obtain additional image data for the first scene area. Sub-steps 412, 414, and optional sub-step 416 are performed in parallel so that multiple images of the first scene are captured in parallel with different exposure times. The first, second and optional third captured images may be, and in some embodiments are, stored in data/information 120 of memory section 108 to be available for later use such as for example in later steps of the method for generating a combined image of the first scene area, or for display or outputting of images.

In some embodiments, in step 404 the operation of one of the first, second and third optical chain modules to capture the fourth image of the first scene area uses a fourth exposure time different from said first, second and third exposure times. Once again step 404 occurs prior to the step 410 as the fourth image is displayed on the display 102 so the user can utilize the displayed image to target the scene area to be captured by the first, second and optional third images.

Operation of the method proceeds from step 410 to step 424. In step 424 the captured images, that is the first and second images, are processed to generate a first combined image of the first scene area 430. In those embodiments in which the optional third image was captured optional sub-step 428 is performed wherein the third image in addition to the first and second image is also processed to generate the first combined image of the scene area 430.

In some embodiments step 424 is accomplished using substep 426 wherein said processing of said first and second images and optionally said third image to generate a first combined image of the first scene area includes combining weighted pixel values of said first image, second image, and optional third image.

The weighting of the pixel values may, and in some embodiments is a function of exposure times. Thus, at least in some embodiments, a pixel value of the combined image is generated by weighting and summing a pixel value from each of the first, second and third images, where the pixel value from the first image is weighted according to the first exposure time used to capture the first image, the pixel value from the second image is weighted according the second exposure time used to capture the second image and the pixel value from the third image is weighted according to the third exposure time used to capture the third image.

Operation proceeds from step 424 to step 432. In step 432, the generated first combined image of the first scene area is stored in data/information 120 of memory 108 and/or displayed on the display 102, e.g., touch sensitive display of the camera device 100.

Operation proceeds from step 432 to step 404 where processing continues and the method is repeated.

In some embodiments of the present invention step 424 is performed on an external device such as a computer that is coupled to the camera device 100 via the transceiver interface 114. In such embodiments the first, second and optional third images are transmitted to the external device via the transceiver interface 114 where the step 424 is performed. Step 432 is then typically performed by the external device with the combined image 430 being stored in memory associated with the external device and/or displayed on a display associated with the external device.

Method 400 may be, and in some embodiments is, implemented on a variety of devices including for example, a camera or a mobile device such as a mobile cellular telephone or a tablet.

In some embodiments, at least some of the optical chain modules include single color filters. For example, in one embodiment, the first optical chain module includes a red filter, the second optical chain module includes a green filter, the third optical chain module includes a blue filter. In some such embodiments, at least two optical chain modules are provided for each color for which a single color filter is used. For example in one embodiment, the plurality of optical chains modules include two optical chain modules with a red filter, two optical chain modules with a green filter and two optical chain modules with a blue filter. In some embodiments, different optical chain modules having single color filters corresponding to the same color have different exposure times. In some embodiments, the combined image is generated using captured images of the first scene area from: (i) an optical chain module including a first color filter and a using first exposure time, (ii) an optical chain including a second color filter and using a first exposure time, (iii) an optical chain including a third color filter and using a first exposure time, (iv) an optical chain module including a first color filter and a using second exposure time, (ii) an optical chain including a second color filter and using a second exposure time, (iii) an optical chain including a third color filter and using a second exposure time. In some such embodiments, the first color is red; the second color is green; and the third color is blue; the first exposure time is a short exposure time and the second exposure time is a long exposure time.

In some embodiments, at least some optical chain modules do not include any color filters.

Figure 11:
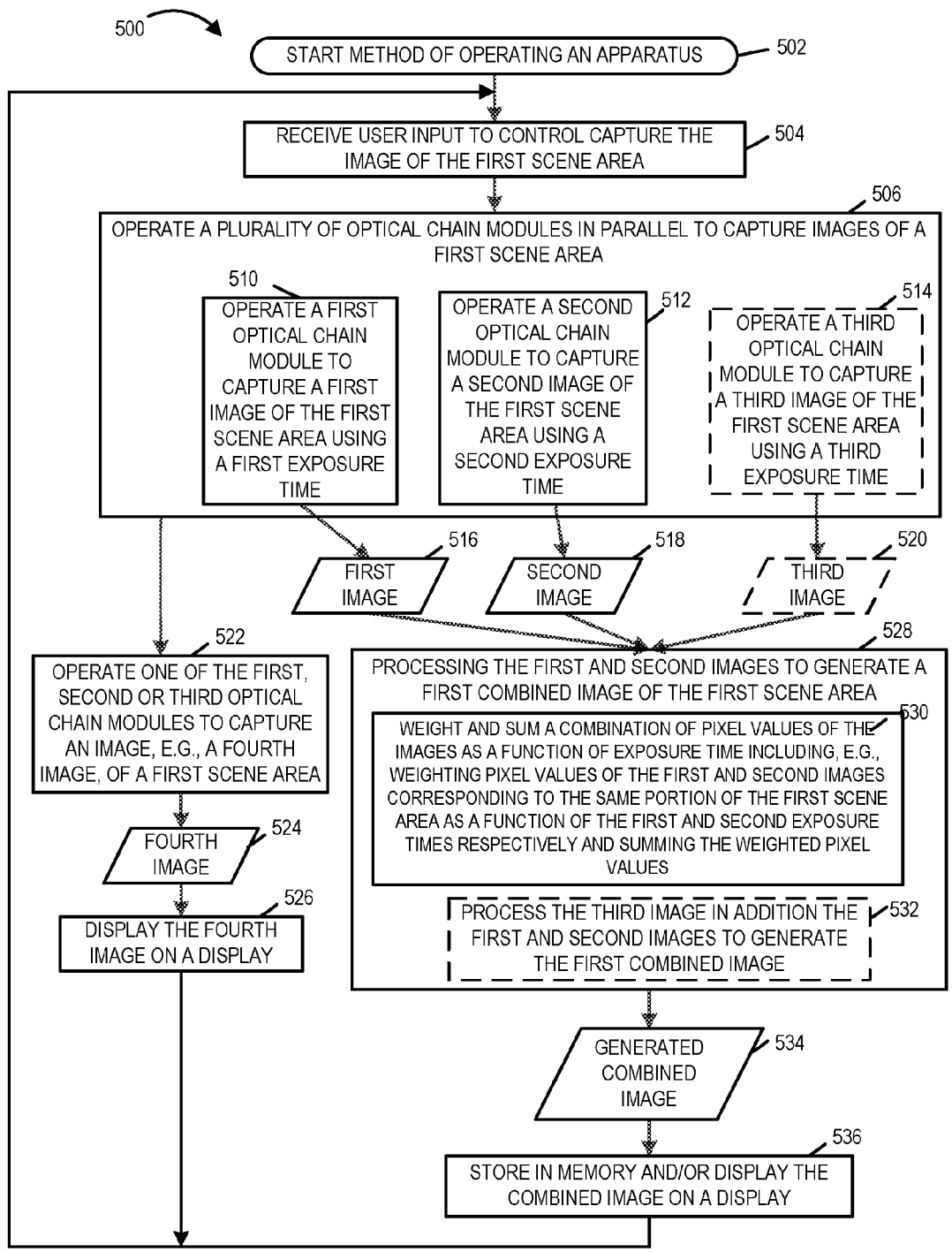
FIG. 11 illustrates an exemplary method of producing at least one image of a first scene area with enhanced sensor dynamic range by operating two or more optical chain modules in accordance with one embodiment of the present invention.

Method 500 of FIG. 11 illustrates an embodiment of a method of producing at least one image of a first scene area in accordance with the present invention. The method 500 achieves enhanced sensor dynamic range by combining images captured through the operation of two or more optical chain modules using different exposure times. The processing steps of the method 500 of FIG. 11 will now be explained in view of the camera device 100 of FIG. 1A. For ease of explanation of the method 500, it will be assumed that the plurality of optical chain module 130 of camera device 100 of FIG. 1A includes two optical chain modules and in some embodiments an optional third optical chain module which will be referred to as a first, second and third optical chain module respectively. Method 500 is similar to method 400 but implements the capture of the fourth image and display of the fourth image after the first, second and third images have been captured. In this way the user of the device is able to see on the display the first scene area that was captured in the first, second and optional third image and which will be processed to generate a combined image.

The method 500 of FIG. 11 starts at start step 502 with the start of the steps of the method being implemented, e.g., on processor 110. Operation proceeds from start step 502 to step 504. In step 504, user input is received to control the capture of the image of the first scene area. The user input is received via input device 106 which may be, and in some embodiments is, a button or touch sensitive screen. From step 504 processing proceeds to step 506 where the plurality of optical chain modules 130 are operated in parallel to capture images of the first scene area.

Step 506 includes sub-steps 510, 512, and optional substep 514. In sub-step 510, a first optical chain module is operated to capture a first image 516 of the first scene area using a first exposure time. In sub-step 512, a second optical chain module is operated to capture a second image 518 of the first scene area using a second exposure time, at least said first and said second exposure times being of different duration but overlapping in time. In some embodiments, an optional sub-step 514 is performed wherein a third optical chain module is operated to capture a third image 520 of the first scene area using a third exposure time. In some embodiments, the third exposure time is different than the first and second exposure times. Additional optical chain modules may be, and in some embodiments are, used to capture additional images of the first scene area with the additional optical chain modules using the same or different exposure times as the first, second or third exposure times so as to obtain additional image data for the first scene area and thereby enhancing the effective sensor dynamic range of the camera device. Substeps 510, 512, and optional sub-step 514 are performed in parallel so that multiple images of the first scene are captured in parallel with different exposure times. The first, second and optional third captured images may be, and in some embodiments are, stored in data/information 120 of memory section 108 to be available for later use such as for example in later steps of the method for generating a combined image of the first scene area, or for display or outputting of the images. Operation proceeds from step 506 to steps 522 and 528.

In step 522, one of said first, second and optional third optical chain modules is operated to capture a fourth image 524 of the first scene area after capturing one of said first, second and third images. While in this particular embodiment the fourth image is captured after the first, second and third images, in some embodiments one of the first, second and third images is used as the fourth image. In some embodiments a fourth exposure time different from said first, second and third exposure times is used to capture the fourth image 524. The fourth image may be, and in some embodiments is stored in data/information 120 of memory 108 for potential later use, output or display. Processing proceeds from step 522 to step 526. In step 526, the fourth image of the first scene area is displayed on display 102 of the camera device, e.g., a touch sensitive screen so that a user of the camera device can see an image of the first scene area that was captured by the first, second and optional third images. Processing proceeds from step 526 to step 504 where processing associated with the method continues as the method is repeated.

Returning to step 528, in step 528 the first and second images are processed to generate a first combined image of the first scene area 534. In those embodiments in which the optional third image was captured optional sub-step 532 is performed wherein the third image in addition to the first and second images is also processed to generate the first combined image of the scene area 534.

In some embodiments step 528 is accomplished using substep 530 wherein said processing of said first and second images and optionally said third image to generate a first combined image of the first scene area includes combining weighted pixel values of said first image, second image, and optional third image. The weighting of the pixel values may, and in some embodiments is a function of exposure times. Thus, at least in some embodiments, a pixel value of the combined image is generated by weighting and summing a pixel value from each of the first, second and third images, where the pixel value from the first image is weighted according to the first exposure time used to capture the first image, the pixel value from the second image is weighted according the second exposure time used to capture the second image and the pixel value from the third image is weighted according to the third exposure time used to capture the third image.

Operation proceeds from step 528 to step 536. In step 536, the generated first combined image of the first scene area is stored in data/information 120 of memory 108 and/or displayed on the display 102, e.g., the touch sensitive display of the camera device 100.

Operation proceeds from step 536 to step 504 where processing continues and the method is repeated.

In some embodiments of the present invention step 528 is performed on an external device such as a computer that is coupled to the camera device 100 via the transceiver interface 114. In such embodiments the first, second and optional third images are transmitted to the external device via the transceiver interface 114 where the step 528 is performed. Step 536 is then typically performed by the external device with the combined image 534 being stored in memory associated with the external device and/or displayed on a display associated with the external device.

Method 500 may be, and in some embodiments, is implemented on a variety of devices including for example, a camera or a mobile device such as a mobile cellular telephone or a tablet.

The use of an external computer to perform some or a part of the processing of the first, second and optional third images allows for the use of computational more complex algorithms as the external computer may be, and in some embodiments does have, a computationally more powerful processing capability than the camera device 100.

In some embodiments, at least some of the optical chain modules include single color filters. For example, in one embodiment, the first optical chain module includes a red filter, the second optical chain module includes a green filter, the third optical chain module includes a blue filter. In some such embodiments, at least two optical chain modules are provided for each color for which a single color filter is used. For example in one embodiment, the plurality of optical chains modules include two optical chain modules with a red filter, two optical chain modules with a green filter and two optical chain modules with a blue filter. In some embodiments, different optical chain modules having single color filters corresponding to the same color have different exposure times. In some embodiments, the combined image is generated using captured images of the first scene area from: (i) an optical chain module including a first color filter and a using first exposure time, (ii) an optical chain including a second color filter and using a first exposure time, (iii) an optical chain including a third color filter and using a first exposure time, (iv) an optical chain module including a first color filter and a using second exposure time, (ii) an optical chain including a second color filter and using a second exposure time, (iii) an optical chain including a third color filter and using a second exposure time. In some such embodiments, the first color is red; the second color is green; and the third color is blue; the first exposure time is a short exposure time and the second exposure time is a long exposure time.

In some embodiments, at least some optical chain modules do not include any color filters. For example, in one particular embodiment, optical chain modules OCM 171 and OCM 173 do not include color filters. However in other embodiments, OCM 171 and OCM 173 each include a color filter.

Figure 12:
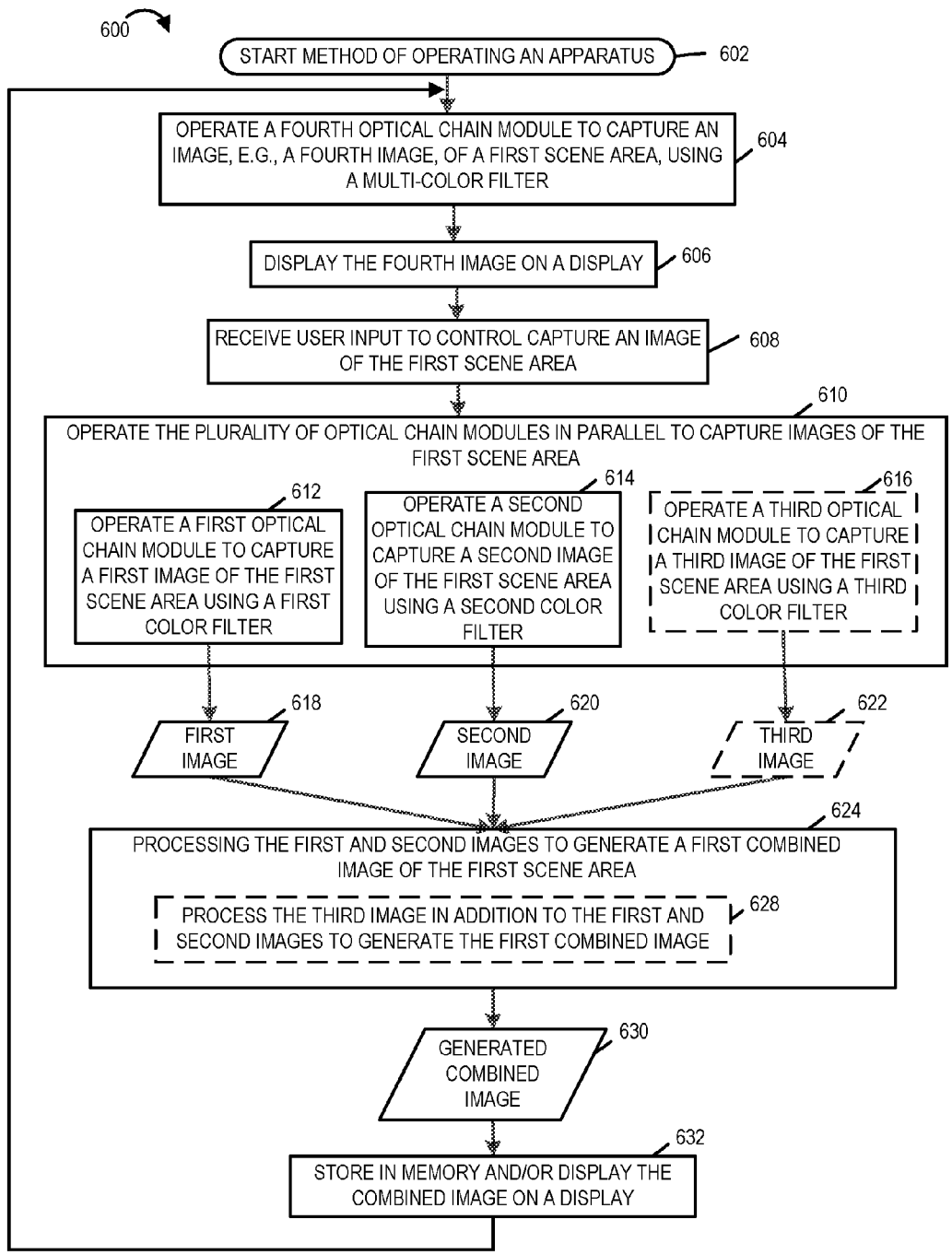
FIG. 12 illustrates an exemplary method of producing at least one image of a first scene area by operating two or more optical chain modules using color filters in accordance with one embodiment of the present invention.

Method 600 of FIG. 12 illustrates an embodiment of a method of producing at least one color image of a first scene area in accordance with the present invention. The method 600 uses color filters in connection with combining two or more images of a first scene area to obtain a color image of the first scene area. The processing steps of the method 600 of FIG. 12 will now be explained in view of the camera device 100 of FIG. 1A. For ease of explanation of the method 600, it will be assumed that the plurality of optical chain module 130 of camera device 100 of FIG. 1A includes two optical chain modules and in some embodiments an optional third and/or fourth optical chain module which will be referred to as a first, second, third and fourth optical chain module respectively.

The method 600 of FIG. 12 starts at start step 602 with the start of the steps of the method being implemented, e.g., on processor 110. Operation proceeds from start step 602 to step 604. In optional step 604, a fourth optical chain module of the camera device is operated to capture an image, e.g., a image referred to herein as a fourth image of a first scene area using a multi-color filter. This fourth image is captured prior to capturing the first, second or third images which will be discussed in connection with step 610 below.

Processing then proceeds to optional step 606 where the fourth image is displayed on the display 102 of the camera device 100. By displaying the fourth image on the display of the camera device 100 a user can aim the camera device and target the first scene area for which the user wants to capture an image. In some embodiments, the fourth image is also stored in data/information 120 of memory 108. Processing then proceeds from step 606 to step 608.

In step 608, user input is received to control the capture of an image of the first scene area. The user input is received via input device 106 which may be, and in some embodiments is, a button or touch sensitive screen. For example, the user may touch a portion of the touch sensitive screen on which the fourth image is shown to focus the camera on a portion of the scene for which an image is to be captured. From step 608 processing proceeds to step 610 where the plurality of optical chain modules 130 are operated in parallel to capture images of the first scene area.

Step 610 includes sub-steps 612, 614, and optional sub-step 616. In sub-step 612, a first optical chain module is operated to capture a first image 618 of the first scene area using a first color filter. In sub-step 614, a second optical chain module is operated to capture a second image 620 of the first scene area using a second color filter, said first and said second color filters corresponding to a first color and a second color respectively. Said first and said second colors being different colors. In some embodiments, said first and second color filters are single color filters which correspond to said first and second colors, respectively. In some embodiments, an optional sub-step 616 is performed wherein a third optical chain module is operated to capture a third image 622 of the first scene area using a third color filter. In some embodiments, the third color filter corresponds to a color that is different from said first and second colors. In some embodiments the third color filter is a single color filter which corresponds to said third color. Additional optical chain modules may be, and in some embodiments are, used to capture additional images of the first scene area with the additional optical chain modules using the same or different color filters as the first, second or third color filters so as to obtain additional image data for the first scene area. Sub-steps 612, 614, and optional sub-step 616 are performed in parallel so that multiple images of the first scene area are captured in parallel with different color filters. The first, second and optional third captured images may be, and in some embodiments are, stored in data/information 120 of memory section 108 to be available for later use such as for example in later steps of the method for generating a combined image of the first scene area, or for display or outputting of images. In some embodiments of the present invention, the first optical chain module includes a first lens and a first image sensor and the second optical module includes a second lens and a second image sensor and the optional third optical chain module includes a third lens and a third image sensor. In some embodiments, said first and said second image sensors are of the same resolution. In some embodiments of the present invention, said optional third image sensor of said third optical chain module has the same resolution as the first and second image sensors. In some embodiments of the present invention, the fourth optical chain module includes a fourth lens and a fourth image sensor. In some embodiments of the present invention the fourth image sensor is of the same resolution as the first and second image sensor. In some embodiments of the present invention, the first, second and third lenses of the first, second and third optical chain modules are arranged in a circle, and the fourth lens of the fourth optical chain is arranged in the center of the circle.

Operation of the method proceeds from step 610 to step 624. In step 624 the captured images, that is the first and second images, are processed to generate a first combined image of the first scene area 630. In those embodiments in which the optional third image was captured optional sub-step 628 is performed wherein the third image in addition to the first and second images is also processed to generate the first combined image of the scene area 630. In some embodiments the fourth image of the first scene area is also processed with the first, second and third images to generate the first combined image of the first scene area.

Operation proceeds from step 624 to step 632. In step 632, the generated first combined image of the first scene area is stored in data/information 120 of memory 108 and/or displayed on the display 102, e.g., a touch sensitive display of the camera device 100.

Operation proceeds from step 632 to step 604 where processing continues and the method is repeated.

In some embodiments of the present invention step 624 is performed on an external device such as a computer that is coupled to the camera device 100 via the transceiver interface 114. In such embodiments the first, second and optional third images are transmitted to the external device via the transceiver interface 114 where the step 624 is performed. Step 632 is then typically performed by the external device with the combined image 630 being stored in memory associated with the external device and/or displayed on a display associated with the external device.

Method 600 may be, and in some embodiments, is implemented on a variety of devices including for example, a camera or a mobile device such as a mobile cellular telephone or a tablet.

In some embodiments of the present invention, each image is presented as it is captured on the display or in the case of a combined image when said image has been generated.

In some embodiments of the present invention, each of the captured images, e.g., the first, second, third, and fourth images may be, and is, displayed on the display 102 of the camera device 100 as it is captured along with one or more combined images that are formed by processing and/or combining the first, second, third and/or fourth images. In some embodiments of the present invention, each of the images may be, is shown, in a separate portion of the display with the size of the image being adjusted so that each image displayed is shown in its entirety. In some embodiments of the present invention, a caption is automatically placed under each image as it displayed on the screen. In some embodiments of the present invention, the caption includes the number of the image or an indication that it is a combined image, e.g., image 1, image 2, image 3, image 4, combined image from image 1, 2, 3, and 4. In some embodiments of the present invention, each image is presented as it is captured on the display or in the case of a combined image when said image has been generated. The images may be arranged in a variety of ways on the display 102 after capture and the aforementioned embodiments are only meant to be exemplary in nature.

In some embodiments of the present invention, the image generated by combining the images captured from two or more of the optical chain modules is displayed for targeting purposes so that the user may provide input to control the capture of the image of the scene area and/or the object in the scene upon which the combined image should be focused.

Figure 13:
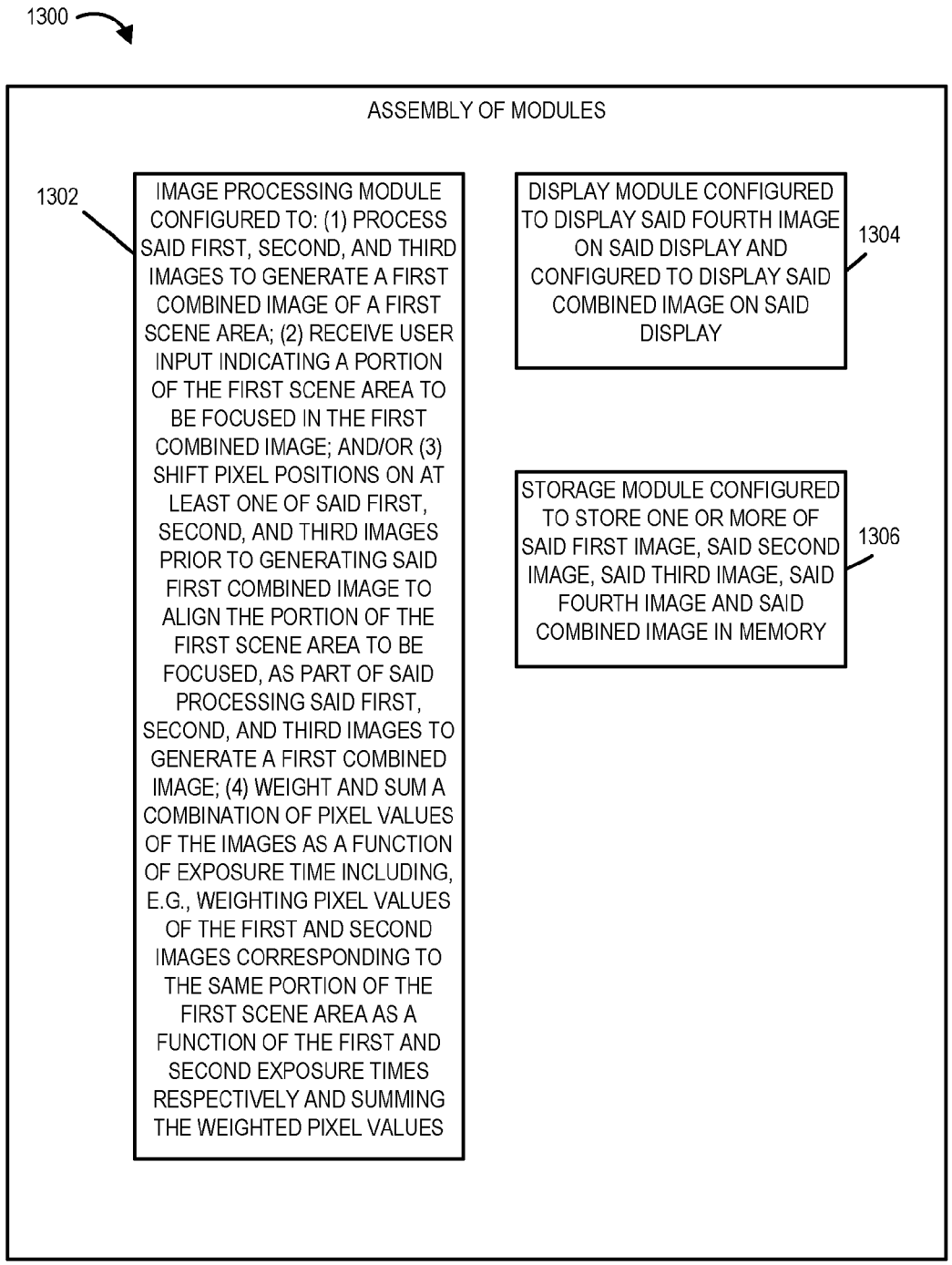
FIG. 13 illustrates an exemplary assembly of modules, which may, and in some embodiments is, part of an apparatus which implements one or more methods of the invention, for performing various image and data processing functions in accordance with one or more exemplary embodiments of the invention.

The FIG. 13 assembly of modules 1300 may, and in some embodiments is, used to process data for example first, second, third and fourth images and associated data, and storing and displaying images. Assembly of modules 1300 may be included in an exemplary apparatus, e.g., a camera device, e.g., camera device 100 of FIG. 1A, camera device 200 of FIG. 2, camera device 60 of FIG. 4, camera device 1500 of FIG. 15, camera device 1605 of FIG. 16, camera device 1705 of FIG. 17, camera device 1801 of FIG. 18, and/or camera device 1905 of FIG. 19, in accordance with an exemplary embodiment.

Figure 15:
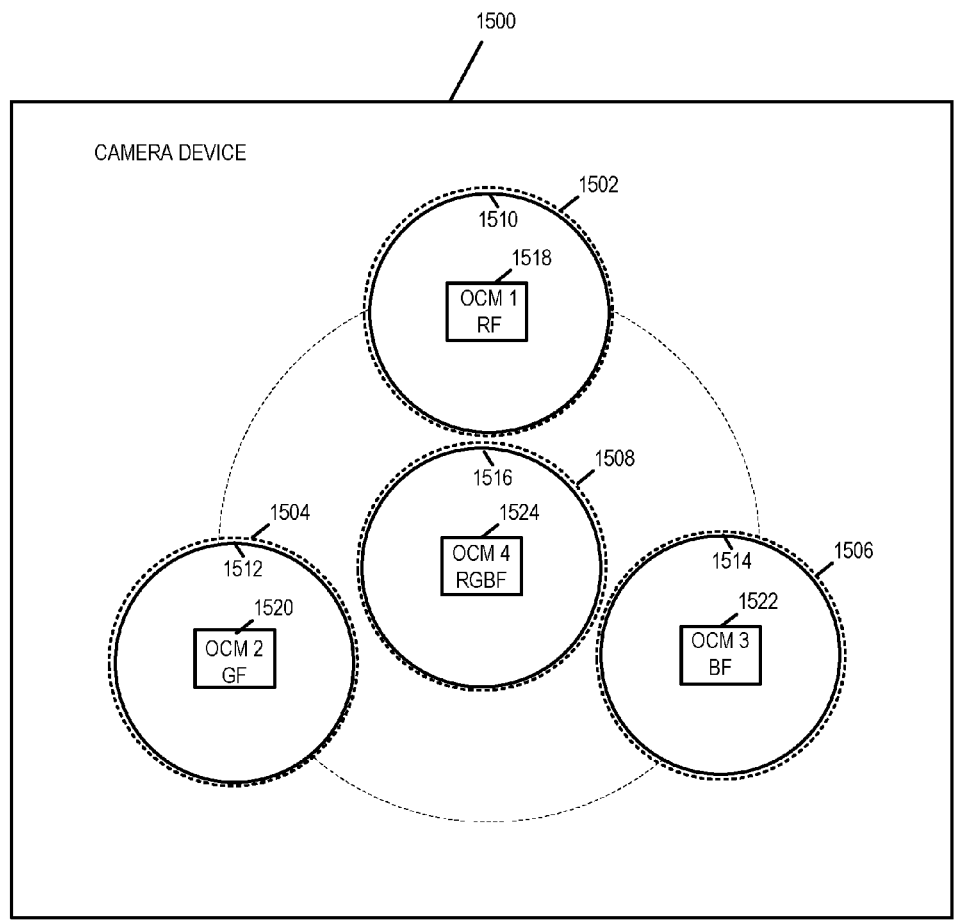
FIG. 15 illustrates a frontal view of an apparatus implemented in accordance with one embodiment of the present invention which incorporates multiple optical chain modules, e.g., one for each of red, green and blue and one for all three colors.
Figure 16:
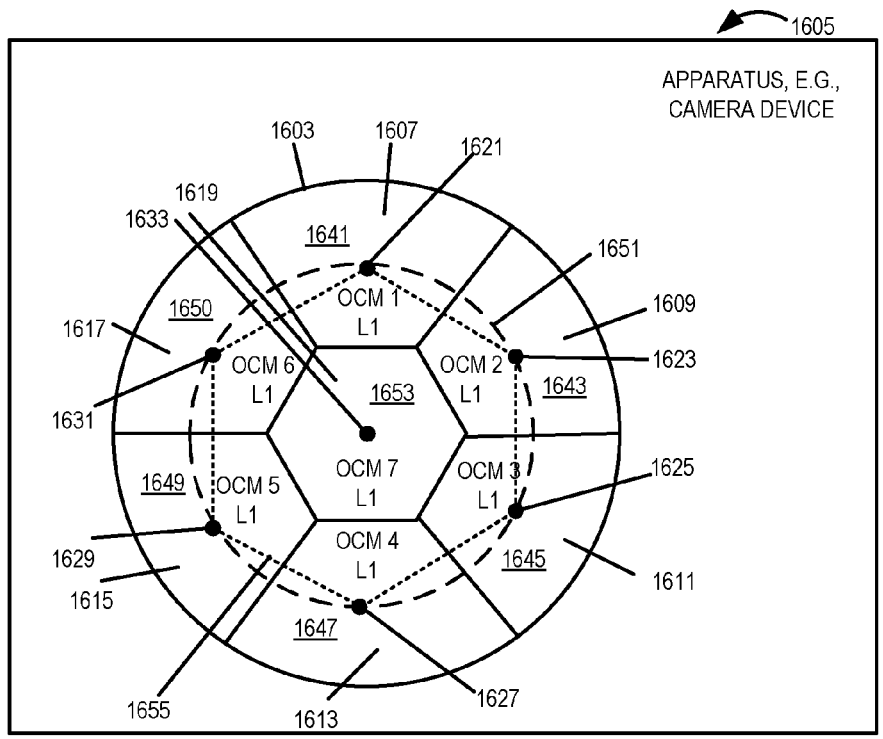
FIG. 16 illustrates a frontal view of the outer lens assembly of an apparatus implemented in accordance with one embodiment of the present invention where the apparatus incorporates multiple optical chain modules and outer lenses configured with little or no gaps between the lenses.
Figure 17:
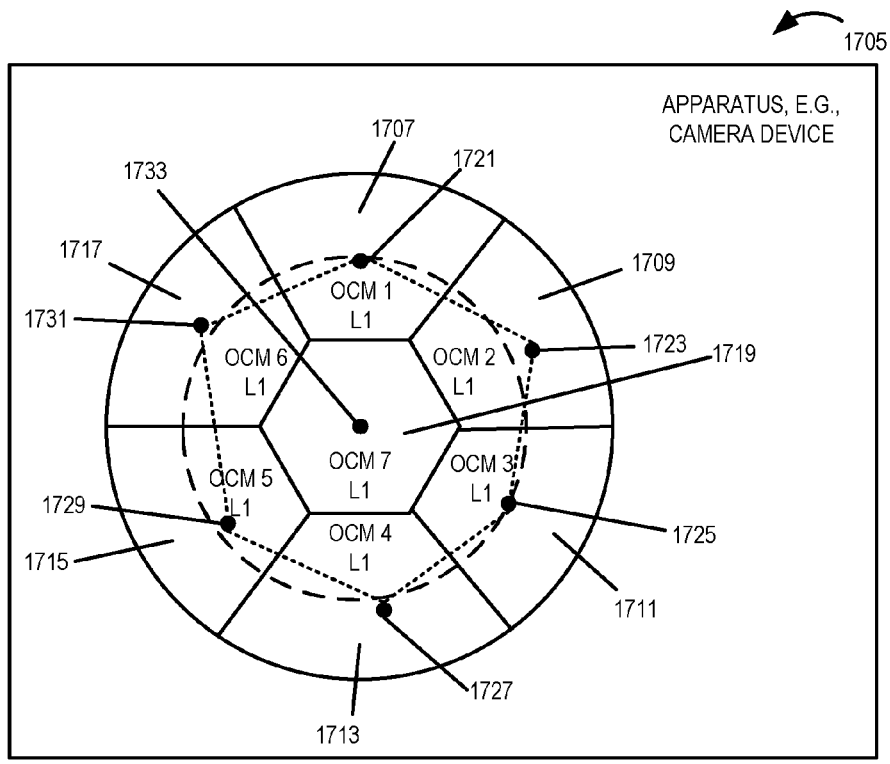
FIG. 17 illustrates a frontal view of the outer lenses of a lens assembly implemented in accordance with one embodiment of the present invention where the apparatus incorporates multiple optical chain modules with lenses configured with little or no gaps between the lenses but non-uniform spacing between the optical centers of at least some of the lenses.
Figure 18:
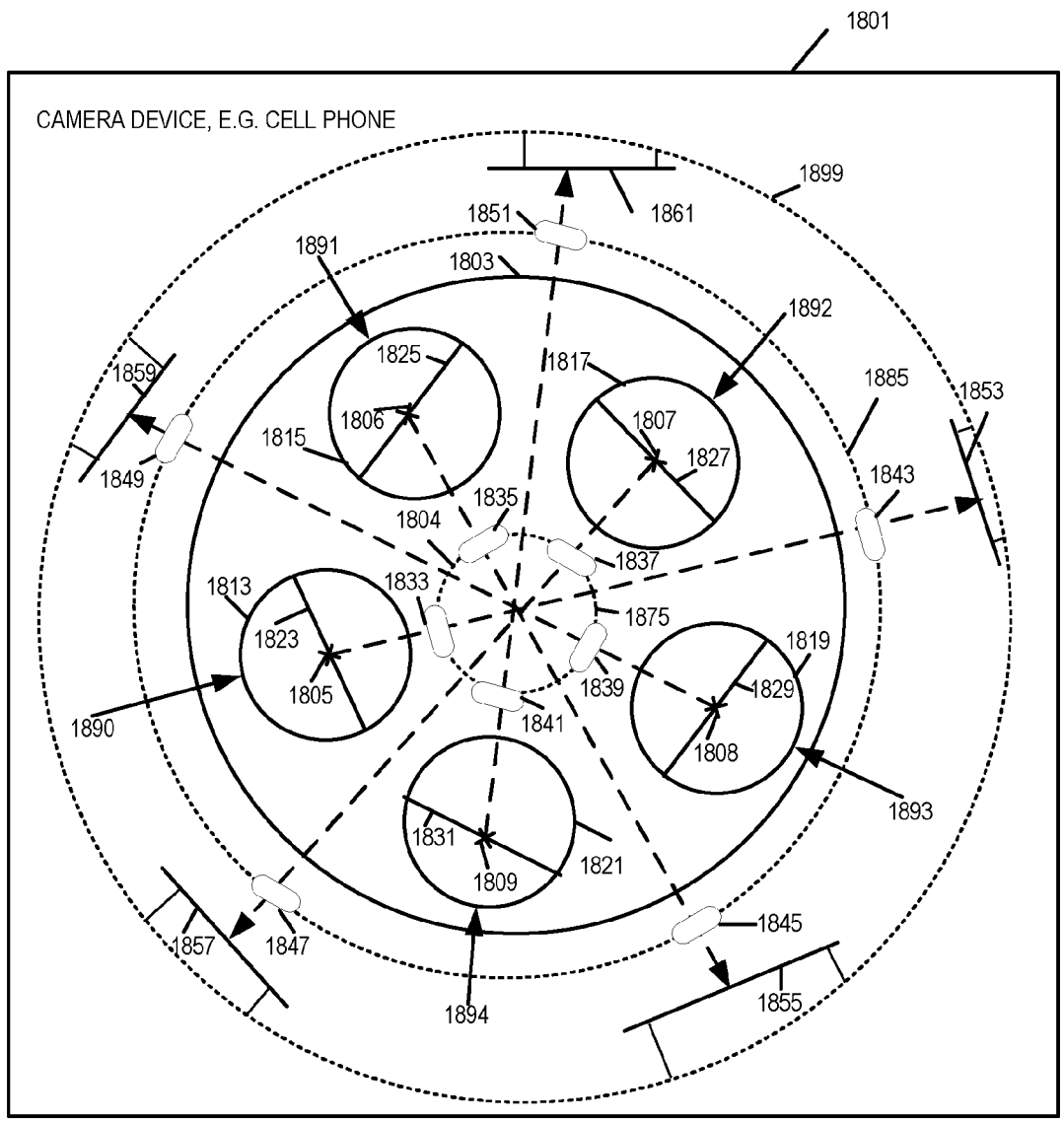
FIG. 18 illustrates a camera device including a plurality of optical chain modules which includes mirrors or another device for changing the angle of light entering the optical chain module and thereby allowing at least a portion of the optical chain module to extend in a direction, e.g., a perpendicular direction, which is not a straight front to back direction with respect to the camera device.
Figure 19:
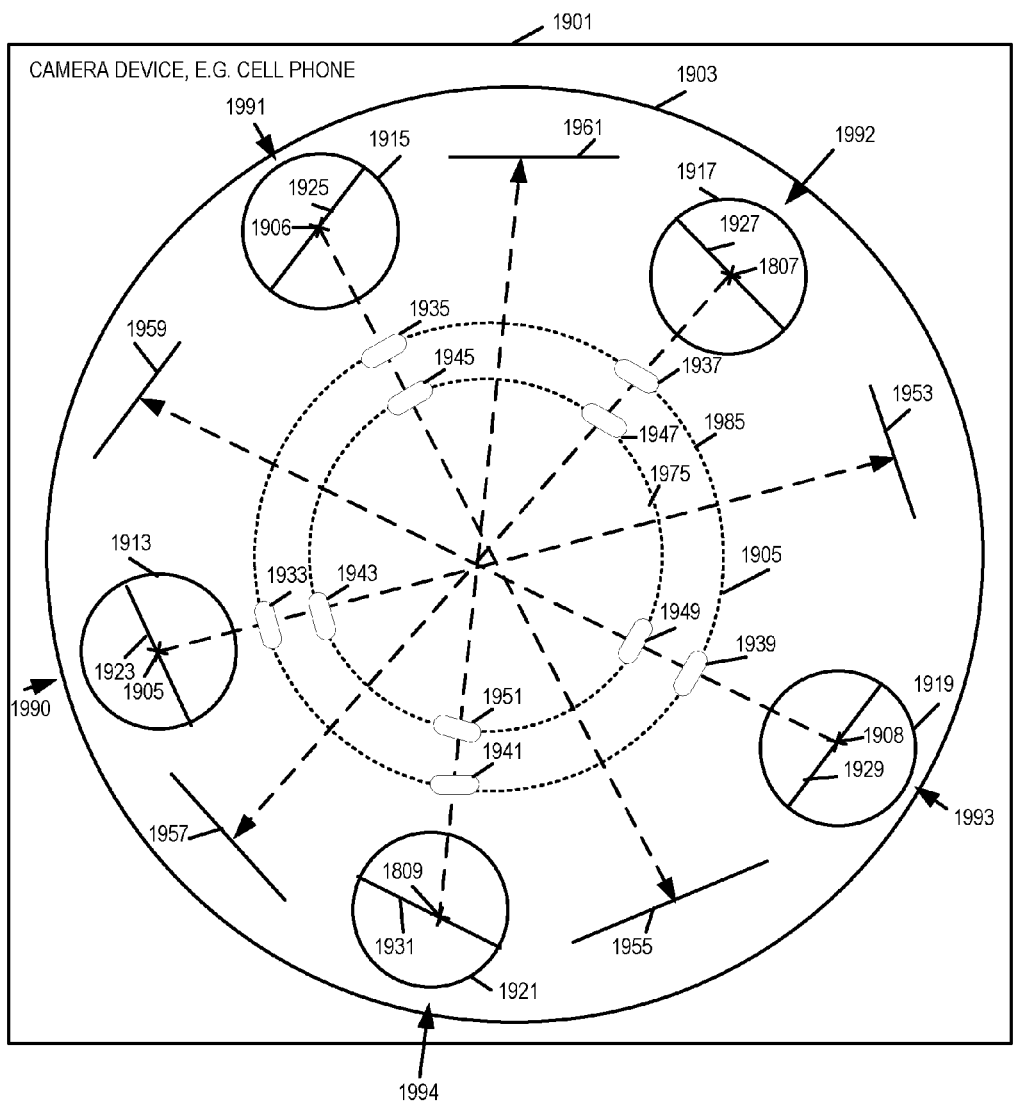
FIG. 19 illustrates another camera device including a plurality of optical chain modules which includes mirrors or another device for changing the angle of light entering the optical chain module and thereby allowing at least a portion of the optical chain module to extend in a direction, e.g., a perpendicular direction, which is not a straight front to back direction with respect to the camera device.

In some embodiments, assembly of modules 1300 is included in memory in an exemplary camera device, e.g., memory 108 of camera device 100 of FIG. 1A, memory 213 of camera device 200 of FIG. 2, memory 73 of camera device 60 of FIG. 4, memory of camera device 1500 of FIG. 15, memory of camera device 1605 of FIG. 16, memory in camera device 1705 of FIG. 17, memory in camera device 1801 of FIG. 18, and/or memory of camera device 1901 of FIG. 19. For example assembly of modules 1300 may be included as part of assembly of modules 118 of memory 108 of camera device 100 of FIG. 1.

In some embodiments, assembly of modules 1300 is implemented in hardware. In some embodiments, assembly of modules 1300 is implemented as software. In some embodiments, assembly of modules 1300 is implemented as a combination of hardware and software.

In some embodiments, all or part of assembly of modules 1300 may be included as part of a processor, e.g., as part of processor 110 of camera device 100 of FIG. 1A.

In the FIG. 13 example, the assembly of modules 1300 includes a image processing module 1302, a display module 1304, and a storage module 1306. The modules implemented one or more of the previously discussed image processing steps and may include a variety of sub-modules, e.g., an individual circuit, for performing an individual step of a method or methods being implemented. Image processing module 1302 is configured to: (1) process said first, second and third images to generate a first combined image of a first scene area, (2) receive user input indicating a portion of the first scene area to be focused in the first combined image; and/or (3) shift pixel positions on at least one of said first second and third images prior to generating said first combined image to align the portion of the first scene area to be focused, as part of processing said first, second, and third images to generate a first combined image; and (4) weight and sum a combination of pixel values of the first and second images corresponding to the same portion of the first scene area as a function of the first and second exposure times respectively and summing the weighted pixel values. In some embodiments image processing module 1302 is further configured to process said third image to generate said first combined image of said first scene area from the third image in addition to said first and second images.

Display module 1304 is configured to display said fourth image on said display and configured to display said combined image on said display. Storage module 306 is configured to store or more or said first image, said second image, said third image, said fourth image and said combined image in memory.

Figure 14:
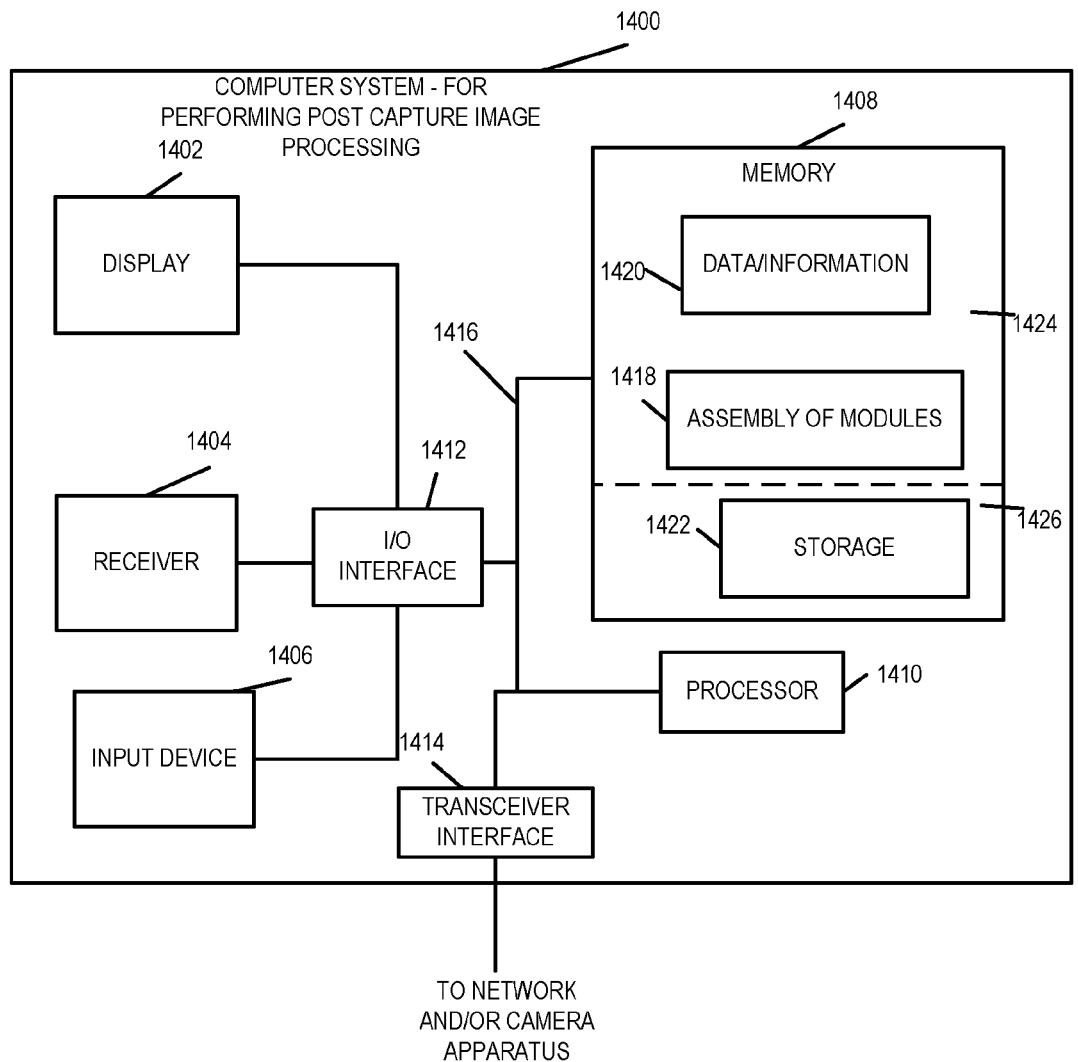
FIG. 14 illustrates a computer system which can be used for post processing of images captured using a camera device.

FIG. 14 illustrates a computer system which can be used for post processing of images captured using a camera device. The computer system 1400 includes a display 1402, Input/Output (I/O) interface 1412, receiver 1404, input device 1406, transceiver interface 1414, processor 1410 and memory 1408. Memory 1408 includes a first portion 1424 including data/information 1420 and an assembly of modules 1418, and a second portion 1426 including storage 1422. The memory 1408 is coupled to the processor 1410, I/O interface 1412 and transceiver interface 1414 via bus 1416 through which the elements of the computer system 1400 can exchange data and can communicate with other devices via the I/O interface 1412 and/or interface 1414 which can couple the system 1400 to a network and/or camera apparatus. It should be appreciated that via interface 1414 image data can be loaded on to the computer system 1400 and subject to processing, e.g., post capture processing. The images may be stored in the storage portion 1422 of memory 1408 for processing. Data/information 1420 includes, e.g., intermediate processing data and information and criteria used for processing e.g., weighting information, exposure time information, etc. The assembly of modules 1418 includes one or more modules or routines which, when executed by the processor 1410, control the computer system to implement one or more of the image processing operations described in the present application. The output of multiple optical receiver chains can be, and in some embodiments is, combined to generate one or more images. The resulting images are stored in the storage portion of the memory 1408 prior to being output via the network interface 1414, though another interface, or displayed on the display 1402. Thus, via the display 1402 a user can view image data corresponding to one or more individual optical chain modules as well as the result, e.g., image, generated by combining the images captured by one or optical chain modules.

FIG. 15 illustrates a frontal view of an apparatus 1500 implemented in accordance with one embodiment of the present invention which incorporates multiple optical chain modules. Camera device 1500 includes four optical chains OCM 1 1502, OCM 2 1504, OCM 3 1506 and OCM 4 1508. The outer lens of OCM 1, OCM 2, OCM 3 and OCM 4, OCM 1 L1 1510, OCM 2 L1 1512, OCM 3 L1 1514, OCM 4 L1 1516, respectively, being shown as solid line circles with a frontal view. OCM 1 1502 including a red filter element 1518, OCM 2 1504 including a green filter element 1520, OCM 3 1506 including a blue filter element 1522. Optical chain module 4 1508 passes all three colors and includes a sensor with a multi-color filter element 1524, e.g., a Bayer filter. The optical chain modules (1502, 1504, 1506, 1508) may be the same as or similar to those previously described in FIGS. 1-3.

FIG. 16 illustrates a frontal view of the outer lenses of an apparatus 1605, e.g., a camera device, implemented in accordance with one embodiment of the present invention which incorporates multiple optical chain modules and which is designed to have little or no gaps between the outer most lenses of the different optical chain modules. The outer most lenses may be the aperture stop lenses in the FIG. 16 embodiment. Apparatus 1605 of FIG. 16 includes 7 optical chain modules OCM1, OCM2, OCM3, OCM4, OCM5, OCM6 and OCM7 with the outer lens plane corresponding to lenses L1 as viewed from the front of the camera device being shown in FIG. 16.

The 7 optical chain modules are, e.g., optical chain modules (OCM 1 161, OCM 2 161', OCM 3 161", . . . , OCM 7 161'''), of FIG. 1D with the outer lens (OCM 1 L1 162, OCM 2 L1 162', OCM 3 L1 162", . . . , OCM 7 L1 162''') being outer lenses (OCM 1 L1 1607, OCM 2 L1 1609, OCM 3 L1 1611, . . . , OCM 7 L1 1619) of FIG. 16, respectively.

The outer lenses L1 of optical chain modules 1, 2, 3, 4, 5, and 6, OCM 1 L1 1607, OCM 2 L1 1609, OCM 3 L1 1611, OCM 4 L1 1613, OCM 5 L1 1615, OCM 6 L1 1617, are positioned so as to surround the outer lens L1 of the optical chain module 7, OCM 7 L1 1619. The outer lens L1 of the optical chain module 7 1619 being formed in the shape of a hexagon, i.e., a six sided polygon. The outer lenses L1 of optical chain modules 1, 2, 3, 4, 5 and 6 (1607, 1609, 1611, 1613, 1615, 1617) being of same shape and size and when combined with lens L1 of optical module 7 (1619) forming a circle. The optical center of each lens L1 of optical chain modules (OCM 1 L1 1607, OCM 2 L1 1609, OCM 3 L1 1611, OCM 4 L1 1613, OCM 5 L1 1615, OCM 6 L1 1617) shown as a dark solid dot (1612, 1623, 1625, 1627, 1629, 1631) on the dashed circle 1651. The optical center of lens L1 1619 of optical chain module 7 shown as a dot 1633 in the center of the hexagon and also in center of the dashed line 1651. A block separator or other light block may be used between the lenses to stop light leakage between the different lenses. The dots (1621, 1623, 1625, 1627, 1629, 1631, 1633) in FIG. 16 represent the optical center of the individual lenses (1607, 1609, 1611, 1613, 1615, 1617, 1619), respectively. In some embodiments each outermost lens is a round convex lens with its parameter cut to the shape shown in FIG. 16 so that the lenses fight closely together. The little or no gap between the front lenses, e.g., the total area of the gap between the lenses occupies less than 5% of the total area of the front area of the lens assembly, e.g., circle shown in FIG. 16, occupied by the lenses when assembled together. The lack of or small size of the gaps facilitates generating combined images with a desirable bokehs or blurs in the combined image with regard to image portions which are out of focus, e.g., in some cases without the need for extensive and potentially complex processing to generate the combined image.

In FIG. 16, circle 1603 represents a circular aperture for the camera device 1605. In other embodiments, the aperture for the camera device 1605 is a polygon shaped aperture. The plurality of lenses (1607, 1609, 1611, 1613, 1615, 1615, 1617, 1619) are configured to partition the aperture 1603 into a plurality of light capture areas (1641, 1643, 1645, 1647, 1649, 1651, 1653), occupying substantially the entire area of the first aperture.

In some embodiments, the seven optical chains included in camera device 1605 are the N optical chains (161, 161', 161'' . . . , 161'''), where N=7, where the outer lenses configuration of FIG. 16 is used. For example, OCM 1 L1 162 of FIG. 1D is OCM L1 1607 of FIG. 16, OCM 2 L1 162' of FIG. 1D is OCM 2 L1 1609 of FIG. 16, OCM 3 L1 162" of FIG. 1D is OCM 3 L1 1611 of FIG. 16, . . . , and OCM N L1 162''' of FIG. 1D is OCM 7 L1 1619 of FIG. 16.

In various embodiments, the sensor included in each optical chain in camera device 1605 is a semiconductor sensor. In various embodiments, first aperture of camera device 1605 is one of a circular or polygon shaped aperture. The first aperture of camera device 1605 corresponds to circle 1603. In some other embodiments, the first aperture corresponds to a polygon, e.g., a polygon approximately same size as circle 1603. In some embodiments, the polygon fits inside circle 1603. In some embodiments, the polygon is a regular polygon.

The lenses (1607, 1609, 1611, 1613, 1615, 1617) in said plurality of lenses (1607, 1609, 1611, 1613, 1615, 1617, 1619) which are arranged along the perimeter of said first aperture 1603 have optical centers (1621, 1623, 1625, 1627, 1629, 1631) which are arranged along a circle 1651. The lenses (1607, 1609, 1611, 1613, 1615, 1617) in said plurality of lenses (1607, 1609, 1611, 1613, 1615, 1617, 1619) which are arranged along the perimeter of said first aperture 1603 have optical centers (1621, 1623, 1625, 1627, 1629, 1631) which form the vertices (corners) of a regular polygon 1655.

The plurality of lenses (1607, 1609, 1611, 1613, 1615, 1617, 1619) includes at least one inner lens 1619 in addition to said lenses (1607, 1609, 1611, 1613, 1615, 1617) arranged along the perimeter of said first aperture 1603. The plurality of lenses (1607, 1609, 1611, 1613, 1615, 1617, 1619) includes a total of six lenses (1607, 1609, 1611, 1613, 1615, 1617) along the perimeter of said first aperture 1603 and a single lens (1619) in the center of said six lenses (1607, 1609, 1611, 1613, 1615, 1617) arranged along the perimeter of said first aperture 1603.

The non-circular aperture of each of said plurality of lenses (1607, 1609, 1611, 1613, 1615, 1617, 1619) is an aperture stop in a corresponding optical chain.

Each lens in said plurality of lenses (1607, 1609, 1611, 1613, 1615, 1617, 1619) is part of a corresponding optical chain, each individual optical chain includes a separate sensor for capturing an image corresponding to said individual optical chain.

Apparatus 1605, e.g., a camera device, further includes a module, e.g., module 1302 of FIG. 13, for combining images captured by separate optical chains into a single combined image. In various embodiments, the combining images, e.g., performed by module 1302, includes a shift and add based on the position of lenses in said plurality of lenses (1607, 1609, 1611, 1613, 1615, 1617, 1619).

Camera device 1605 further includes additional elements shown in FIG. 1A including a processor, a memory and a display.

FIG. 17 illustrates a frontal view of the outer lenses of an apparatus 1705 implemented in accordance with one embodiment of the present invention which incorporates multiple optical chain modules and outer lenses, e.g., the aperture stop lens for each of the corresponding optical chains, arranged to have non-uniform spacing between the optical centers of the lenses. Thus the FIG. 17 embodiment is similar to the FIG. 16 embodiment but with non-uniform spacing of the optical centers of lenses along the outer parameter of the lens assembly. The non-uniform spacing facilitates depth of field determinations particularly when performing block processing and the entire field of view may not be under consideration when processing a block or sub-portion of the captured field of view. The optical chain modules shown in FIGS. 16 and 17 are the same or similar to those previously described with reference to FIG. 3 but differ in terms of lens shape, size and/or configuration. The dots (1721, 1723, 1725, 1727, 1729, 1731, 1733) in FIG. 17 represent the optical center of the individual lenses (1707, 1709, 1711, 1713, 1715, 1717, 1719), respectively.

FIG. 18 illustrates another exemplary camera device 1801 including a plurality of first through fifth optical chain modules (1890, 1891, 1892, 1893, 1894) each of which includes an outer lens (1813, 1815, 1817, 1819, 1821), respectively, represented as a circle on the outer lens platter 1803. Each outer lens (1813, 1815, 1817, 1819, 1821) has an optical axis (1805, 1806, 1807, 1808, 1809), respectively. The optical axis (1805, 1806, 1807, 1808, 1809) is represented by an X, indicating that the axis goes down into the lens (1813, 1815, 1817, 1819, 1821). The optical axis (1805, 1806, 1807, 1808, 1809), are parallel to each other. In both FIGS. 18 and 19 arrows made of dashed lines represent the path of light for the corresponding optical chain module after light which entered the outer lens along the optical axis of the outer lens is redirected by the mirror or other light redirection device. Thus, the arrows represents the direction and general light path towards the sensor of the optical chain to which the arrow corresponds. In various embodiments, the image deflection element, e.g., a mirror, of the optical chain changes the direction of the optical rays passing along the optical axis of the outer lens by substantially 90 degrees to direct the optical rays passing along the optical axis onto the sensor. For example, with regard to optical chain 1890, the image deflection element 1823, e.g., a mirror, of the optical chain 1890 changes the direction of the optical rays passing along the optical axis 1805 of the outer lens 1813 by substantially 90 degrees to direct the optical rays passing along the optical axis onto the sensor 1853.

In the FIG. 18 embodiment each of the optical chain modules (1890, 1891, 1892, 1893, 1894) includes, in addition to an outer lens (1813, 1815, 1817, 1819, 1821,) a mirror or other device, e.g., prism, (1823, 1825, 1827, 1829, 1831), respectively, for changing the angle of light received via the corresponding outer lens (1813, 1815, 1817, 1819, 1821), respectively. Additionally, as in some of the previously described embodiments such as the FIGS. 1A, 1B, 1C, 1D, and 3 embodiments, each optical chain module (1890, 1891, 1892, 1893, 1894), includes a filter (1833, 1835, 1837, 1839, 1841), respectively, and an inner lens (1843, 1845, 1847, 1849, 1851), respectively. In addition each optical chain module (1890, 1891, 1892, 1893, 1894) includes a sensor (1853, 1855,1857, 1859, 1861), respectively. For example, the first optical chain module (OCM 1 1890) include outer lens L1 1813, mirror 1823, filter 1833, inner lens L2 1843 and sensor 1853.

Filters 1833, 1835, 1837, 1839, and 1841 are mounted on a movable cylinder 1875 represented as a circle shown using small dashed lines. The cylinder 1875 may be rotated and/or moved forward or backward allowing lenses and/or filters on the cylinder to be easily replaced with other lenses, filter, or holes mounted on the cylinder 1875. While in the FIG. 18 example, an exit hole is provided to allow light to exit cylinder 1875 after passing through one of the filters 1833, 1835, 1837, 1839, or 1841 it should be appreciated that rather than an exit hole another lens or filter may be mounted on the cylinder 1875 allowing two opportunities for the light to be filtered and/or passed through a lens as is passes through the cylinder 1875. Thus, in at least some embodiments a second filter or lens which is not shown in FIG. 18 for simplicity is included at the exit point for the light as it passes through cylinder 1804. Inner lenses are mounted on cylinder 1885 which is actually closer to the outside sidewalls of the camera device 1801 than the filters mounted on cylinder 1875. Given the large diameter of movable cylinder 1885 and the relatively small diameter of the light beam as it nears the sensor, it should be appreciated that a large number of alternative filters, lenses and/or holes can be mounded on cylinder 1885. As with cylinder 1875 the light can be filtered and/or processed by a lens as it enters and leaves cylinder 1885 prior to reaching the sensor of the corresponding optical chain.

In some embodiments lenses mounted on a moveable platter positioned between the outer lens platter 1803 and mirrors which may, and in some embodiments are, also mounted on a platter are used to support autofocus. In such an embodiment the lens platter between the outer lens platter and mirror platter is moved in or out to perform focus operations for each of the optical chain modules in parallel. In another embodiment, different sets of lens are mounted on the drum 1885 or 1875 with different lens sets being mounted with a different offset distance from the surface of the drum. By switching between the different sets of lenses by rotating the drum on which the different lens sets are mounted, focusing between different predetermined focus set points can, and in some embodiments is achieved, by simply rotating the drum on which the lens sets, corresponding to the different focal distance set points, are mounted.

Notably, the FIG. 18 embodiment, by changing the direction of light through the use of mirrors, prisms and/or other devices allows for the length of the individual optical chains to be longer than the camera device is thick. That is, the side to side length of the camera device 1801 can be used in combination with a portion of the front to back length to create optical chains having a length longer than the depth of the camera device 1801. The longer optical chain length allows for more lenses and/or filters to be used as compared to what may be possible with shorter optical chain lengths. Furthermore, the change in the direction of light allows for the use of cylinders for mounting lenses, filters and/or holes which can be easily interchanged by a simple rotation or axial, e.g., front to back movement, of the cylinder on which the lenses, filters and/or holes corresponding to multiple optical chains are mounted.

In the FIG. 18 embodiment sensors may be fixed and/or mounted on a movable cylinder 1899. Thus, not only can the lenses, filters and/or holes be easily switched, changes between sensors or sets of sensor can be easily made by rotating the cylinder on which the sensors are mounted. While a single mirror is shown in FIG. 18 in each optical chain module, additional mirrors may be used to further extend the length of the optical path by reflecting in yet another direction within the housing of the camera device 1801.

It should be appreciated that the FIG. 18 embodiment allows for a combination of lens, filter, and/or hole mounting platters arranged parallel with the platter extending left to right within the camera device and cylinders arranged so that the top and bottom of the cylinder extend in the front to back direction with respect to the camera body, e.g., with the front of the camera being shown in FIG. 18. Cylinders may be mounted inside of one another providing a large number of opportunities to mount lens, filters and/or holes along the optical paths of each optical chain module and allowing for a large number of possible filter/lens/sensor combinations to be supported, e.g., by allowing for different combinations of cylinder positions for different modes of operation.

While changing sensors mounted on a cylinder can be achieved by rotating a cylinder, in the earlier embodiments in which sensors may be mounted on platters, sensors may be changed by rotating or otherwise moving a platter on which the sensors are mounted.

Note that in the FIG. 18 embodiment the outer lenses (1813, 1815, 1817, 1819, 1821, of the optical chain modules (1890, 1891, 1892, 1893, 1894), respectively, are mounted near the center of the front of the camera device 1801 as shown, e.g., forming a generally circular pattern of outer lenses 1813, 1815, 1817, 1819, 1821.

In camera device 1801 the optical axes (1805, 1806, 1807, 1808, 1809) of lenses (1813, 1815, 1817, 1819, 1821) said optical chain modules (1890, 1891, 1892, 1893, 1894) are parallel to each other but at least two mirrors (1823, 1825) corresponding to different optical chains (1890, 1891) are not parallel. The light rays of at least two different optical chains (1890, 1891) cross prior to reaching the sensor (1853, 1855) to which the rays of said at least two different optical chain modules (1890, 1891) correspond.

In various embodiments, each optical chain module (1890, 1891, 1892, 1893, 1894) includes an image deflection element which includes at least one mirror positioned at 45 degree to said optical axis (1890, 1891, 1892, 1893, 1894) of said lens of the optical chain module. For example, with regard to optical chain module 1 1890, in one embodiments, the image deflection element 1823 is a mirror positioned at 45 degree to the optical axis 1805 of lens 1813.

In some embodiments, an image deflection element, e.g., image deflection element 1823 includes a prism. In some embodiments, an image deflection element includes multiple mirrors. In some embodiments, an image deflection element includes a combination including at least one mirror and at least one prism.

FIG. 19 is similar to the FIG. 18 embodiment in that it illustrates another camera device 1901 including a plurality of optical chain modules which include mirrors or another device for changing the angle of light entering the optical chain module and thereby allowing at least a portion of the optical chain module to extend in a direction, e.g., a perpendicular direction, which is not a straight front to back direction with respect to the camera device. FIG. 19 illustrates another exemplary camera device 1901 including a plurality of first through fifth optical chain modules (1990, 1991, 1992, 1993, 1994) each of which includes an outer lens (1913, 1915, 1917, 1919, 1921), respectively, represented as a circle on the outer lens platter 1903. FIG. 19 differs from the FIG. 18 embodiment in that the outer lenses (1913, 1915, 1917, 1919, 1921) of the first through fifth optical chain modules (1990, 1991, 1992, 1993, 1994) are positioned near the perimeter of the face of the camera device 1901. This allows for the length of the optical chain module to be longer than the length of the optical chains shown in FIG. 18. FIG. 19 shows outer and inner cylinders, also some times referred to as drums, 1975, 1985, upon which filters, lenses and holes can and in various embodiments are mounted as discussed with regard to the FIG. 18 embodiment. Thus cylinders 1975 and 1985 server the same or similar purpose served by cylinders 1875, 1885, respectively. It should be appreciated that in some embodiments the FIG. 19 embodiment includes filters and lenses mounted on the inner and outer cylinders in the same or similar manner as filters and lenses are mounted on the cylinders 1875, 1885 shown in FIG. 18.

Elements of the FIG. 19 embodiment which are the same or similar to the elements of the FIG. 18 embodiment are identified beginning with "19" instead of "18" and for the sake of brevity will not be described again in detail. For example element 1961 is used to refer to the sensor for the optical chain module 1994 which includes outer lens 1921, mirror/light redirection device 1931, filter 1941 and inner lens 1951. The cylinder 1975 is used to mount the filters while cylinder 1985 is used to mount the inner lenses.

Each outer lens (1913, 1915, 1917, 1919, 1921) has an optical axis (1905, 1906, 1907, 1908, 1909), respectively. The optical axis (1905, 1906, 1907, 1908, 1909) is represented by an X, indicating that the axis goes down into the lens (1913, 1915, 1917, 1919, 1921). The optical axis (1905, 1906, 1907, 1908, 1909), are parallel to each other.

The camera devices 1801 and 1901 may, and in some embodiments do, include a processor, display and/or other components of the camera device shown in FIG. 1A but such elements are not explicitly shown in the FIGS. 18 and 19 embodiments to avoid complicating the figures and being repetitive.

Various functions of the present invention may be and are implemented as modules in some embodiments. The assembly of modules 1300 shown in FIG. 13 illustrates an exemplary assembly of modules, e.g., software or hardware modules, that may be and are used for performing various functions of a image processing system or apparatus used to process images in accordance with embodiments of the present invention. When the modules identified in FIG. 13 are implemented as software modules they may be, and in some embodiments of the present invention are, stored in memory 108 of FIG. 1A in the section of memory identified as assembly of modules 118. These modules may be implemented instead as hardware modules, e.g., circuits.

The ideas and concepts described with regard to various embodiments such as those shown in FIG. 19 can be extended so that the input sensors can be located in a plane, e.g., at the back of the camera device and/or at the front of the camera device. In some such embodiments the sensors of multiple optical chains are mounted on a flat printed circuit board or backplane device. The printed circuit board, e.g. backplane, can be mounted or coupled to horizontal or vertical actuators which can be moved in response to detected camera motion, e.g., as part of a shake compensation process which will be discussed further below. In some such embodiments, pairs of light diverting devices, e.g., mirrors, are used to direct the light so that at least a portion of each optical chain extends perpendicular or generally perpendicular to the input and/or sensor plane. Such embodiments allow for relatively long optical paths which take advantage of the width of the camera by using mirrors or other light diverting devices to alter the path of light passing through an optical chain so that at least a portion of the light path extends in a direction perpendicular or generally perpendicular to the front of the camera device. The use of mirrors or other light diverting devices allows the sensors to be located on a plane at the rear or front of the camera device as will now be discussed in detail.

While the invention has been explained using convex lenses in many of the diagrams, it should be appreciated that any of a wide variety of different types of lenses may be used in the optical chain modules including, e.g., convex, concave, and meniscus lenses. In addition, while lenses and filters have been described as separate elements, lenses and filters may be combined and used. For example, a color lens may, and in some embodiments is, used to both filter light and alter the lights path. Furthermore, while many of the embodiments have been described with a color filter preceding the image sensor of an optical chain or as using an image sensor with an integrated color filter, e.g., a Bayer pattern filter, it should be appreciated that use of color filters and/or sensors with color filters is not required and in some embodiments one or more optical chain modules are used which do not include a color filter and also do not use a sensor with a color filter. Thus, in some embodiments one or more optical chain modules which sense a wide spectrum of color light are used. Such optical chain modules are particularly well suited for generating black and white images.

In various embodiments image processing is used to simulate a wide variety of user selectable lens bokehs or blurs in the combined image with regard to image portions which are out of focus. Thus, while multiple lenses are used to capture the light used to generate a combined image, the image quality is not limited to that of an individual one of the lenses and a variety of bokehs can be achieved depending on the particular bokeh desired for the combined image being generated. In some embodiments, multiple combined images with different simulated bokehs are generated using post image capture processing with the user being provided the opportunity to save one or more of the generated combined images for subsequent viewing and/or printing. Thus, in at least some embodiments a physical result, e.g., a printed version of one or more combined images is produced. In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

While different optical chain modules are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amounts of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules. The camera devices of the present invention supports multiple modes of operation with switching between panoramic mode in which different areas are captured, e.g., using multiple lenses per area, and a normal mode in which multiple lens pointed same direction are used to capture the same scene. Different exposure modes and filter modes may also be supported and switched between, e.g., based on user input.

Figure 20:
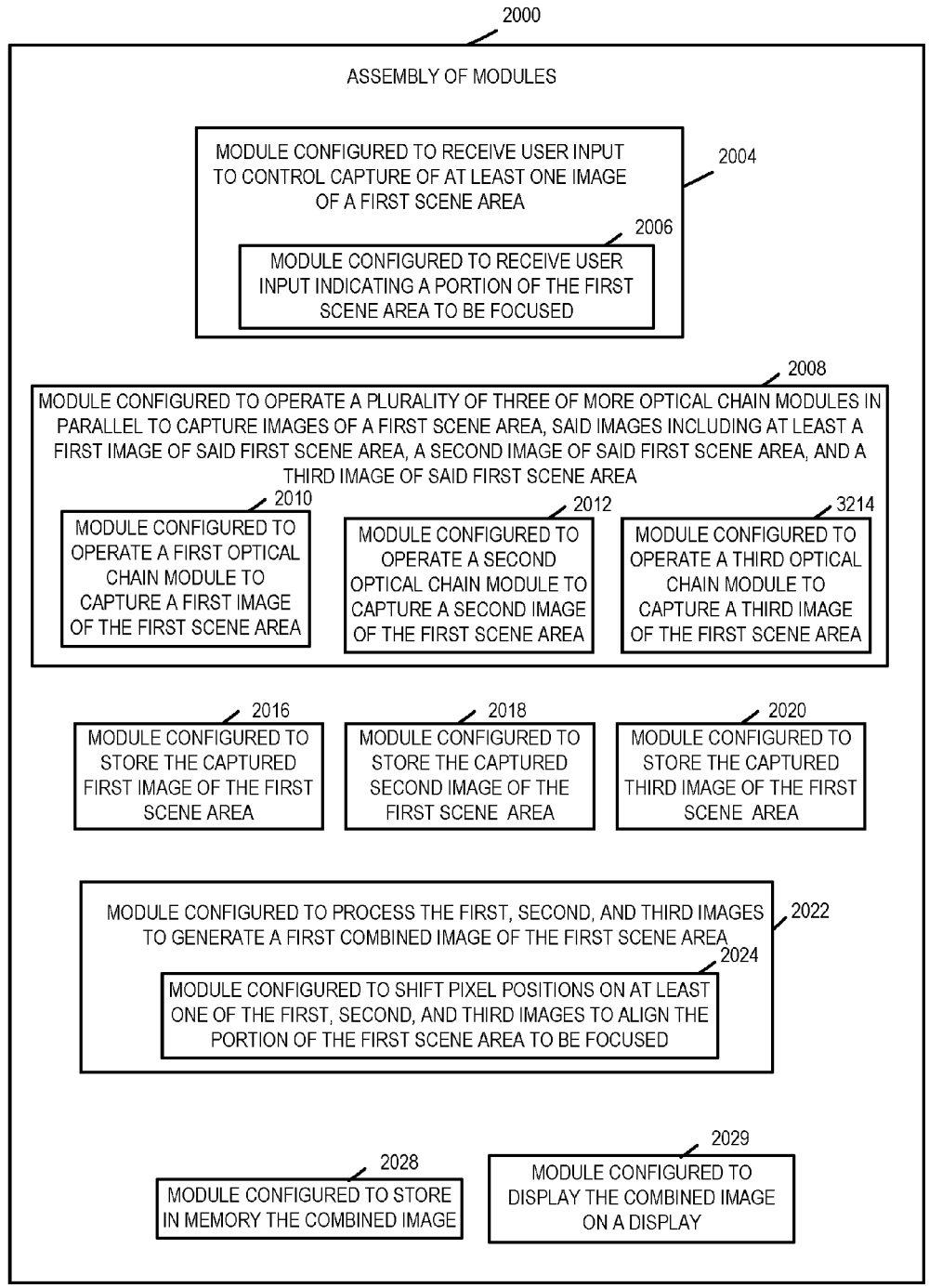
FIG. 20 is a drawing of an assembly of modules, which may be included in an exemplary apparatus, e.g., a camera device, in accordance with an exemplary embodiment.

FIG. 20 is a drawing of an assembly of modules 2000 in accordance with an exemplary embodiment. Assembly of modules 2000 may be included in an exemplary apparatus, e.g., a camera device, e.g., camera device 100 of FIG. 1A, camera device 200 of FIG. 2, camera device 60 of FIG. 4, camera device 1500 of FIG. 15, camera device 1605 of FIG. 16, camera device 1705 of FIG. 17, camera device 1801 of FIG. 18 and/or camera device 1901 of FIG. 19, in accordance with an exemplary embodiment.

In some embodiments, assembly of modules 2000 is included in memory in an exemplary camera device, e.g., memory 108 of camera device 100 of FIG. 1A, memory 213 of camera device 200 of FIG. 2, or memory 73 of camera device 60 of FIG. 4, memory in camera device 1500 of FIG. 15, memory in camera device 1605 of FIG. 16, memory in camera device 1705 of FIG. 17, memory in camera device 1801 of FIG. 18 and/or memory camera device 1901 of FIG. 19. For example assembly of modules 2000 may be included as part of assembly of modules 118 of memory 108 of camera device 100 of FIG. 1.

In some embodiments, assembly of modules 2000 is included in an exemplary device, e.g., an exemplary camera device, which implements a method in accordance with flowchart 900 of FIG. 9.

Assembly of modules 2000 includes a module 2004 configured to receive user input to control capture of at least one image of a first scene, and a module 2008 configured to operate a plurality of three or more optical chain modules in parallel to capture images of a first scene area, said images including at least of a first image of said first scene area, a second image of the first scene area, and a third image of the first scene area. Module 2004 includes a module 2006 configured to receive user input indicating a portion of the first scene area to be focused. Assembly of modules 2008 includes a module 2010 configured to operate a first optical chain module to capture a first image of the first scene area, a module 2018 configured to operate a second optical chain module to capture a second image of the first scene area, and a module 2014 configured to operate a third optical chain module to capture a third image of the first scene area.

Assembly of modules 2000 further includes a module 2016 configured to store the captured first image of the first scene area, a module 2018 configured to store the captured second image of the first scene area, and a module 2020 configured to store the captured third image of the first scene area. Assembly of modules 2000 further includes a module 2022 configured to process the first, second, and third images to generate a first combined image of the first scene area to be focused. Module 2022 includes a module 2024 configured to shift pixel portions of at least one of the first, second, and third images to align the portion of the first scene area to be focused. Assembly of modules 2000 further includes a module 2028 configured to store in memory the combined image and a module 2029 configured to display the combined image on a display.

Figure 21:
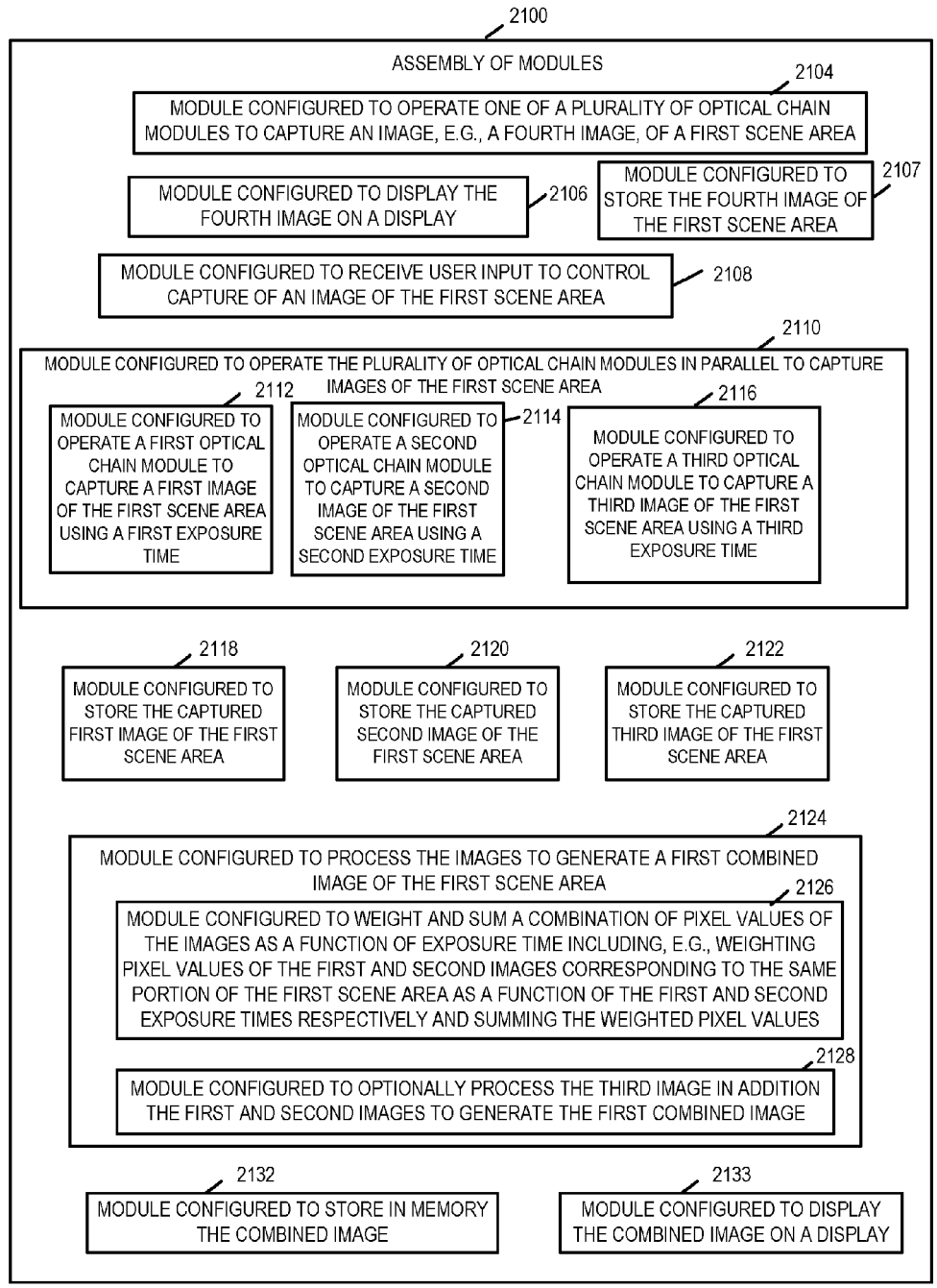
FIG. 21 is a drawing of an assembly of modules, which may be included in an exemplary apparatus, e.g., a camera device, in accordance with an exemplary embodiment.

FIG. 21 is a drawing of an assembly of modules 2100 in accordance with an exemplary embodiment. Assembly of modules 2100 may be included in an exemplary apparatus, e.g., a camera device, e.g., camera device 100 of FIG. 1A, camera device 200 of FIG. 2, camera device 60 of FIG. 4, camera device 1500 of FIG. 15, camera device 1605 of FIG. 16, camera device 1705 of FIG. 17, camera device 1801 of FIG. 18, camera device 1901 of FIG. 19, in accordance with an exemplary embodiment.

In some embodiments, assembly of modules 2100 is included in memory in an exemplary camera device, e.g., memory 108 of camera device 100 of FIG. 1A, memory 213 of camera device 200 of FIG. 2, or memory 73 of camera device 60 of FIG. 4, memory in camera device 1500 of FIG. 15, memory in camera device 1605 of FIG. 16, memory in camera device 1705 of FIG. 17, memory in camera device 1801 of FIG. 18, memory in camera device 1901 of FIG. 19. For example assembly of modules 2100 may be included as part of assembly of modules 118 of memory 108 of camera device 100 of FIG. 1.

In some embodiments, assembly of modules 2100 is included in an exemplary device, e.g., an exemplary camera device, which implements a method in accordance with flowchart 1000 of FIG. 10.

Assembly of module 2100 includes a module 2104 configured to operate one of a plurality of optical chain modules to capture an image, e.g., a fourth image, of a first scene area, a module 2105 configured to display the fourth image on a display, a module 2107 configured to store the fourth image of the first scene area, a module 2108 configured to receive user input to control capture of an image of the first scene area. Assembly of modules 2100 further includes a module 2110 configured to operate the plurality of optical chain modules in parallel to capture images of the first scene area. Module 2110 includes a module 2112 configured to operate a first optical chain module to capture a first image of the first scene area using a first exposure time, a module 2114 configured to operate a second optical chain module to capture a second image of the first scene area using a second exposure time, and a module 2116 configured to operate a third optical chain module to capture a third image of the first scene area using a third exposure time. Assembly of modules 2100 further includes a module 2118 configured to store the captured first image of the first scene area, a module 2120 configured to store the captured second image of the first scene area, and a module 2122 configured to store the captured third image of the first scene area.

Assembly of modules 2100 further includes a module 2124 configured to process the images to generates a first combined image of the first scene area. Module 2124 includes a module 2126 configured to weight and sum a combination of pixel values of the images as a function of exposure time including, e.g., weighting pixel values of the first and second images corresponding to the same portion of the first scene area as a function of the first and second exposure times, respectively, and summing the weighted pixel values, and a module 2128 configured to optionally process the third image in addition to the first and second images to generate the first combined image. Assembly of modules 2100 further includes a module 2132 configured to store in memory the combined image and a module 2133 configured to display the combined image on a display.

Figure 22:
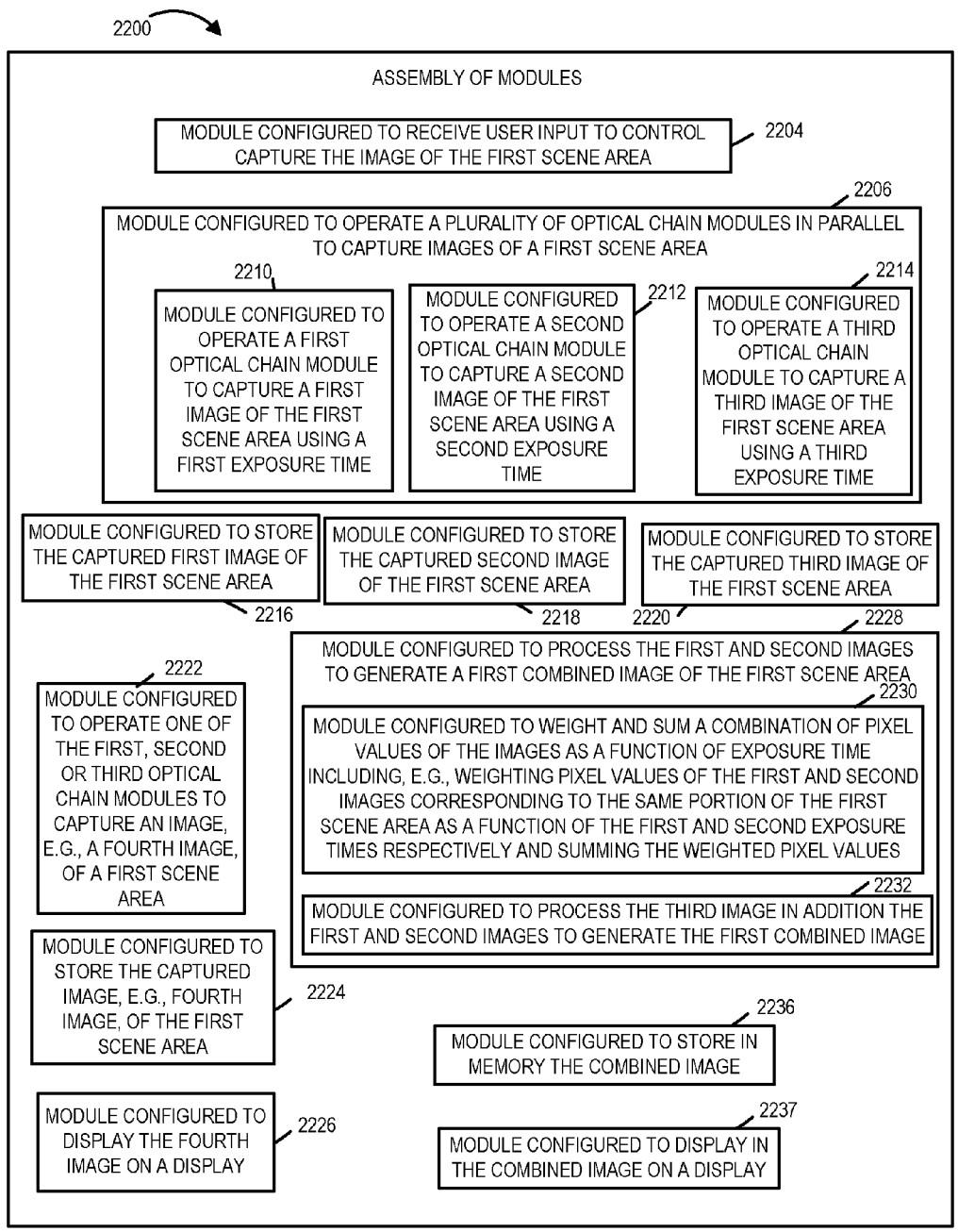
FIG. 22 is a drawing of an assembly of modules, which may be included in an exemplary apparatus, e.g., a camera device, in accordance with an exemplary embodiment.

FIG. 22 is a drawing of an assembly of modules 2200 in accordance with an exemplary embodiment. Assembly of modules 2200 may be included in an exemplary apparatus, e.g., a camera device, e.g., camera device 100 of FIG. 1A, camera device 200 of FIG. 2, camera device 60 of FIG. 4, camera device 1500 of FIG. 15, camera device 1605 of FIG. 16, camera device 1705 of FIG. 17, camera device 1801 of FIG. 18 and/or camera device 1901 of FIG. 19, in accordance with an exemplary embodiment.

In some embodiments, assembly of modules 2200 is included in memory in an exemplary camera device, e.g., memory 108 of camera device 100 of FIG. 1A, memory 213 of camera device 200 of FIG. 2, memory 73 of camera device 60 of FIG. 4, memory of camera device 1500 of FIG. 15, memory of camera device 1605 of FIG. 16, memory of camera device 1705 of FIG. 17, memory of camera device 1801 of FIG. 18, and/or memory of camera device 1901 of FIG. 19. For example assembly of modules 2100 may be included as part of assembly of modules 118 of memory 108 of camera device 100 of FIG. 1.

In some embodiments, assembly of modules 2200 is included in an exemplary device, e.g., an exemplary camera device, which implements a method in accordance with flowchart 1100 of FIG. 11.

Assembly of module 2200 includes a module 2204 configured to receive user input to control capture of an image of the first scene area, and a module 2206 configured to operate the plurality of optical chain modules in parallel to capture images of the first scene area. Module 2206 includes a module 2210 configured to operate a first optical chain module to capture a first image of the first scene area using a first exposure time, a module 2212 configured to operate a second optical chain module to capture a second image of the first scene area using a second exposure time, and a module 2214 configured to operate a third optical chain module to capture a third image of the first scene area using a third exposure time. Assembly of modules 2200 further includes a module 2216 configured to store the captured first image of the first scene area, a module 2218 configured to store the captured second image of the first scene area, and a module 2220 configured to store the captured third image of the first scene area. Assembly of modules 2200 further includes a module 2222 configured to operate one of the first second or third optical chain modules to capture an image, e.g., a fourth image of a first scene area, a module 2224 configured to store the captured image, e.g., the captured fourth image, of the first scene area, and a module 2226 configured to display the fourth image of the first scene area on a display.

Assembly of modules 2200 further includes a module 2228 configured to process the first and second images to generate a first combined image of the first scene area. Module 2228 includes a module 2130 configured to weight and sum a combination of pixel values of the images as a function of exposure time including, e.g., weighting pixel values of the first and second images corresponding to the same portion of the first scene area as a function of the first and second exposure times, respectively, and summing the weighted pixel values, and a module 2232 configured to optionally process the third image in addition to the first and second images to generate the first combined image. Assembly of modules 2200 further includes a module 2236 configured to store in memory the combined image and a module 2237 configured to display the combined image on a display.

Figure 23:
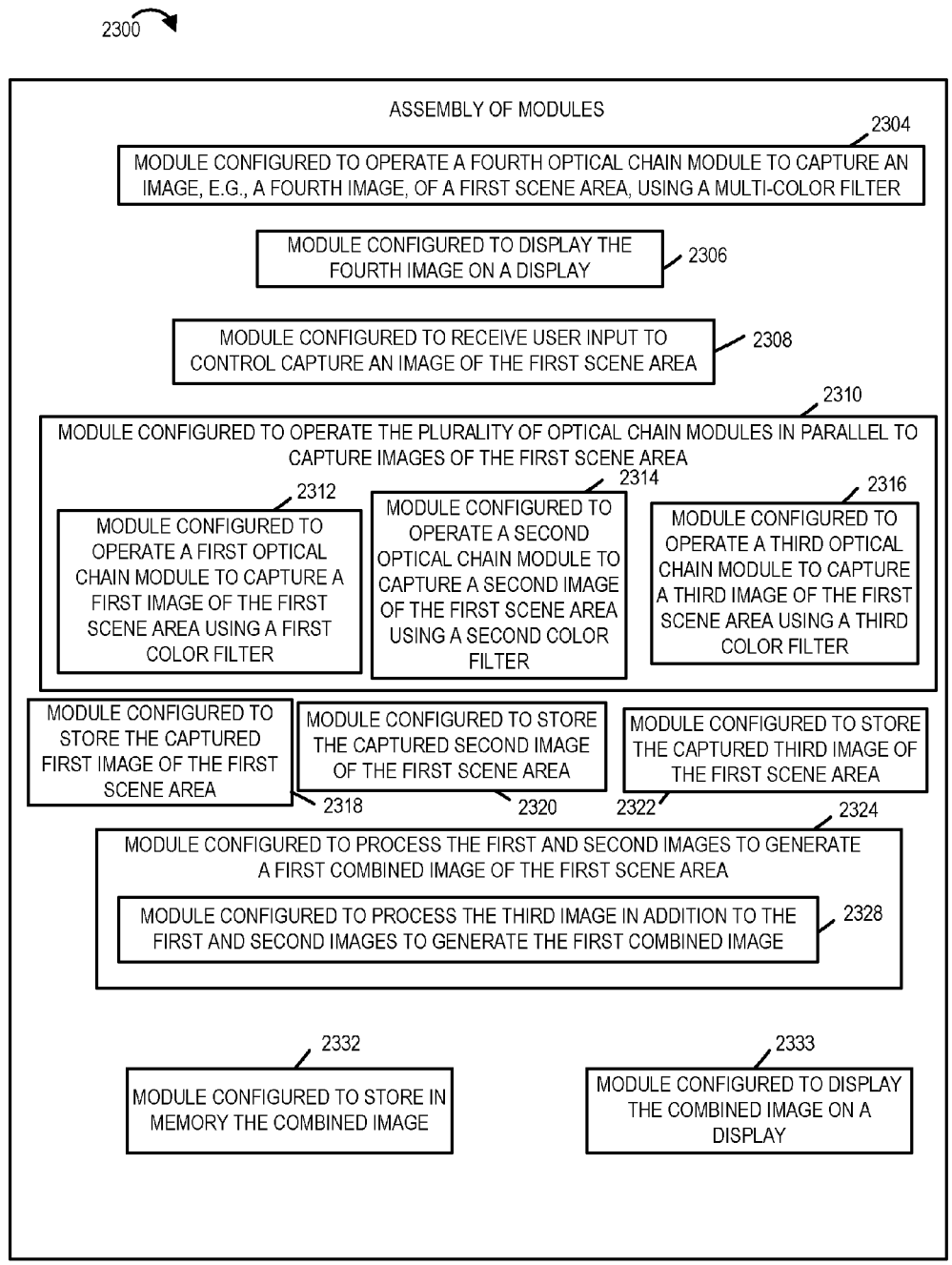
FIG. 23 is a drawing of an assembly of modules, which may be included in an exemplary apparatus, e.g., a camera device, in accordance with an exemplary embodiment.

FIG. 23 is a drawing of an assembly of modules 2300 in accordance with an exemplary embodiment. Assembly of modules 2300 may be included in an exemplary apparatus, e.g., a camera device, e.g., camera device 100 of FIG. 1A, camera device 200 of FIG. 2, camera device 60 of FIG. 4, camera device 1500 of FIG. 15, camera device 1605 of FIG. 16, camera device 1705 of FIG. 17, camera device 1801 of FIG. 18, and/or camera device 1901 of FIG. 19, in accordance with an exemplary embodiment.

In some embodiments, assembly of modules 2300 is included in memory in an exemplary camera device, e.g., memory 108 of camera device 100 of FIG. 1A, memory 213 of camera device 200 of FIG. 2, memory 73 of camera device 60 of FIG. 4, memory of camera device 1500 of FIG. 15, memory of camera device 1605 of FIG. 16, memory of camera device 1705 of FIG. 17, memory of camera device 1801 of FIG. 18, and/or memory of camera device 1901 of FIG. 19. For example assembly of modules 2100 may be included as part of assembly of modules 118 of memory 108 of camera device 100 of FIG. 1.

In some embodiments, assembly of modules 2300 is included in an exemplary device, e.g., an exemplary camera device, which implements a method in accordance with flowchart 1200 of FIG. 12.

Assembly of module 2300 includes a module 2304 configured to operate a fourth optical chain module to capture an image, e.g., a fourth image, of a first scene area, using a multi-color filter, a module 2306 configured to display the fourth image on a display, a module 2308 configured to receive user input to control capture of an image of the first scene area, and a module 2310 configured to operate the plurality of optical chain modules in parallel to capture images of the first scene area. Module 2310 includes a module 2312 configured to operate a first optical chain module to capture a first image of the first scene area using a first color filter, a module 2314 configured to operate a second optical china module to capture a second image of the first scene area using a second color filter, and a module 2316 configured to capture a third image of the first scene area using a third color filter. Assembly of modules 2300 further includes a module 2318 configured to store the captured image of the first scene area, a module 2320 configured to store the captured second image of the first scene area, and a module 2322 configured to store the captured third image of the first scene area. Assembly of modules 2300 further includes a module 2324 configured to process the first and second images to generate a first combined image of the first scene area. Module 2324 includes a module 2328 configured to process the third image in addition to the first and second images to generate the first combined image.

Assembly of modules 2300 further includes a module 2332 configured to store in memory the combined image and a module 2333 configured to display the combined image on a display.

In some embodiments, an exemplary camera device, e.g., camera device 100 of FIG. 1, includes one or more of all of assembly of modules 1300, assembly of modules 2000, assembly of modules 2100, assembly of modules 2200, and assembly of modules 2300. An assembly of modules may be implemented in hardware, software, or a combination of hardware and software, e.g., depending upon the particular embodiment.

Figure 24A:
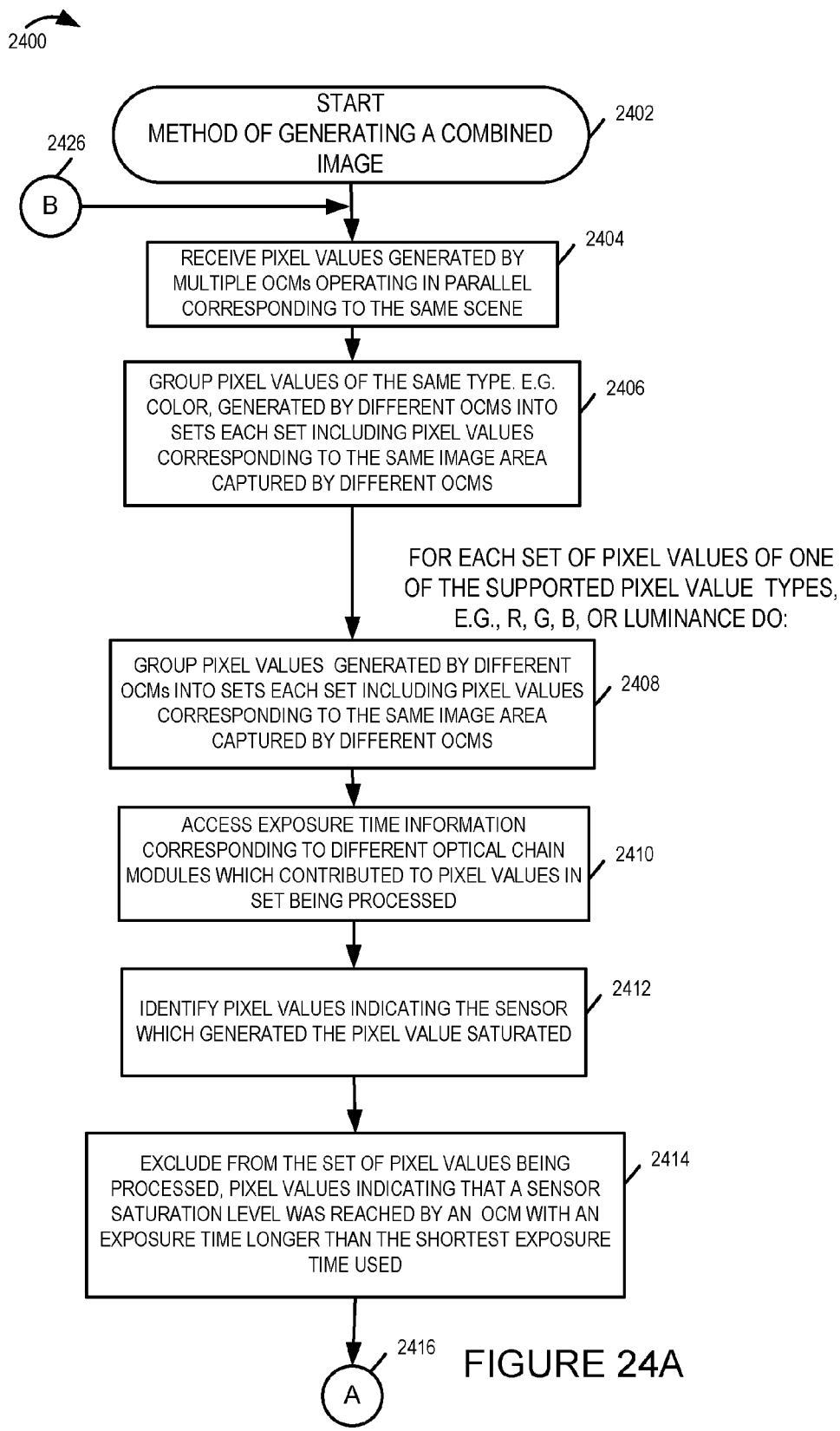
FIG. 24A is a first part of FIG. 24 which shows a method of generating a combined image from pixel values generated by multiple optical chain modules operating in parallel.
Figure 24B:
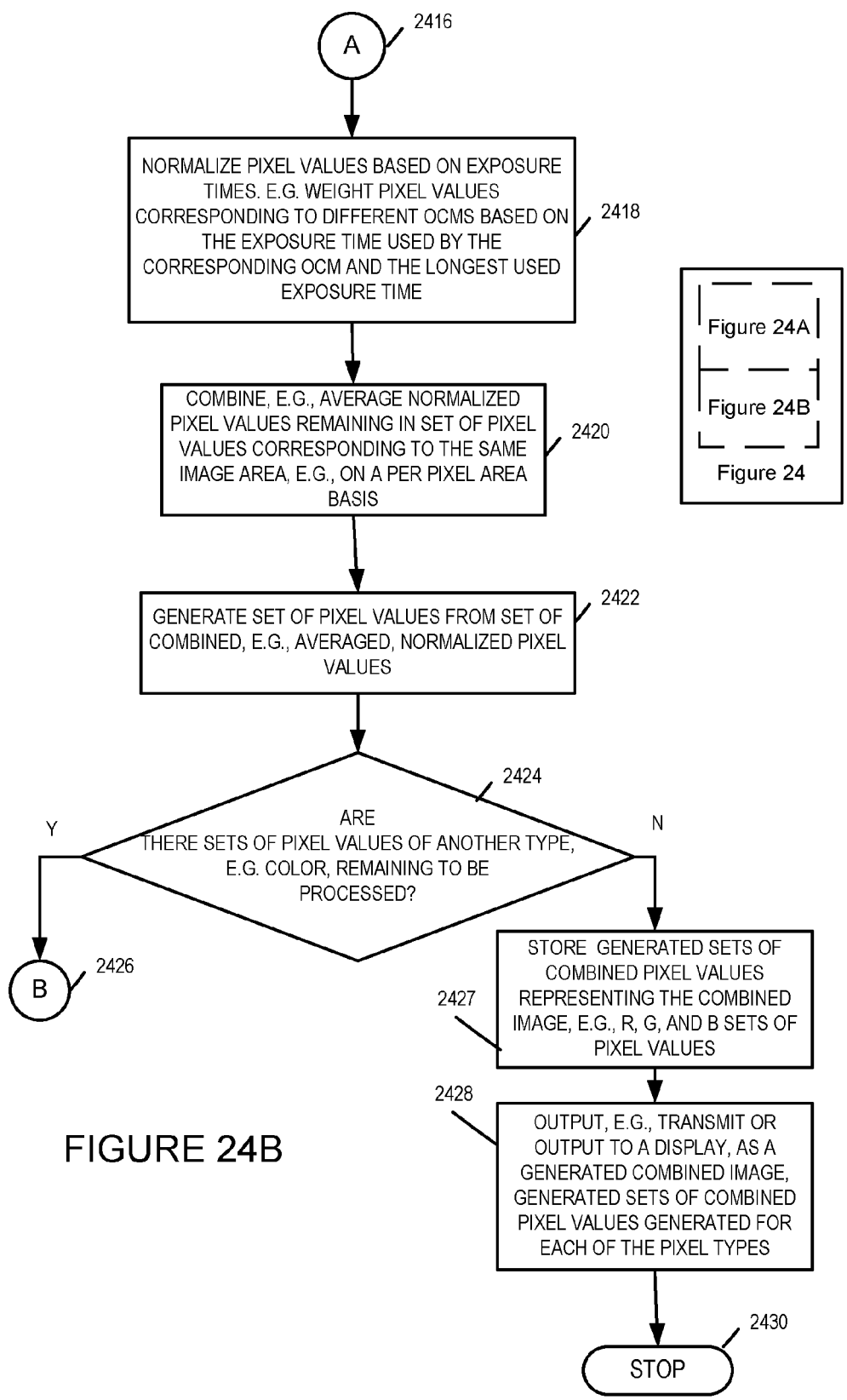
FIG. 24B is a second part of FIG. 24 which shows a method of generating a combined image from pixel values generated by multiple optical chain modules operating in parallel.

FIG. 24, which comprise the combination of FIGS. 24A and 24B, illustrates an exemplary method 2400 for generating pixel values of a combined image from pixel values generated by a plurality of optical chain modules operating in parallel. The method 2400 begins with the processor implementing the method, e.g., the processor 110 of the camera device 100, or processor 1410 of the post-processing system 1400, beginning the process of generating a combined image.

In step 2404 pixel values corresponding to the same scene, e.g., pixel values generated by optical chain modules operating in parallel, generated by multiple optical camera modules, e.g., optical chain modules 161, 161' and 161", are received. The receipt may be the result of the processor 110 or 1410 reading the values from memory or receiving them directly from the OCMs which generated the values.

In step 2406 the pixel values are grouped according to type. For example, some OCMs may provide R (red) pixel values, some blue (B) pixel values others (G) green pixel values while still others may provide unfiltered pixel value indicative of luminance (L) resulting from multiple colors of light reaching the sensor 168, 168' or 161''' of the optical chain module which generated the pixel values to be processed. In addition to the type of pixel value being processed the processor is aware of the exposure time used by the optical chain module to generate the pixel value. This information may be know to the processor if it controlled the exposure time, or from information stored with the pixel values and supplied to the processor along with the pixel values and information indicating the type of pixel values being supplied as well as, in some cases, other useful information such as the configuration and location (lens spacing) of OCMs which were the source of pixel values.

With the pixel values being separated according to type, processing of the different types of pixel values may proceed with pixel values of a given type from different OCMs being processed and combined to generate pixel values of the combined image.

Steps 2408 through 2422 are performed for each type of pixel value to be processed, e.g., with R, G, B values being processed separately. Similarly in the case of Luminance values (unfiltered) values such values are treated as a separate set of pixel values for processing purposes and may be used for generating a grayscale image or in combination with color information at rendering time when an image is to be displayed.

Combining of pixel values of an individual type beings in step 2408 with the pixel values from different OCMs being grouped according to the image area to which they correspond so that pixel values captured by different OCMs but corresponding to the same image area can be combined at a pixel level.

In some embodiments in addition to the pixel values from an optical chain module, the processor has access to information about the lens spacing and/or configuration as well as the focus distance used by the individual optical chain modules supplying the sets of pixel values for combining. Thus, at least in some embodiments the processor has access to spatial information which allows the processor to align pixels of an image captured by one OCM 161, 161' or 161" with that of another OCM which provides pixel values to be combined. Thus, the pixels can be combined based on the individual pixel size scene area to which they correspond. In other embodiments images captured by different OCMs can be correlated based on content. The comparison of content allows pixels of images captured by one OCM to be aligned for combining purposes with pixels captured by another OCM. As the result of the alignment of pixel values corresponding to the same scene areas but captured by different OCMs, pixel values from different OCMs can be combined on a per pixel area basis, e.g., with each OCM contributing, in some embodiments, at most one pixel value to be used in generating a corresponding pixel value of the combined image.

Of course in other embodiments where area filters or other area based filtering is applied there may not be a one to one pixel correspondence between a pixel value provided by an OCM and a pixel in the combined image.

FIG. 25 illustrates a chart 2500 of the type which may be generated by step 2408 with pixel values being arranged into sets corresponding to different pixel areas, with each row beginning with a different pixel location identifier (P1, P2, P3, or P4) representing a set of pixel values corresponding to the same image area but captured by different optical chain modules. FIG. 25 will be discussed further below.

Operation proceeds from step 2408 to step 2410 in which the processor implementing the method accesses exposure time information corresponding different optical chains (OCM1 161, OCM 2 161', OCM 3 161") which contributed to pixel values in the set being processed. In step 2412 the processor proceeds to identify pixel values which correspond to sensor saturation. Such values indicate that the maximum detection (e.g., light capture capability) was reached and that while the input was at least as strong as indicated by the measured value it might be higher than the measured value.

Operation proceeds from step 2412 to step 2414. In step 2414 pixel values which are deemed unreliable because of a saturation occurrence are identified and excluded from further consideration. In the FIG. 24 example, in step 2414 pixel values indicating that sensor saturation level was reached by an OCM with an exposure time longer than the shortest exposure time used by one of the OCMs providing pixel values which are being combined are excluded from further consideration. This is because the pixel values from the OCM with the shorter exposure time may provide more reliable information than the saturated values which are being excluded.

FIG. 26 uses X's to indicate pixel values which will be excluded in one embodiment as a result of performing step 2414 on a set of data such as the one shown in FIG. 25. Operation proceeds from step 2414 to step 2418 via connecting node A 2416.

In step 2418 a pixel value normalization operation is performed taking into consideration the exposure times used by the different optical chain modules. As should be appreciated the amount of light energy detected is normally a function of the exposure time with the amount of energy increasing proportionally to exposure time assuming that the image does not change for the duration of the exposure. In step 2418 pixel values to be combined are normalized based on exposure times with, e.g., pixel values corresponding to different OCMs being weighted based on the exposure time used by the OCM supplying the pixel values. In some embodiments the weighting is based on the exposure time of the OCM from which the pixel value was obtained and the shortest exposure time used by an OCM to which some of the pixel values being combined correspond.

The results of pixel value normalization performed in step 2420 as applied to the pixel values of FIG. 26 are shown in FIG. 27.

With the normalization of pixel values to be combined having been completed in step 2420, the pixel values can be combined in steps 2420 on a per pixel location basis, e.g., through averaging or some other statistical method of combining values. FIG. 28 shows the results of averaging the pixel values of FIG. 27. As should be appreciated the result of the combining operation is one pixel value for each of the pixel values corresponding to an image area obtained from the different OCMS. For example, if three OCMs captured an image and provided pixel values corresponding to the same scene area, three or fewer pixel values may be combined to generate a single pixel value of the final combined image.

Operation proceeds from step 2422 to step 2424 in which are check is made to determine if there are sets of pixel values of another type remaining to be processed. For example, if step 2422 produced a set of R combined pixel values, operation may proceed to step 2404 so that G or B pixel values may be processed to generate corresponding pixel values for the combined image. If in step 2424 it is determined that additional sets of pixel values of a different type remain to be processed, operation proceeds to step 2404 via connecting node B 2436 so that processing may proceed.

However, if in step 2428 it is determined that there are no additional sets of pixel values corresponding to the image being generated to be processed, operation proceeds to step 2427 wherein the combined image is stored, e.g., in memory 108 or 1426, prior to the set of data representing the combined image being output in step 2428. Outputting of the combined image may involve supplying the generated sets of R, G, B and/or luminance pixel values to a display device for rendering and presentation on the display and/or may involve transmitting the pixel values representing the combined image over a communications channel, e.g., a network connection or broadcast channel, to supply one or more device with access to the network connection or channel with the combined image generated from the pixel values captured by multiple optical chain modules, e.g., modules 161, 161', 161".

The exemplary combining process shown and explained with reference to FIG. 24 can be applied and used in cases where OCMs all use the same exposure time in which case all the pixel values from the OCMs which can be correlated to the same image area can be combined to generate a pixel value of the combined image without concern or need for normalization of pixel values assuming that the sensors used are the same in each of the OCMs. Averaging of pixel values from different sensors having the same exposure time provides benefits with respect to averaging that help reduce the effect that thermal noise or random differences in photon strikes may have on the pixel value measured by different optical chains for the same area of an image. In essence using multiple OCMs reduces the effect of noise and other random effects on the overall image quality.

The exemplary method described with regard to FIG. 24 will now be explained further with reference to the exemplary pixel values shown in FIGS. 25, 25, 27 and 28.

FIG. 25 illustrates an exemplary chart 2500 including a set of pixel values, e.g., luminance pixel values, generated by multiple optical chains, e.g., a first optical chain (OCM 1), a second optical chain (OCM 2) and a third optical chain (OCM 3) operating in parallel. The optical chains OCM 1, OCM 2, OCM 3 for purposes of the FIG. 25 example are of the same type, e.g., unfiltered (luminance detection) optical chains. However, they could be red, green or blue filtered optical chain pixel values with all the pixel values corresponding to the same color. It is assumed for purposes of the example that the sensors of the optical chains generate pixel values in the range of 0 to 255 with 0 indicating detection of no energy (e.g., a black image region) and 255 indicating the detection of the maximum amount of energy (e.g., a bright image region) the sensor can detect and that the sensors have the same or similar dynamic range, e.g., they have the ability to each measure the same amount of energy before saturating. Thus, a pixel value of 255 indicates saturation of a sensor, e.g., due to the sensor corresponding to a bright area of the image. The FIG. 25 chart is exemplary of the grouping produced in step 2408 of the method shown in FIG. 24.

As should be appreciated, small sensors are often subject to saturation problems do to their small size, e.g., they have a small bucket for storing energy corresponding to received photons. With small sensors thermal or other noise can also be an issue particularly in low light conditions. As discussed elsewhere in the application thermal noise can be improved by averaging pixel values captured by multiple optical chains.

In the FIG. 25 example, the first OCM (OCM1) uses an exposure time of 1/90th of a second, the second OCM (OCM 2) uses an exposure time of 1/60th of a second and the third optical chain (OCM 3) uses an exposure time of 1/30th of a second. For purposes of the example each of the exposures start at the same time. Thus, for at least a portion of the light capture period, i.e., the first 1/90th of a second all three of the optical chains operate in parallel to capture light, during the second 1/90th of a second the second and third optical chains operate to capture light and during the third 1/90th of a second only the third optical chain operates to capture light. As should be appreciated the first optical chain, given its low exposure time, is particularly useful in determining pixel values corresponding to very bright areas where the other sensors are likely to saturate due to their longer exposure times. The second optical chain is useful in covering a wide range of luminance intensities but is not as good as the third optical chain which has a longer exposure time for capturing pixel values corresponding to image areas which are low light, e.g., dark image areas. The third optical chain is useful in providing information corresponding to low light scene areas but is likely to saturate with respect to pixels corresponding to high light image areas. It should be appreciated that use of the third optical chain with the long exposure time provides benefits in terms of low light image regions while the first optical chain provides benefits with respect to capturing pixel values in very bright image regions.

In the FIG. 25 chart 2500, an (S) is used under the pixel value to indicate that the value indicates saturation of the sensor. The first column lists pixels, e.g., pixels P1, P2, P3, P4, each pixel corresponding to a different scene image area of a scene size corresponding to the sensor area of one pixel. While only four pixels are included in the FIG. 25 example it is to be understood that an image will include, in many cases, millions of such pixels, each captured by a different portion of a sensor. In each row, the value captured by an optical chain module corresponding to the pixel area of the scene is shown. For example in row 1, with regard to pixel area P1, the first OCM 1 measured a pixel value of 100, OCM 2 measured a pixel value of 154 and OCM3 measured a pixel value of 255.

FIG. 26 is a chart 2600 illustrating the set of captured pixel values after exclusion of pixel values corresponding to saturated pixel values measured by optical chain modules (OCM 2 and OCM 3) having longer exposure times than the optical chain module (OCM1) with the shortest exposure time which contributed to the set of pixel values shown in FIG. 25. In FIG. 26 "X" is used to show saturated pixel values which are excluded, in accordance with step 2414, from further use in generating the combined image.

FIG. 27 is a chart 2700 illustrating the normalized pixel values generated by processing the values shown in FIG. 26 with the excluded values being omitted. Note the pixel values shown in column 3 corresponding to the second optical chain module (OCM2) are (⅔) the value of the original value reflecting that they were generated using 1.5 times the shortest exposure time and that the values in the last column of the chart 2700 are ⅓ the original values reflecting that they were generated using an exposure time three times the shortest exposure time. The values in the first column corresponding to OCM 1 are left unchanged since they correspond to the shortest exposure time and already reflect the maximum energy per minimum image capture time (¹/₉₀th of a second) used by the optical modules in generating the combined images.

The Normalized values remaining in the chart shown in FIG. 27 are averaged in the particular exemplary embodiment to generate the pixel values of the combined image. FIG. 28 is a chart showing the resulting pixel values for pixels P1 though P4 of the combined image and the computation used to generate the pixel values. Note that the normalized pixel values used to generate the combined pixel value for an image area corresponding to the area of a pixel may be based on one, some or all of the outputs of multiple optical chains. This allows, in the case of low light conditions averaging which reduces the effects of noise and the random nature of photon strikes in generated the pixel value as compared to the case where the output of a single sensor may be used to generate the combined pixel value. In the case of dark image regions, a pixel value from the optical chain module or optical chain modules with the longest exposure time may be used. While the combined pixel value corresponding to a bright area may be generated from fewer sensors than that of low light areas, the higher energy level is less prone to the effects of noise and random photon strikes often requiring multiple photons to be sensed to produce the high pixel value. Accordingly, the method shown in FIG. 24 provides benefits with respect to noise reduction where they are needed most, e.g., in the case of low light areas of an image.

It should be appreciated that the method shown in FIG. 24 effectively increases the useful dynamic range of the camera device including the multiple optical chains beyond that which could be achieved if all the sensors were exposed using the same exposure time where all the sensors would saturate at or about the same light exposure level given that they would be subject to the same exposure time.

While explained using an example with only one type of pixel values, it should be appreciated that the method of FIG. 24 allows for images to be generated using R, G and B pixel values which each of the R, G and B pixel values being combined independently in some embodiments to generate corresponding sets of R, G and B pixel values of a combined color image.

The techniques of various embodiments may be implemented using software, hardware and/or a combination of software and hardware. Various embodiments are directed to apparatus, e.g., a camera device, an image processing device or a system. Various embodiments are also directed to methods, e.g., a method of generating combined pixel values from sets of input pixel values corresponding to an image area where each set of pixel values may be provided by a different optical chain module. Various embodiments are also directed to machine, e.g., computer, readable medium, e.g., ROM, RAM, CDs, hard discs, etc., which include machine readable instructions for controlling a machine, e.g., camera device, processor or image processing system, to implement one or more steps of one or more of the methods described in the present application.

In various embodiments apparatus described herein are implemented using one or more modules to perform the steps corresponding to one or more methods. Thus, in some embodiments various features are implemented using modules. Such modules may be implemented using software, hardware or a combination of software and hardware. Optical chain modules as should be appreciated include as least some hardware elements such as an image sensor and are therefore normally not implementable purely in software while other modules may be implemented fully in software. In some embodiments in which the modules are implemented in hardware, the modules are implemented as circuits, e.g., of a processor and/or as a combination of hardware elements such as lenses, filters and an image sensor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a camera device, an image processing device or other type of system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed:

1. A portable camera apparatus, comprising:
a plurality of at least three optical chains, each optical chain in said plurality including an outer lens located in a front face of the portable camera apparatus, a light redirection element, and a sensor, said light redirection element changing the direction of optical rays passing along an optical axis of said outer lens by substantially 90 degrees to direct said optical rays passing along said optical axis onto the sensor of the optical chain in which said light redirection element and said lens are located, wherein the plurality of at least three optical chains includes:
a first optical chain including a first outer lens positioned in a upper left corner portion of said front face, said first optical chain including a first light redirection element for directing light entering said first outer lens towards a lower right corner portion of said portable camera apparatus;
a second optical chain including a second outer lens positioned in a upper right corner portion of said front face; and
a third optical chain including a third outer lens positioned in a lower left corner portion of said front face, said third optical chain including a third light redirection element for directing light entering said third outer lens towards the upper right corner portion of said portable camera apparatus.

2. The portable camera apparatus of claim 1,
wherein said second optical chain includes a second light redirection element for directing light entering said second outer lens towards a lower left corner portion of said portable camera apparatus.

3. The portable camera apparatus of claim 2,
wherein said first optical chain includes a first inner lens between said first light redirection device and a first sensor of said first optical chain;
wherein said second optical chain includes a second inner lens between said second light redirection device and a second sensor of said second optical chain; and
wherein said third optical chain includes a third inner lens between said third light redirection device and a third sensor of said third optical chain.

4. The portable camera apparatus of claim 3, wherein the optical axes of outer lenses of at least two of said optical chains in said plurality of optical chains are parallel to each other but at least two mirrors corresponding to different optical chains are not parallel.

5. The portable camera apparatus of claim 4, wherein said first, second and third sensors are located on a surface of a cylinder.

6. The portable camera apparatus of claim 1,
wherein the first light redirection element of the first optical chain is a mirror positioned at 45 degree to an optical axis of the first outer lens of said first optical chain;
wherein the second light redirection element of the second optical chain is a second mirror positioned at 45 degree to an optical axis of the second outer lens of said second optical chain; and
wherein the third light redirection element of the third optical chain is a third mirror positioned at 45 degree to an optical axis of the third outer lens of said third optical chain.

7. The portable camera apparatus of claim 1 wherein the light redirection device of at least one optical chain in said plurality of optical chains includes at least one prism.

8. The portable camera apparatus of claim 1, wherein the optical rays of at least the first and second optical chains cross after the optical rays passing through the first optical chain are redirected by said first light redirection device and after the optical rays passing through the second optical chain are redirected by said second light redirection device.

9. The portable camera apparatus of claim 1, wherein the plurality of optical chains further includes:
a fourth optical chain including a fourth outer lens positioned in a lower right corner portion of said front face, said fourth optical chain including a fourth light redirection element for directing light entering said fourth outer lens towards an upper left corner of said portable camera apparatus.

10. The portable camera apparatus of claim 9, further comprising:
a fifth optical chain including a fifth outer lens positioned in a lower center portion of said front face, said fifth optical chain including a fifth light redirection element for directing light entering said fifth outer lens towards an upper center portion of said portable camera apparatus.

11. The portable camera apparatus of claim 1, wherein the first optical chain includes a first sensor located in said lower right corner portion of said portable camera apparatus.

12. The portable camera apparatus of claim 11,
wherein the second optical chain includes a second sensor located in a lower left corner portion of said portable camera apparatus; and
wherein the third optical chain includes a third sensor located in the upper right corner portion of the portable camera apparatus.

13. The camera apparatus of claim 12, wherein the plurality of optical chains further includes:
a fourth optical chain including a fourth outer lens positioned in a lower right corner section of said front face, said fourth optical chain including a fourth light redirection element for directing light entering said fourth outer lens towards a fourth sensor included in an upper left corner of said portable camera apparatus.

14. The portable camera apparatus of claim 1, wherein said left and right portions of said camera are from the perspective of a person looking at the front face of said portable camera apparatus.

15. The portable camera apparatus of claim 1, wherein said first, second and third outer lenses are positioned near the perimeter of the front face of the portable camera apparatus.

16. The portable camera apparatus of claim 1, wherein said first, second and third outer lenses are located on a circle.

17. The portable camera apparatus of claim 1, further comprising:
a first drum on which i) a first filter of the first optical chain is mounted, ii) a second filter of the second optical chain is mounted; and iii) a third filter of the third optical chain is mounted.

18. The portable camera apparatus of claim 1, further comprising:
a second drum on which i) a first inner lens of the first optical chain is mounted, a second inner lens of the second optical chain is mounted; and ii) a third inner lens of the third optical chain is mounted.

19. The portable camera apparatus of claim 1, further comprising:
a first drum on which i) a first filter of the first optical chain is mounted, ii) a second filter of the second optical chain is mounted; and iii) a third filter of the third optical chain is mounted;

a second drum on which i) a first inner lens of the first optical chain is mounted, a second inner lens of the second optical chain is mounted; and ii) a third inner lens of the third optical chain is mounted; and wherein one of the first and second drums is located inside the other one of the first and second drums.

\* \* \* \* \*